United States Patent [19]
Gevers

[11] Patent Number: 6,098,927
[45] Date of Patent: Aug. 8, 2000

[54] MULTI-PURPOSE AIRCRAFT

[76] Inventor: David E. Gevers, P.O. Box 430, Brownsburg, Ind. 46112

[21] Appl. No.: 09/195,920

[22] Filed: Nov. 19, 1998

Related U.S. Application Data

[62] Division of application No. 08/812,823, Mar. 6, 1997, Pat. No. 5,850,990, which is a division of application No. 08/112,877, Aug. 26, 1993, Pat. No. 5,645,250.

[51] Int. Cl.$^7$ .............................. B64C 1/00; B64C 3/00; B64C 3/54
[52] U.S. Cl. ..................... 244/123; 244/35 R; 244/218
[58] Field of Search ................................ 244/218, 35 R, 244/123

[56] References Cited

U.S. PATENT DOCUMENTS

| | | | |
|---|---|---|---|
| 1,708,249 | 4/1929 | Abel | 244/2 |
| 1,772,815 | 8/1930 | Mandrich | 244/218 |
| 1,879,716 | 9/1932 | Sikorsky | 244/2 |
| 1,890,553 | 12/1932 | Young | 244/101 |
| 1,906,017 | 4/1933 | Sundling | 244/101 |
| 2,058,161 | 10/1936 | Lewis et al. | 244/51 |
| 2,196,946 | 4/1940 | Stone | 244/101 |
| 2,249,729 | 7/1941 | Fitzurka | 244/218 |
| 2,260,316 | 9/1941 | Harris | 244/218 |
| 2,292,613 | 8/1942 | Chapman | 244/218 |
| 2,326,104 | 8/1943 | Petrich | 244/65 |
| 2,344,044 | 3/1944 | Koch | 244/218 |
| 2,420,433 | 5/1947 | Kraaymes | 244/218 |
| 2,449,104 | 9/1948 | Burcham | 244/51 |
| 2,487,465 | 11/1949 | Murray, Sr. | 244/218 |
| 2,548,832 | 4/1951 | Tydon | 244/101 |
| 2,550,278 | 4/1951 | Maknonine | 244/218 |
| 2,844,339 | 7/1958 | Stroukoff | 244/102 |
| 2,858,091 | 10/1958 | Kapenkin | 244/218 |

(List continued on next page.)

FOREIGN PATENT DOCUMENTS

| | | | |
|---|---|---|---|
| 1011306 | 1/1949 | France | 244/218 |
| 169408 | 9/1921 | United Kingdom . | |
| 630044 | 7/1947 | United Kingdom | 244/218 |
| WO 94/13531 | 6/1994 | WIPO . | |

OTHER PUBLICATIONS

Frautschy, H. G., "Mystery Plane", *Vintage Airplane*, pp. 26–27 (Mar. 1996).

Ritchie, D. J., "Feasability and Optimization of Variable–Geometry Wing for Jet Amphibian Business Aircraft", *Society of Automotive Engineers*, pub. No. 730330 from Business Aircraft Meeting, Wichita, KA (Apr. 3–6, 1973).

Bowers, P. M., *Unconventional Aircraft*, 1$^{st}$ ed, (Tab Books, Inc.), pp. 101–103, 112–113, 122–125, 131–132, 270–271(1984).

*Jane's All the World's Aircraft 1987–1988*, (Jane's Publishing Co. Ltd., London), Mark Lambert, ed., p. 541 (1987).

Nemecek, V., *The History of Soviet Aircraft from 1918*, (Key Publishing/Willow Books, London), pp. 52–53 (1986).

Caidin, M., "The Incredible Skyshark—First Amphibious Jet", *Popular Mechanics*, vol. 135(4): 77–80, 180 (Apr. 1971).

*Primary Examiner*—Michael J. Carone
*Assistant Examiner*—Fredrick T. French, III
*Attorney, Agent, or Firm*—Leon R. Yankwich

[57] ABSTRACT

Several innovative systems for an aircraft, and aircraft incorporating them, are disclosed. Features include inboard-mounted engine(s) with a belt drive system for turning wing-situated propellers; compound landing gear integrating ski, pontoon and wheel subcomponents; pivotal mounting armatures for landing gear and/or propellers which provide a plurality of possible landing gear and/or propeller configurations; and a compound wing structure featuring extendable wing panels that permit the wing span of the aircraft to be nearly doubled while in flight. Aircraft incorporating such features will enjoy several safety advantages over conventional multi-engine aircraft and will be capable of modifications during flight which permit landings on any of snow, hard surfaces (runways) and water.

7 Claims, 61 Drawing Sheets

U.S. PATENT DOCUMENTS

| | | | |
|---|---|---|---|
| 3,064,928 | 10/1962 | Toll | 244/218 |
| 3,159,364 | 12/1964 | Sheaffer et al. | 244/101 |
| 3,547,379 | 12/1970 | Kappus et al. | 244/55 |
| 3,662,974 | 5/1972 | Peterson | 244/46 |
| 3,672,608 | 6/1972 | Gioia et al. | 244/43 |
| 3,776,491 | 12/1973 | Oulton | 244/45 |
| 3,844,508 | 10/1974 | Gioia et al. | 244/43 |
| 3,904,152 | 9/1975 | Hill | 244/43 |
| 3,980,257 | 9/1976 | Koch et al. | 244/46 |
| 4,027,835 | 6/1977 | Sachs | 244/101 |
| 4,181,277 | 1/1980 | Gerhardt | 244/218 |
| 4,488,692 | 12/1984 | Eickmann | 244/55 |
| 4,496,120 | 1/1985 | Eickmann | 244/56 |
| 4,579,297 | 4/1986 | Ayoola | 244/2 |
| 4,662,584 | 5/1987 | Eickmann | 244/105 |
| 4,691,881 | 9/1987 | Gioia | 244/101 |
| 4,824,053 | 4/1989 | Sarh | 244/218 |
| 5,054,716 | 10/1991 | Wilson | 244/56 |

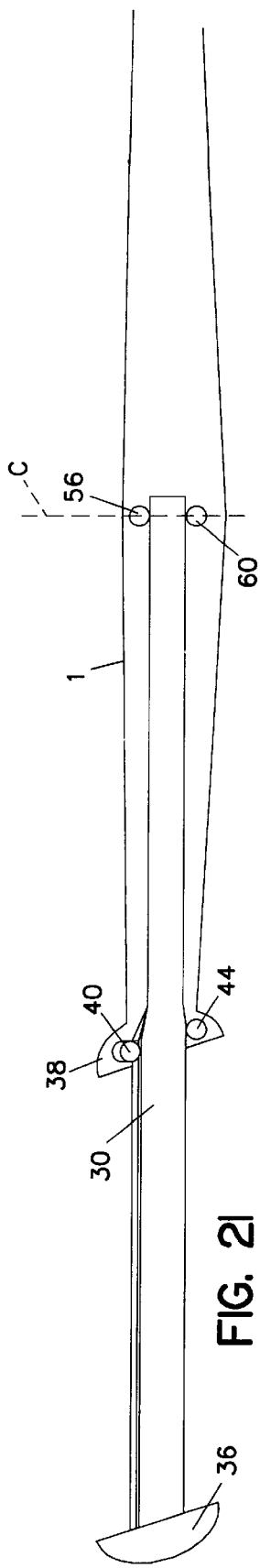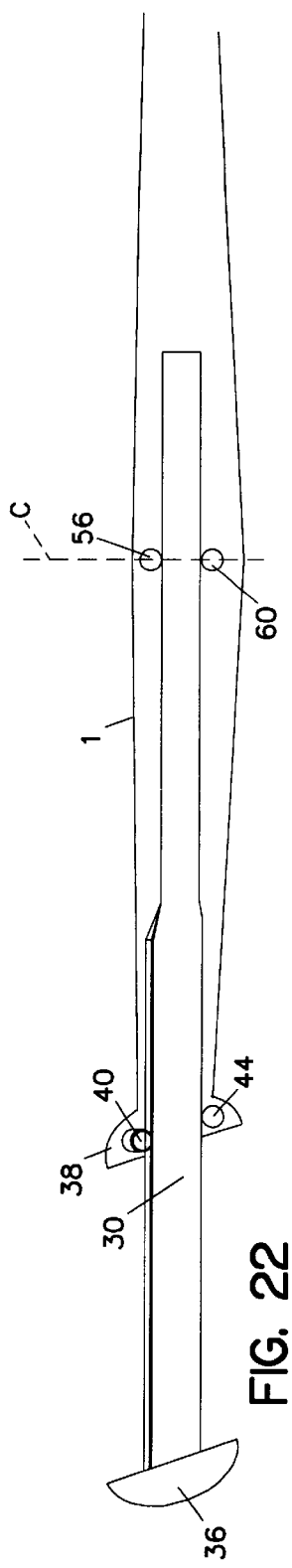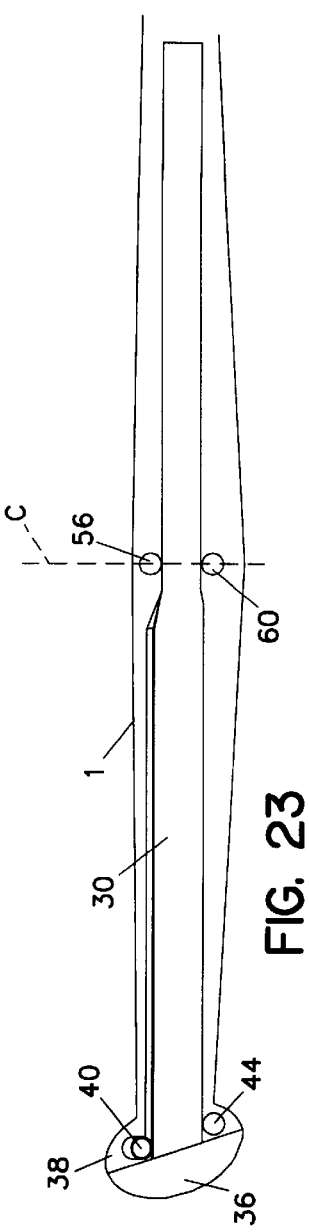

MULTI-PURPOSE AIRCRAFT

This application is a division of U.S. application Ser. No. 08/812,823, filed Mar. 6, 1997, now U.S. Pat. No. 5,850,990, which is a division of U.S. application Ser. No. 08/112,877 filed Aug. 26, 1993 now U.S. Pat. No. 5,645,250.

FIELD OF THE INVENTION

The present invention relates to general aviation aircraft. More particularly, the present invention relates to a novel aircraft adaptable to recreational, utility, or business uses and distinguished by design features permitting fuselage expansion and in-flight alteration of its configuration.

BACKGROUND OF THE INVENTION

Many different types of aircraft have been designed to meet, within the limits of airworthiness, the particular requirements of fliers. Thus, aircraft designs and design modifications are well known which will permit aircraft to land on different surfaces, such as ski-type landing gear for landings on snow, hull-type fuselage and pontoons for amphibious landings, and wing designs having increased wing surface areas and shapes for takeoff and landing in short distances. Some features have also been developed that permit modification of an aircraft's configuration (and thus its flight characteristics) while in flight. For example, some jet fighter aircraft are often equipped with wing panels that are rotated out from the fuselage to increase wing span and lower stall speed for takeoffs and landings but are swept back during flight to increase maneuverability and decrease drag and bending stresses.

Although the adaptability of an aircraft to different uses and to different flight and landing conditions is always desirable, most design modifications that suit an aircraft to a particular specialized use necessitate design compromises that adversely affect the aircraft's performance in some other aspect. For instance, amphibious aircraft designs have been limited by the necessity of placing the engine high over the wing, to avoid interference with the propeller by the spray of water from takeoff or landing. This is a design compromise that creates a high thrust line for the aircraft and also additional drag.

Also, the design sophistication and structural requirements necessary to adopt such capabilities as "swing" wings are impractical and expensive for private recreational aircraft.

Accordingly, there is a continuing need for the development of aircraft that are suited to a variety of uses and which can satisfy the requirements and demands of a wide variety of commercial and recreational fliers.

SUMMARY OF THE INVENTION

It is an object of the present invention, therefore, to provide a novel twin-engine propeller-driven aircraft (although many features of this invention will be applicable to jet-powered aircraft and to aircraft having any number of engines).

It is a further object of the present invention to provide a basic aircraft design that can be adapted to serve a wide variety of specialized uses without entailing modification of the design or extensive refitting.

It is a further object of the present invention to provide a basic aircraft design capable of a wide range of uses but without introducing design compromises that limit or reduce specific flight performance characteristics.

It is a further object of the present invention to provide an aircraft capable of landing on snow, water or land without pre-flight modification of the landing gear.

It is a further object of the present invention to provide a short takeoff and landing (STOL) aircraft having a high degree of maneuverability and capable of trimming drag and decreasing wing surface area and wing span in flight.

It is a further object of the present invention to provide a basic design for an aircraft that is expandable from 2 seats to 8 or more seats without entailing redesign of the airfoil or fuselage.

It is a further object of the present invention to provide a basic design for an aircraft that is convertible from a passenger-carrying configuration to a cargo-carrying configuration (or to other specialized cabin configurations) without entailing redesign of the airfoil or fuselage.

It is a further object of the present invention to provide a novel landing gear design integrating skis, wheels, and pontoons, which can be converted to the appropriate configuration during flight.

It is a further object of the present invention to provide a propeller-driven, multi-engine aircraft with improved safety characteristics. In particular, it is an object of the invention to provide aircraft of unprecedented safety through an aircraft design which eliminates many of the leading causes of aviation accidents, including asymmetrical thrust conditions due to an engine failure, propeller blade separation (i.e., loss of a propeller due to damage to the propeller blades and the resulting vibration and breakage), rapid power loss (engine failure) during takeoff or climbout, inappropriate configuration or selection of landing gear, and accidents related to the position of the propeller on an aircraft on the ground (e.g., unintentional contacts with ground objects or people).

It is a further object of the present invention to provide a novel propeller drive system for a propeller-driven aircraft and to provide an aircraft design characterized by unifying mounting structures for the propellers and landing gear, allowing adjustment of propeller position relative to the airfoil as a function of landing configuration of the aircraft.

It is a further object of the present invention to provide a 2–8 seat aircraft that is easy to service and maintain and which maintains airworthiness in a variety of emergency situations.

These and other objects are accomplished herein by a novel type of aircraft and novel components thereof having a number of innovative design features including: telescoping wing extensions; integrated multiple landing gear mounts permitting skis, wheels, or pontoon outriggers to be rotated into landing position, at the option of the pilot; modular fuselage sections permitting the addition of seats or cargo area without requiring redesign or refitting of wing or tail components; propellers mounted on their own shafts which are belt-driven from inboard engines; a primary structure permitting support of the engine mass by the fuselage structures rather than the wings and permitting large fuselage openings for easy engine access, efficient cargo handling, enhanced pilot visibility, or enhanced passenger comfort. Utilization of one or more of these features provides an aircraft of improved safety, performance, reliability, efficiency, and versatility over aircraft currently available.

BRIEF DESCRIPTION OF THE DRAWINGS

FIG. 13). This figure also shows the positioning of roller assemblies enabling rolling extension of the wing extension panels and shows the relative position of the support structures of a port wing extension assembly.

FIG. 15).

FIGS. 21, 22, and 23 show front cross-sectional views of the starboard wing lift spars and supporting rollers in fully extended (FIG. 21), intermediate (FIG. 22), and fully retracted (FIG. 23) configurations.

FIG. 4), with landing gear retracted into the fuselage.

FIG. 4) but in proper relation to each other. The armatures are shown in the relative positions they would have, e.g., in an aircraft as depicted in FIG. 4, wherein the propeller centers are in line with the planes of the wings and the landing gear are fully retracted inside the fuselage.

FIG. 8, FIG. 57) but in proper relation to each other. The armatures are shown in their relative positions, e.g., in an aircraft as depicted in FIG. 1, wherein the propellers are positioned above the surface of wings and caster-type wheel gear are deployed, as appropriate for a runway landing.

FIG. 9) but in proper relation to each other. The armatures are shown in their relative positions, e.g., in an aircraft as depicted in FIG. 9, wherein the propellers are raised to their maximum distance above the wings and the pontoon gear are fully deployed, as appropriate for a water landing.

FIG. 54 is a cross-sectional view of the midsection of the fuselage of an aircraft according to the invention, taken on line 54—54 of FIG. 7 and depicting the compound landing gear deployed so as to make use of the wheeled gear, i.e., in the configuration most suitable for landing on, taking off from, and taxiing on a hard surface.

FIG. 7.) Several structural elements not related to the landing gear are omitted from this view.

FIG. 57 is a cross-sectional front elevation of the midsection of the aircraft similar to the configuration depicted in FIG. 56, except that the deployment of the landing gear has been modified as appropriate for takeoff and landing on intermittent snow over a hard surface runway. Several structural elements not related to landing gear are omitted from this view.

FIG. 8.) Several structural elements not related to landing gear are omitted from this view.

FIG. 9.) Several structural elements not related to landing gear are omitted from this view.

FIG. 60 shows a preferred steering control system, in which control of the front and rear wheels are linked such that turning the rear (main) gear simultaneously turns the nose landing gear. FIG. 61 illustrates a similar steering control system in which the nose and main gear are controlled independently.

DETAILED DESCRIPTION OF THE PREFERRED EMBODIMENTS

Preferred embodiments of the present invention will be described below with reference to the drawings. It will be immediately appreciated, however, that the design features described may be altered or modified for particular purposes and that the production of many alternative embodiments of the aircraft described herein will be possible in view of this disclosure. All such alterations, modifications and additional embodiments are contemplated herein and are intended to fall within the scope of this description and the appended claims. The following description is not intended to limit the scope of the invention in any way.

Preferred embodiments of a complete aircraft according to the present invention are shown in various configurations and views in FIGS. 1, 2, 3, 4, 5, 6, 8, 9, 10, 11, 12, 13, 14, 15 and 62. The preferred features of the aircraft include compound wings comprising a fixed wing section also housing port and starboard extendable wing panels, which can be deployed (in-flight, if desired) to increase wing surface area and lift; pivoting mounting armatures that serve as propeller mounts and also as aft landing gear mounts, the armatures serving to change simultaneously the position of the propellers and the compound landing gear with respect to the rest of the aircraft, i.e., placing the propellers in the optimal position for landing on or taking off from a variety of surfaces or for cruising flight, such positioning of the propellers occurring automatically as compound landing gear mounted on the armatures are rotated to expose the appropriate type of landing gear (wheeled gear, skis, pontoons) for different landing surfaces (tarmac, snow, water) or are rotated to nest in recesses in the fuselage of the aircraft during flight; modular fuselage design permitting augmentation of the aircraft in production to meet different passenger-carrying or cargo-carrying needs without re-design; elimination of an aft fuselage section and a stronger, more easily fabricated tail section; and a power train featuring inboard engine mounting (preferably twin, tandemly mounted and opposed engines) and a novel belt drive for propellers.

Figure 1:
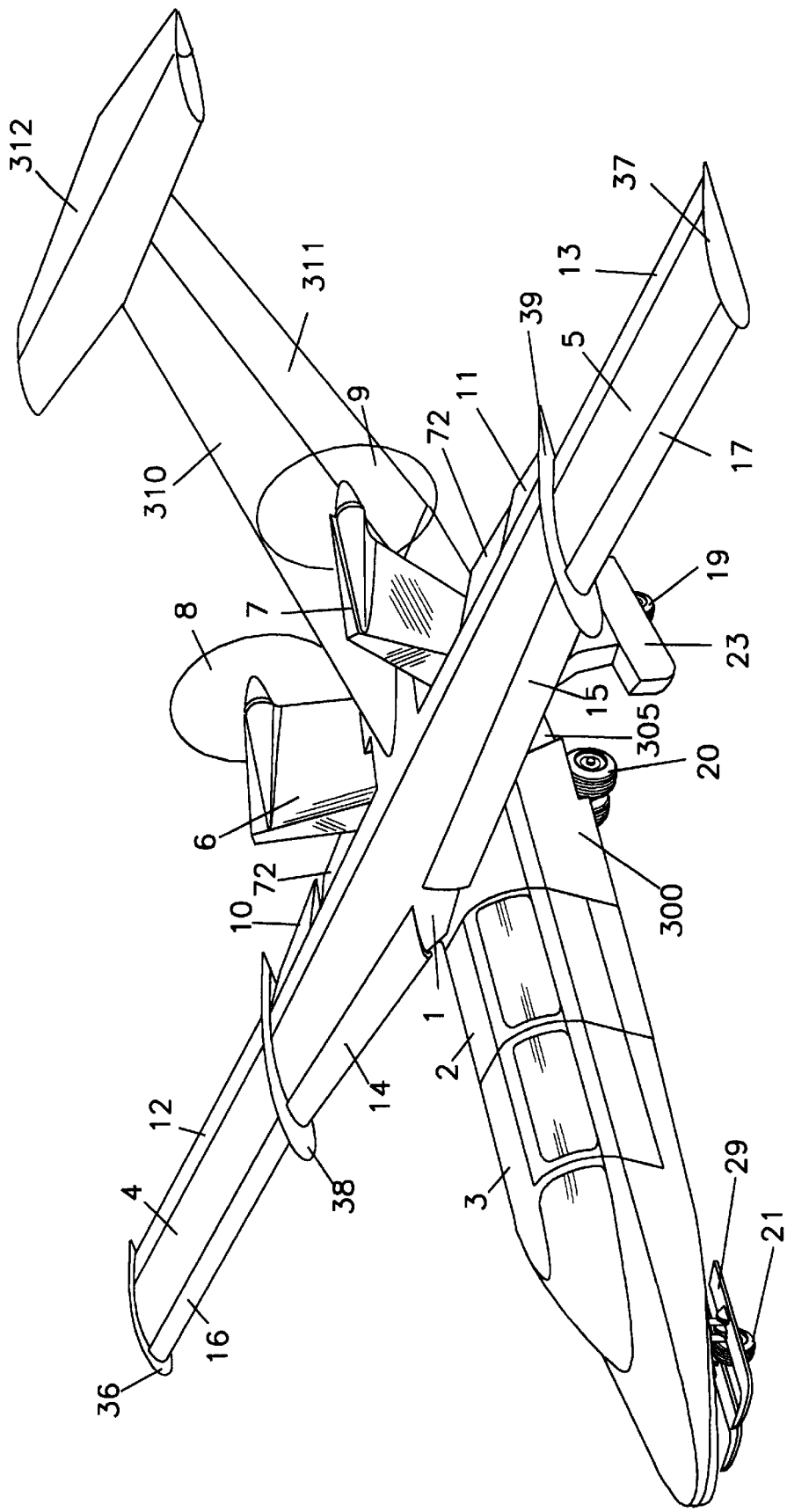
FIG. 1 is a perspective view of an aircraft according to the present invention, showing telescoping wing sections and landing gear fully extended. The aircraft is shown in a configuration advantageous for takeoff and landing on a hard surface.

Referring to FIG. 1, an aircraft according to the invention and featuring several design innovations is illustrated. The overall configuration of this embodiment is of a cantilever high-wing, amphibious monoplane, preferably having a hull-bottomed fuselage and twin rear-facing, pusher-type propellers.

Figure 4:
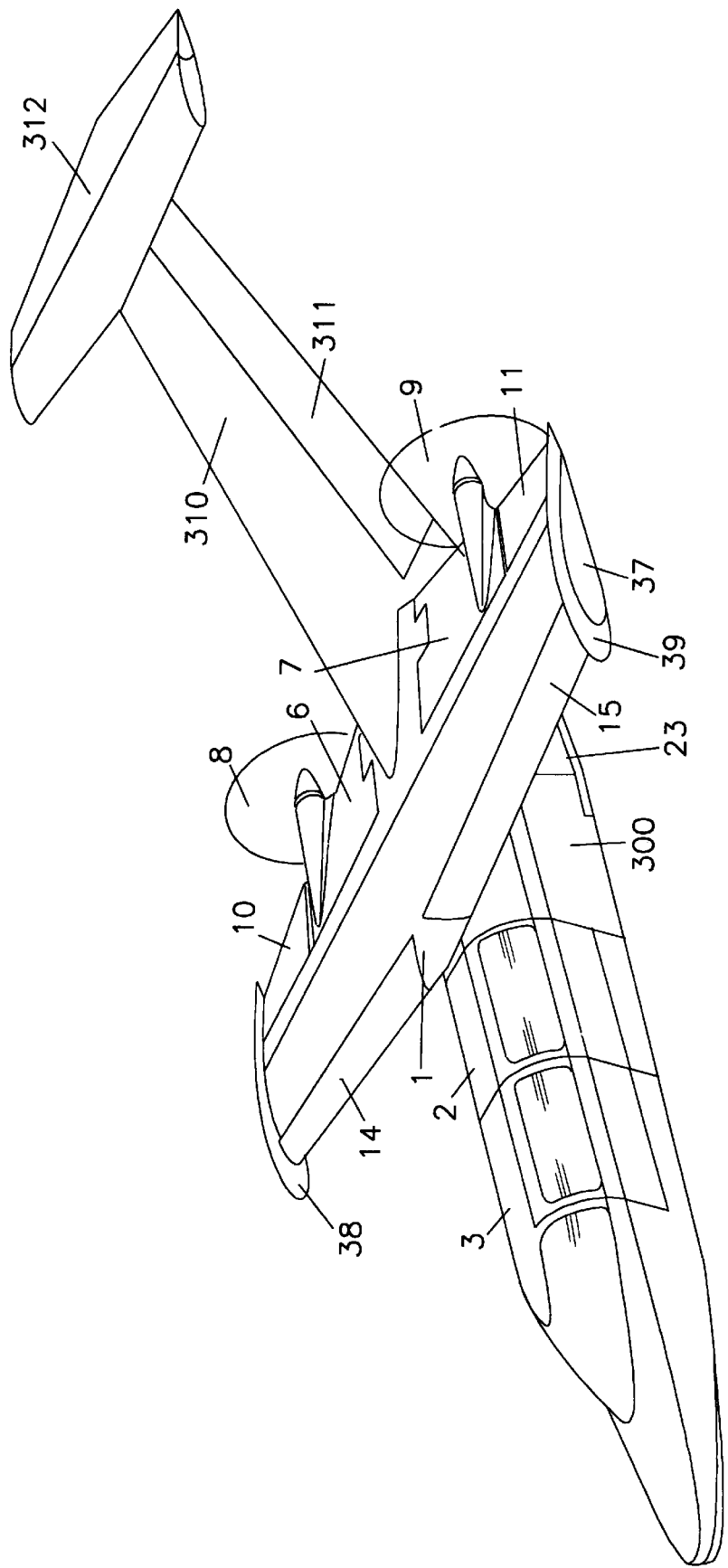
FIG. 4 is a perspective view of an aircraft according to this invention as depicted in FIG. 3, showing telescoping wing sections in a fully retracted position.
Figure 11:
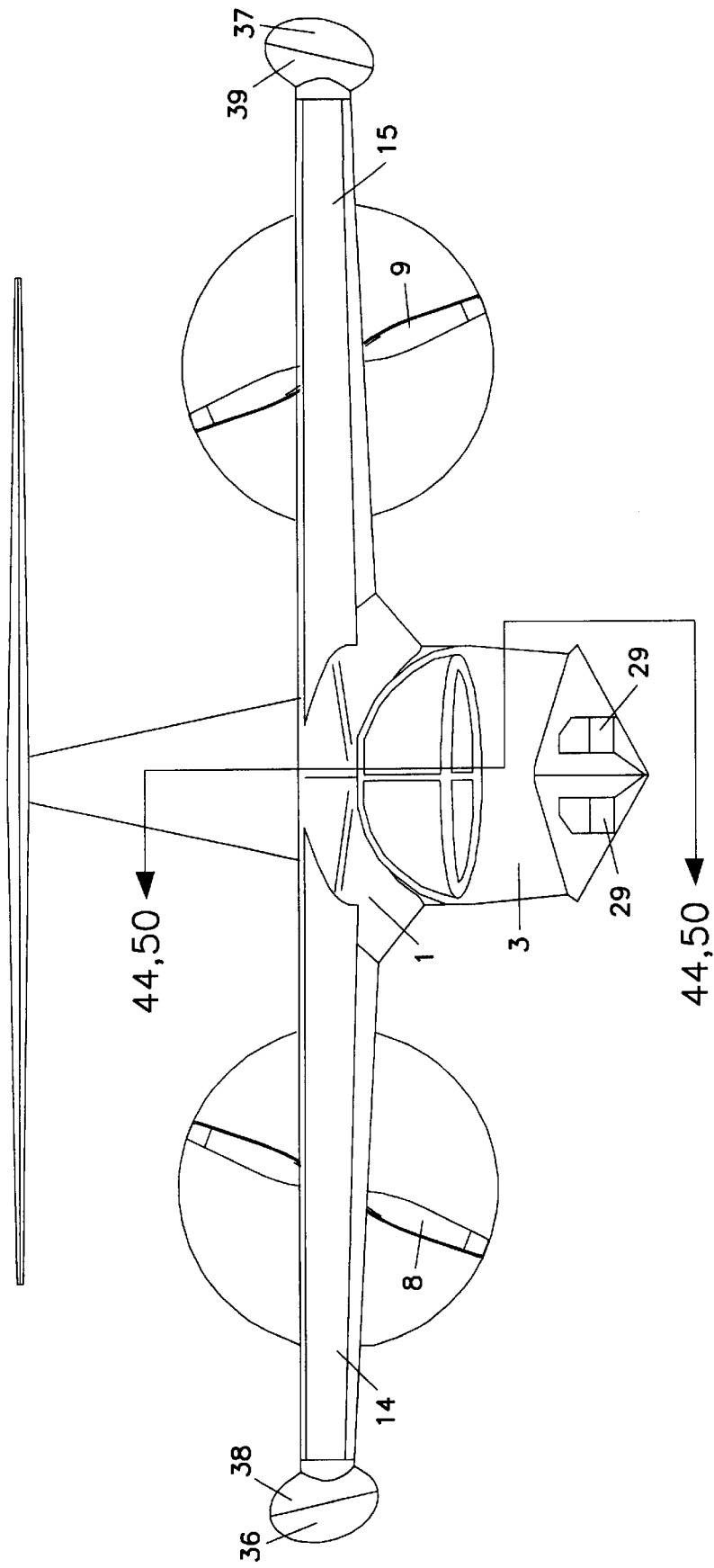
FIG. 11 is a front elevation view of an aircraft according to the invention, shown in a high speed cruise configuration. This is the same configuration as depicted in FIGS. 4 and 5.
Figure 20:
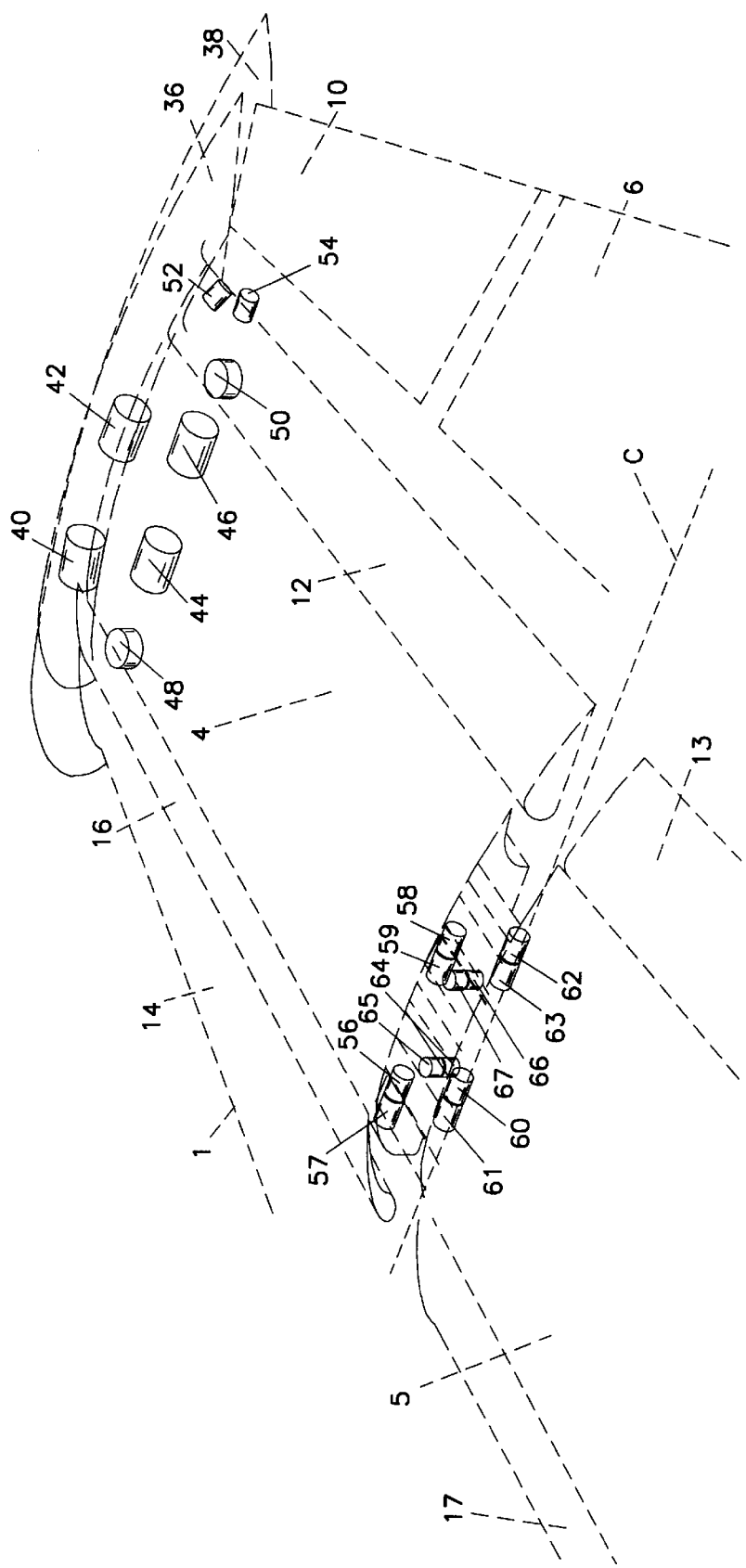
FIG. 20 is a perspective view of the starboard wing extension assembly as depicted in FIG. 16, showing its position relative to the main wing section (shown in phantom lines) when the extension panel is fully retracted (ref.

The wings are compound in structure, comprising a main wing section (1) fixed to the main fuselage structure (300), port and starboard leading edge slats (15 and 14, respectively), and port and starboard main ailerons (11 and 10, respectively). The main fuselage section includes an aft tail section (310), shown in FIG. 1 as a cantilever T tail, with steering surfaces including a rudder (311) and an elevator (312). The primary ailerons 10 and 11 of the fixed main wing section (1) are aerodynamically shaped surfaces on the trailing edges of the wing section and are used for control of the aircraft motion around the longitudinal axis (roll control), primarily at high speeds. The main wing section (1) also houses two telescoping extendable wing sections (4 and 5), which can be extended (pictured) or fully retracted within the main wing section (1), as illustrated in FIGS. 4, 11 and 20. The extendable wing sections (port, 5; starboard, 4) also have leading edge slats (port, 17; starboard, 16) and ailerons (port, 13; starboard, 12), as on the main wing section (1). The leading edge slats (14 and 15) of the fixed wing section (1) are (preferably) forwardly extendable to change the lift characteristics of the compound wing, and the ailerons (10–13) are trimmed to steer the aircraft in flight. Preferably the port main wing aileron (11) and the port extension panel aileron (13) are actuated by the same or connected mechanisms, and the starboard main wing section aileron (10) and the starboard extension panel aileron (12) are similarly co-actuated, so that the movements of both sets of ailerons are completely coordinated and may be effected without using multiple controls. Likewise, it is preferred that the leading edge slats (14 and 15) are co-actuated, so that their operation is coordinated and requires manipulation of a minimum number of controls.

In most preferred embodiments, the compound main wing section (1) further includes recesses for accepting pivoting propeller mounts (6, 7), which may be rotated to raise the propellers above the level of the wing (preferable for water landings) or to nest the propeller mounts in recesses in the wing (see, FIGS. 3–5) to bring the propellers even with the wing surface (preferable for climbout and cruising flight).

Figure 36:
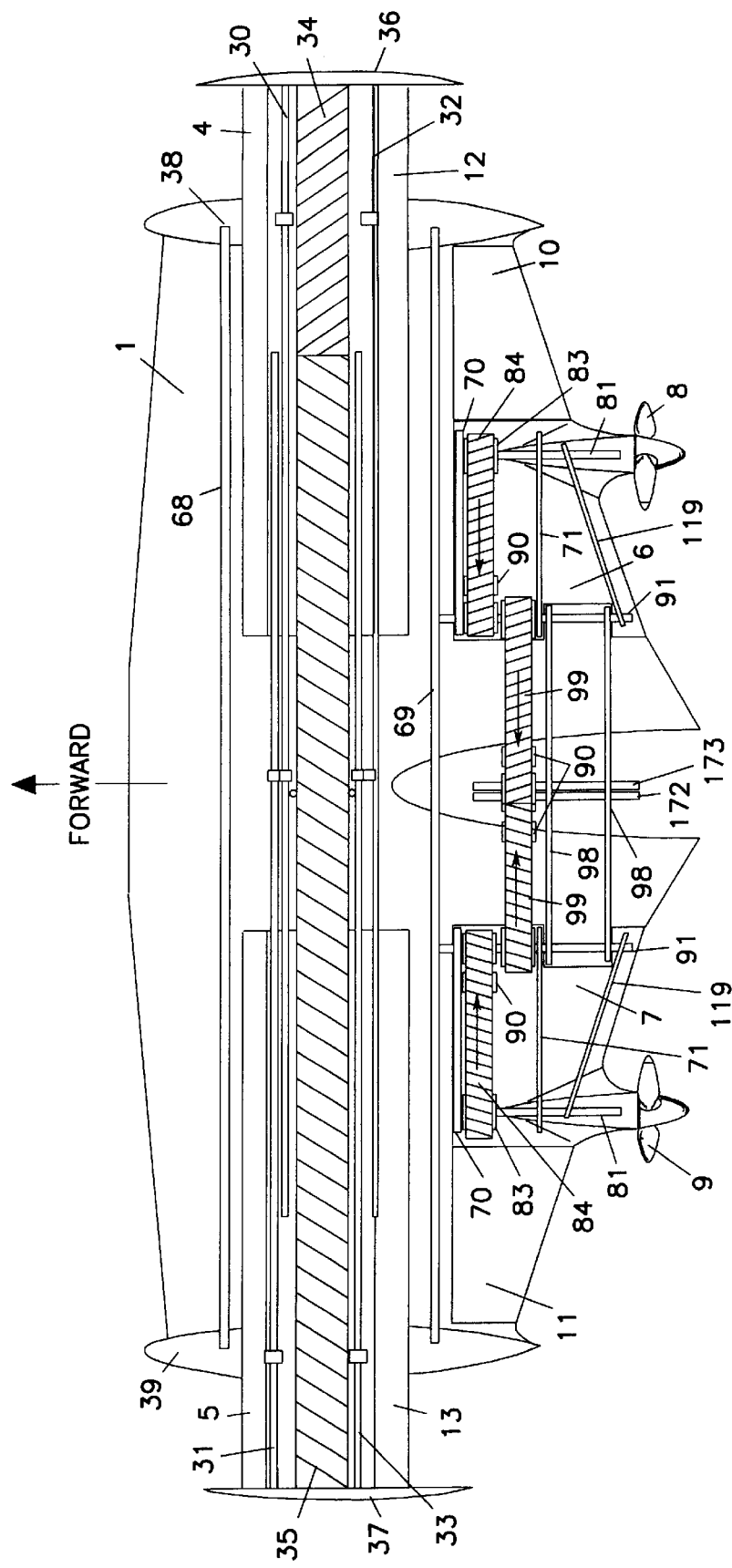
FIG. 36 is a schematic plan view looking down on a compound wing structure according to the invention and a preferred belt drive system for turning pusher-type propellers mounted in pivoting armature mounts according to the invention. The drawing shows the relative positions of the port wing extension panel (5) and the starboard wing extension panel (4) inside the fixed wing section (1). Also visible in this schematic view are structural components of the wing extension panels, i.e., front (31) and rear (33) lift spars of the port wing extension assembly and port drag spar (35) (diagonal lines), as well as the starboard front (30) and rear (32) lift spars and drag spar (34) (cross-hatched) of the starboard wing extension assembly. The wing extension panels are shown partly extended, and the interlocking juxtaposition of the supporting spars (30, 31, 32, 33, 34, 35) within the fixed wing structure (1) is also shown. Also illustrated in FIG. 36 is a preferred arrangement of port (diagonal lines) and starboard (cross-hatched) drive belts (84, 99) for actuating port and starboard propellers (9 and 8, respectively) via propeller drive shafts (81).

The compound wing structure described herein lends several advantages to an aircraft. When the extendable wing panels (4, 5) are fully retracted and thus completely housed within the fixed main wing section (1), out of the airstream, the wing span of the aircraft is considerably shortened (e.g., reduced almost 50%), giving the aircraft increased maneuverability and higher cross-wind stability. The ability to retract the wing panels (4, 5) and thereby significantly reduce the wing span leads to improved safety characteristics for the aircraft in that the wing bending stresses in the cruise and maneuvering configurations (see, FIGS. 4 and 5) are reduced. Wing stresses are also reduced by the interlocking juxtaposition of the supporting spars (discussed, infra; ref. FIG. 36) of the extendable wing sections, when the wing sections are fully retracted. The interlocking support spar design also makes it possible to increase the wing span up to 90–95% while maintaining the structural integrity and operability of the wing, a capability that was not attainable with previous designs.

The ability to extend the extendable wing sections (4, 5) while in flight makes aircraft according to the present invention ideal for pilot training by providing the capability of simulating the flying characteristics of a wide variety of aircraft. When the extension panels are retracted, the aircraft has speed, maneuverability and wing stress-bearing characteristics similar to aerobatic or military combat aircraft; when the wing extension panels are fully extended, the aircraft simulates the lower stall speed, greater lift and high altitude flying characteristics of STOL, commuter and patrol aircraft; and with intermediate, variable extension of the telescoping wing extension panels, flight characteristics can be varied to match those of other types of aircraft or to tailor the aircraft's properties in-flight to meet changing air and wind conditions, or to prepare for landing on or takeoff from a variety of different surfaces.

The retractable wing section feature also makes the aircraft of this design suitable for full-scale aerodynamic testing of new airfoil shapes in-flight. For example, new airfoil designs may be fitted to the aircraft as extendable wing sections (4, 5), gradually and safely extended while the aircraft is in flight, and retracted out of the airstream if undesirable characteristics are detected.

Additional advantages provided by the telescoping wing features include improved safety in conditions of ice accumulation on the wings by virtue of the ability to retract a major portion of the wing during ice accumulation and extend said wing sections (free of ice) during landing. The aircraft may also convert from a relatively long wing span that is advantageous for takeoff and landing, fuel efficient long range flight, and high altitude flight to a shorter wing span that is efficient for high speed flight and advantageous for storage and operation around obstacles (such as other aircraft) on the ground or in underdeck storage on a ship. This wing design also provides high wing loading (weight per wing area) during cruise (retracted wing panels), which gives pilot and passengers a relatively smooth ride through turbulent air, and a low wing loading (extended wing panels) during takeoff and landing to provide an improved operational safety margin at low airspeeds (greater lift, lower stall speeds) and lower landing speeds, resulting in a reduced potential for damage or injury in landing accidents. This wing design also provides a means of expanding wing surface area for carrying larger payloads or a larger quantity of fuel for long trips, or a means of reducing wing surface area for more efficient cruising flight with minimum payloads or low fuel.

Referring again to FIG. 1, the fixed main wing section (1) and an optional fuselage extension module and cabin extension assembly (2) are fixedly attached to the main fuselage section (300). An upper cockpit assembly (3), attached to a forward cabin module (233 in FIG. 62) that houses the forward landing gear (e.g., 21 and 29), is attached end-to-end to an upper cabin extension assembly (2) and a cabin extension module (234 in FIG. 62), to provide a continuous enclosed cockpit and cabin area forward of the main fuselage section (300). Alternatively, as pictured in FIG. 5, the forward cabin module and the upper cockpit assembly (3) may be attached end-to-end to the main fuselage section (300), e.g., where no additional cabin/cargo space or a smaller, lighter weight aircraft is desired. The nose assembly (3), any fuselage extensions (2), and the main fuselage section (300) together comprise the fuselage and tail of the aircraft as a whole.

The front landing gear are comprised of elements such as the front wheel (21) and the front skis (29) and may be mounted in and attached to the forward section of the fuselage through support and extension/retraction members explained in more detail infra.

The wing extension panels (4 and 5) are mounted inside the fixed wing section (1) so as to be simultaneously extendable laterally out from the starboard and port wing tips (38 and 39, respectively) or simultaneously retractable into the fixed wing section (1). When fully retracted, the extension panels (4 and 5) are completely enclosed within the fixed wing section (1) of the aircraft, and the extension panel wing tips (36 and 37) meet and preferably nest into the fixed wing tips (38 and 39) to form an aerodynamic teardrop wing tip. (See, e.g., FIGS. 4 and 7.)

The embodiment of FIG. 1 also shows curved mounting armatures (6 and 7) which are pivotally attached to the rear of the fixed wing section (1), near the fuselage. The armatures (6 and 7) not only provide a mount for the propellers (8 and 9) but also provide a mount for rear stabilizer landing wheels (19 and 20) and flotational pontoon assemblies (22 (not visible in this figure) and 23), which serve as outriggerlike stabilizers during amphibious operations. The mounting armatures (6 and 7) are generally pan-shaped when viewed edge-on (see, e.g., FIG. 5 and other front elevations), and the curvature of the armatures permits the pilot to bring the wheeled landing gear (19 and 20) or alternatively the pontoon landing gear (22 and 23) into position for use by causing the armatures to rotate about their pivotal attachment. Additionally, because the armatures (6 and 7) also serve as a mount for the propellers (8 and 9), rotating the desired landing gear (wheels or pontoons) into position for use simultaneously will change the positions of the propellers relative to the wing and fuselage. The armatures are shaped so that at the maximum rotation of the lower end of each armature away from the fuselage of the aircraft, that is, to expose the pontoon landing gear (22 and 23), the propellers simultaneously are rotated away from and above the wing, toward the centerline of the aircraft, so that the propellers are raised to a maximum height above the water and are shielded from water spray by the wings and fuselage. (See, FIG. 9.)

The mounting armatures (6 and 7) are preferably designed so that the entire propeller can be raised above the surface of the wing when a water landing is attempted. Water spray damages propellers: water droplets can cause pitting of the propeller blades, the tips of which are moving at near-sonic speeds. In conventional amphibious aircraft designs, at least the lower arc of the propeller is often exposed to water spray, but in preferred embodiments of this invention, the mounting armatures will cause the entire arc of the propeller to be shielded from water spray by the wings, when the propellers are positioned for a water landing. For hard surface landings, also, the armatures (6 and 7) will position the propellers above the wing, where the propellers are much less likely to contact objects on the ground or to come into contact with people moving around the aircraft.

In the most preferred embodiments, the armatures (6 and 7) are additionally shaped to nest in recesses of the wings directly above the flaps (72, actually split flaps, only a fraction of the thickness of the wing) and on either side of the fuselage (305), when the armatures are pivoted to align the propellers with the surface of the wing and to retract the landing gear. This means that below the pivot point, the outer surfaces of the armatures (6 and 7) when fully rotated will become flush with the surface of the main fuselage section (300); and above the pivot point, the outer surface of the armatures (6 and 7) when fully rotated will be flush with and become part of the aerodynamic surface of the fixed wing section (1).

Recognizing that many modifications and alternative choices of design or materials are possible from the description herein, a most preferred embodiment contemplated for the present invention will have the general configuration depicted in FIG. 1 with the following dimensions:

center (fixed) wing section (1 in FIG. 1): NACA $66_3$-018 at root and tip, dihedral 3 degrees, sweep −3.28 degrees (forward) at the ¼ chord, with two internally mounted telescoping wing extension panels, 0 degrees sweep;
wing span (panels fully retracted): 26 feet (7.92 meters);
wing span (panels fully extended): 50 feet (15.24 meters, 92.31% increase over fully retracted);
wing chord at fixed root: 10 feet, 8 inches (3.25 meters);
wing chord at fixed tip: 6 feet, 8 inches (2.03 meters);
wing chord at extension root: 3 feet, 6 inches (1.12 meters);
wing chord at extension tip: 3 feet, 8 inches (1.12 meters);
wing aspect ratio (retracted) 3.125;
wing aspect ratio (extended) 8.33;
moveable leading edge slats on center wing section, fixed leading edge slats on extension sections;
construction: all wing sections preferably constructed of flush riveted aluminum;
cantilever T-type tail constructed of flush riveted aluminum, having a horizontal stabilizer and an elevator (optionally including servo-tabs);
tailplane span: 14 feet, 7 inches (4.44 meters);
lower fuselage: riveted aluminum for amphibious hull and main fuselage section (300 in FIG. 1);
upper fuselage (cabin): fiberglass composite;
fuselage construction: 3 sections (nose, center cabin, and main fuselage (engine enclosure) including tail section) bolted end-to-end;
overall length: 40 feet (12.19 meters);
overall height: 12 feet, 4 inches (3.75 meters);
wheelbase: 20 feet, 10 inches (6.35 meters);
wheel track: 10 feet, 6 inches (3.2 meters);
propeller diameter: 6 feet, 6 inches (1.98 meters).

Of course, the foregoing dimensions and preferred materials may be modified without departing from the concept of this invention, so long as the inventive features, as recited in the claims, are incorporated.

Figure 2:
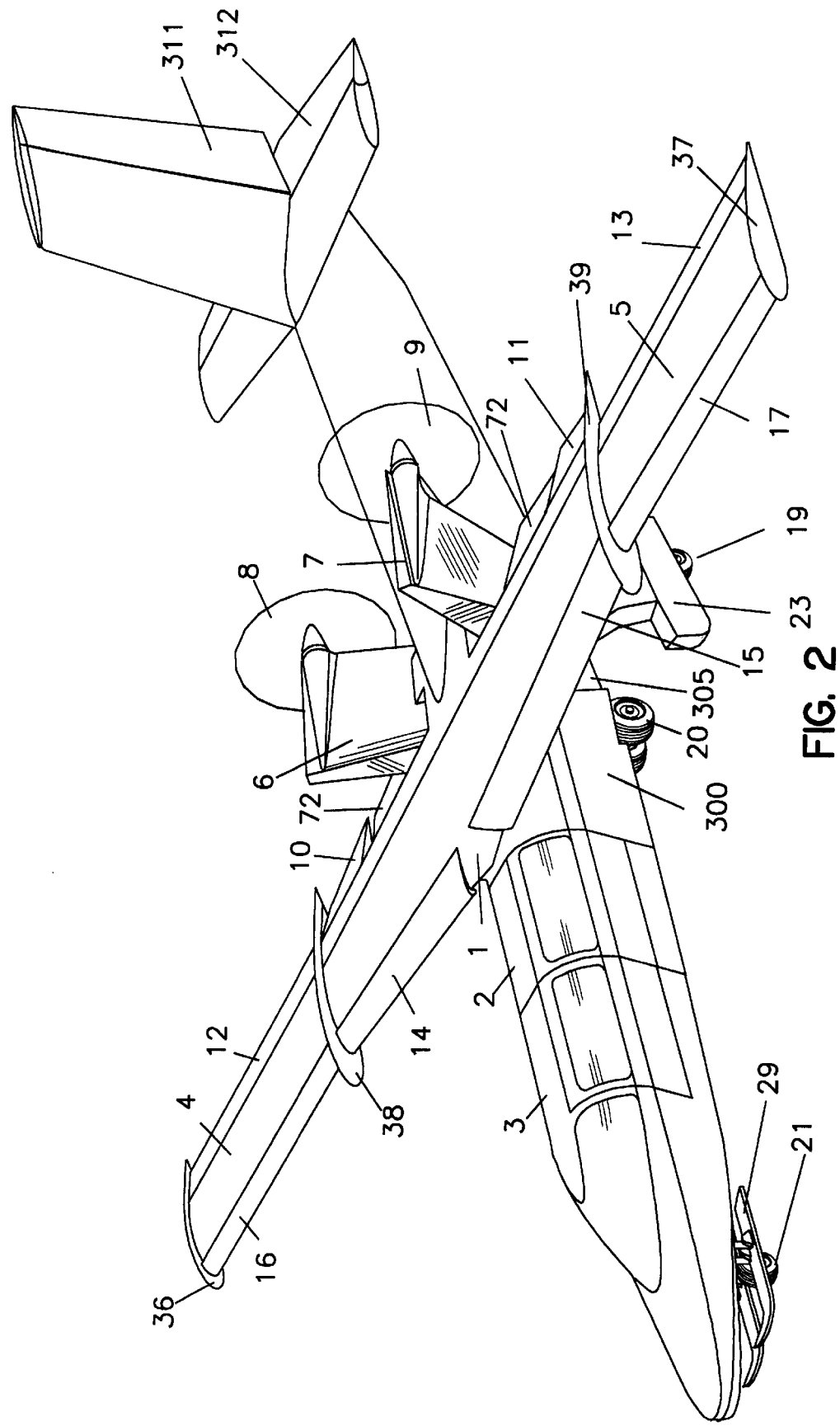
FIG. 2 is a perspective view of an aircraft according to the present invention as illustrated in FIG. 1 but with an alternative, conventional tail design (as opposed to the "T" tail shown in FIG. 1).

Referring to FIG. 2, an aircraft of the same general configuration as illustrated in FIG. 1 is shown, except that an alternative tail section in the shape of an inverted "T" is shown, equipped with a rudder (311) and a single elevator plane (312). All other features of this aircraft are as discussed above for FIG. 1. Most preferred embodiments of the invention will have the T tail configuration of FIG. 1, wherein the tail surfaces are in the direct prop wash when the propellers are raised above the wing and are out of the prop wash when the propellers are lowered to be level with the wing. This design lends maneuverability to the aircraft at landing and takeoff speeds, when maneuverability is most critical.

Figure 51:
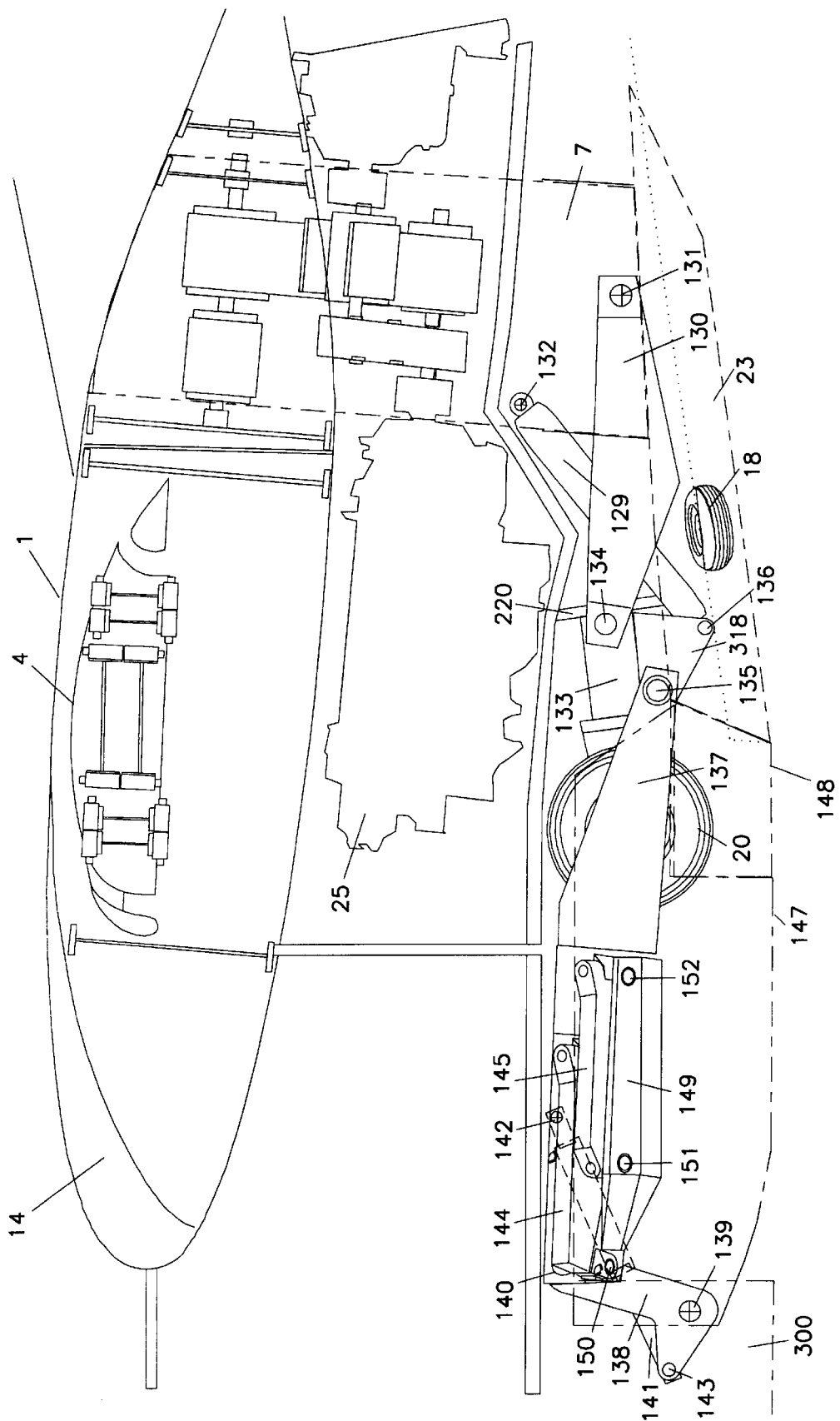
FIG. 51 is a cross-sectional view similar to FIG. 50, except the outer fuselage panels are shown by phantom lines in order to expose the structures of the main central landing gear. The components of a preferred main central landing gear according to the invention are shown, fully folded and enclosed within the fuselage, i.e., in their fully retracted and stowed position appropriate during flight. The relative positions of the inboard engines (shown in silhouette) and belt drive mechanisms, landing gear, primary fuselage structure, wing structures, and wing extension assemblies are shown in this figure.

Including various of the inventive features of this invention into an aircraft design permits incorporation of a unique tail configuration, which is apparent in the embodiments of FIGS. 1 and 2. Inboard mounting of the engines in the aft portion of the fuselage, under and just aft of the wings (ref. FIG. 51) makes the inclusion of an fuselage section aft of the wings undesirable and impractical; therefore, the fuselage can advantageously begin to taper immediately aft of the wings to form a vertical tail section as shown. The tail section can taper in a straight line from the end of the fuselage, in contrast to conventional designs including an aft fuselage, which leads to structural advantages in that stiffening stringers and such members are not bent or made to follow contours and are thus able to withstand greater stresses. The horizontal stabilizer plane and elevator of the tail are supported by a much stronger and stiffer tail structure, and thus undesirable flutter of the tail control surfaces is eliminated. The illustrated vertical tail (FIG. 1) is highly swept aft to balance aerodynamic forces, to reduce drag, to clear the propeller arcs at all propeller positions, etc., which leads to a tail section having a longer chord than normal. This also provides a very long vertical steering surface (rudder), which is believed to be unique to the present design. Modeling studies (discussed infra) of the aircraft have indicated that the unusual span of the rudder does not detract from the performance of the aircraft or lead to undesirable flying characteristics.

Figure 3:
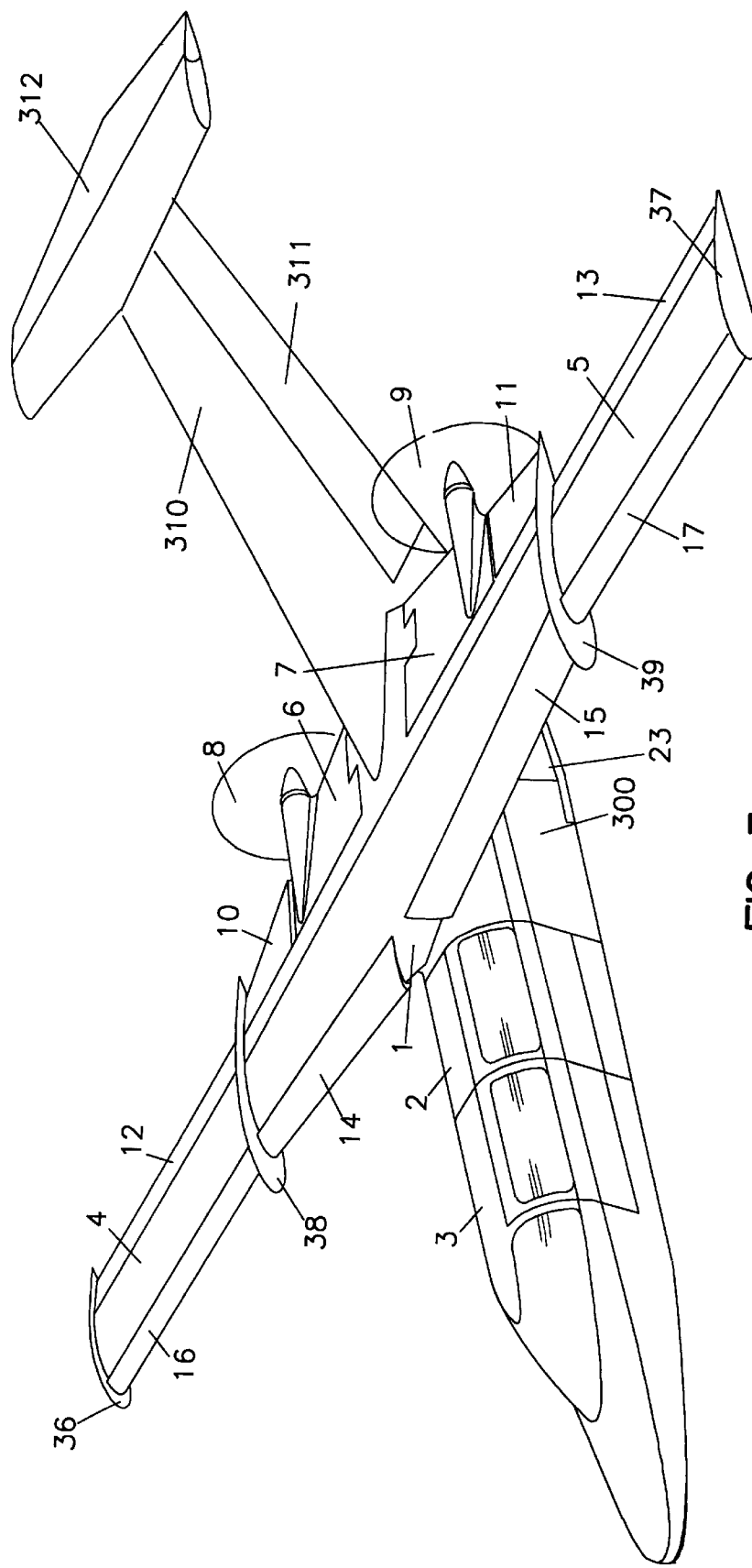
FIG. 3 is a perspective view of an aircraft according to the present invention, with the propeller mounts and landing gear retracted. The aircraft is shown shortly after takeoff or in a configuration suitable for low-speed flight.

Referring to FIG. 3, the aircraft of FIG. 1 is depicted in flight, with the wing extension panels (4 and 5) fully extended. The arc of the propellers (8 and 9 in FIG. 1) is depicted by circles (labeled 8 and 9 here). The forward landing gear (i.e., 21 and 29 in FIG. 1) are not visible in this figure, having been fully retracted into the nose section. Similarly, the curved mounting armatures (6 and 7) are pictured here pivoted to a position such that the rear landing gear (i.e. 19, 20 and 23 in FIG. 1) are retracted and housed within the fuselage section (300) under the wing, and the lower portion of the port armature (7) is seen to nest in the fuselage, flush with the outer surface of the main fuselage section (300). The upper portions of both curved mounting armatures (6 and 7) are pictured here pivoted to a position such that the mounted propellers (8 and 9) are at the level of the wing, and the armatures (6 and 7) are nesting in wing recesses such that the outer surfaces of the armatures (6 and 7) form flush, continuous surfaces with the surface of the main wing section (1). All other aspects of this figure are as depicted in FIG. 1.

Referring to FIG. 4, the aircraft of FIGS. 1 and 2 is shown in flight, with the wing extension panels (4 and 5 in FIG. 1) fully retracted and housed within the main wing section (1). In this configuration and in this port side perspective view, the only part of either wing extension panel visible is the port wing extension panel tip (37), seen here mated with the port fixed wing tip (39) to form an aerodynamic teardrop wing tip. All other aspects of this figure are as depicted in FIG. 3.

Figure 5:
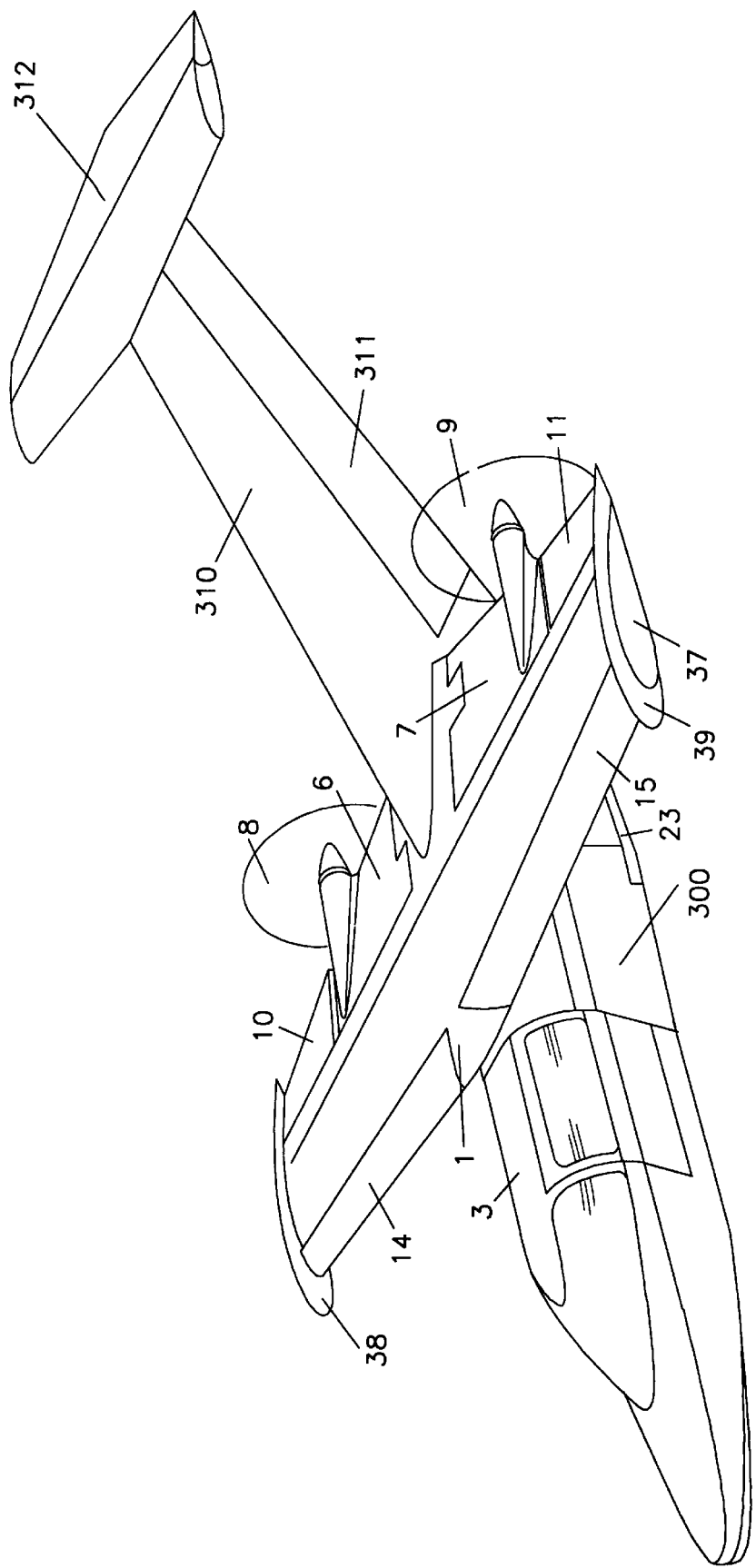
FIG. 5 is a perspective view of an aircraft according to this invention as depicted in FIG. 4, except that a modular fuselage section has been removed to attain a shorter fuselage.

Referring to FIG. 5, an aircraft substantially identical to the aircraft of FIGS. 1 and 4 is shown in flight, with the wing extension panels (4 and 5 in FIG. 1) fully retracted and housed within the main wing section (1). In this configuration, the cabin extension module and upper cabin extension assembly (2) shown in previous figures have been removed, resulting in a shorter fuselage and a decrease in overall aircraft weight. In embodiments of this invention where (as here) the engines are mounted inboard, on the centerline of the aircraft and under the wings, modification of the fuselage in the manner illustrated can be accommodated in the manufacturing steps by simply substituting lighter engines to redistribute the weight of the aircraft. No general re-design of the aircraft is necessary, and no retooling of the manufacturing process must be done. As in FIG. 4, the only part of either wing extension panel visible is the port wing extension panel tip (37), seen here mated with the port fixed wing tip (39) to form an aerodynamic teardrop wing tip. All other aspects of this figure are as depicted in FIG. 4.

Figure 6:
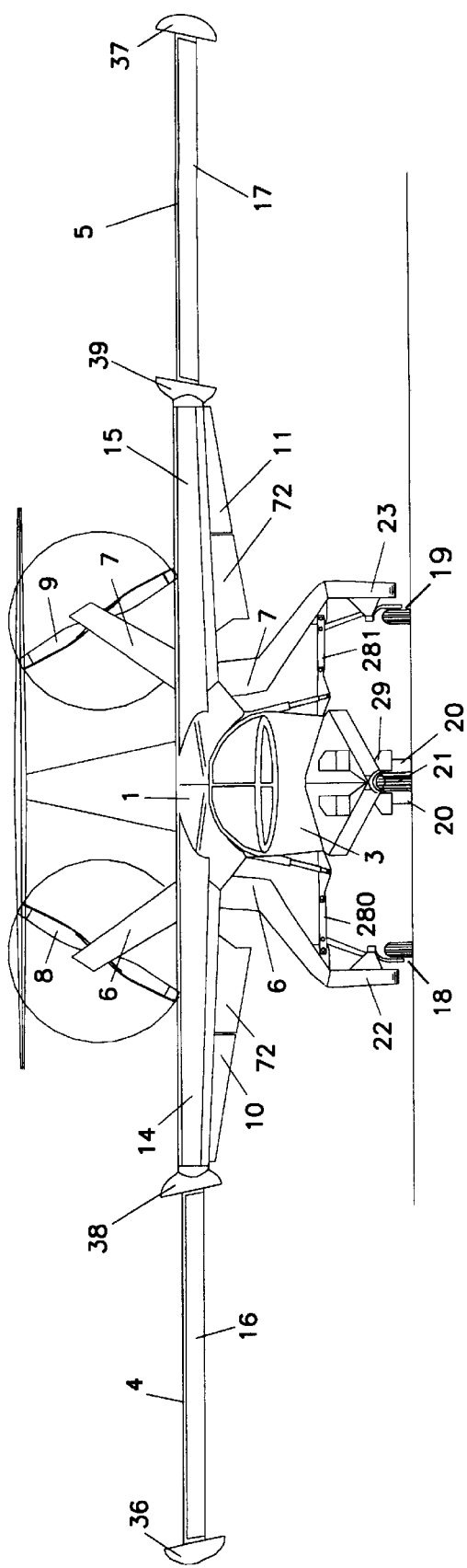
FIG. 6 is a front elevation view of an aircraft according to the invention, shown in the hard surface takeoff and landing configuration similar to FIG. 1.
Figure 7:
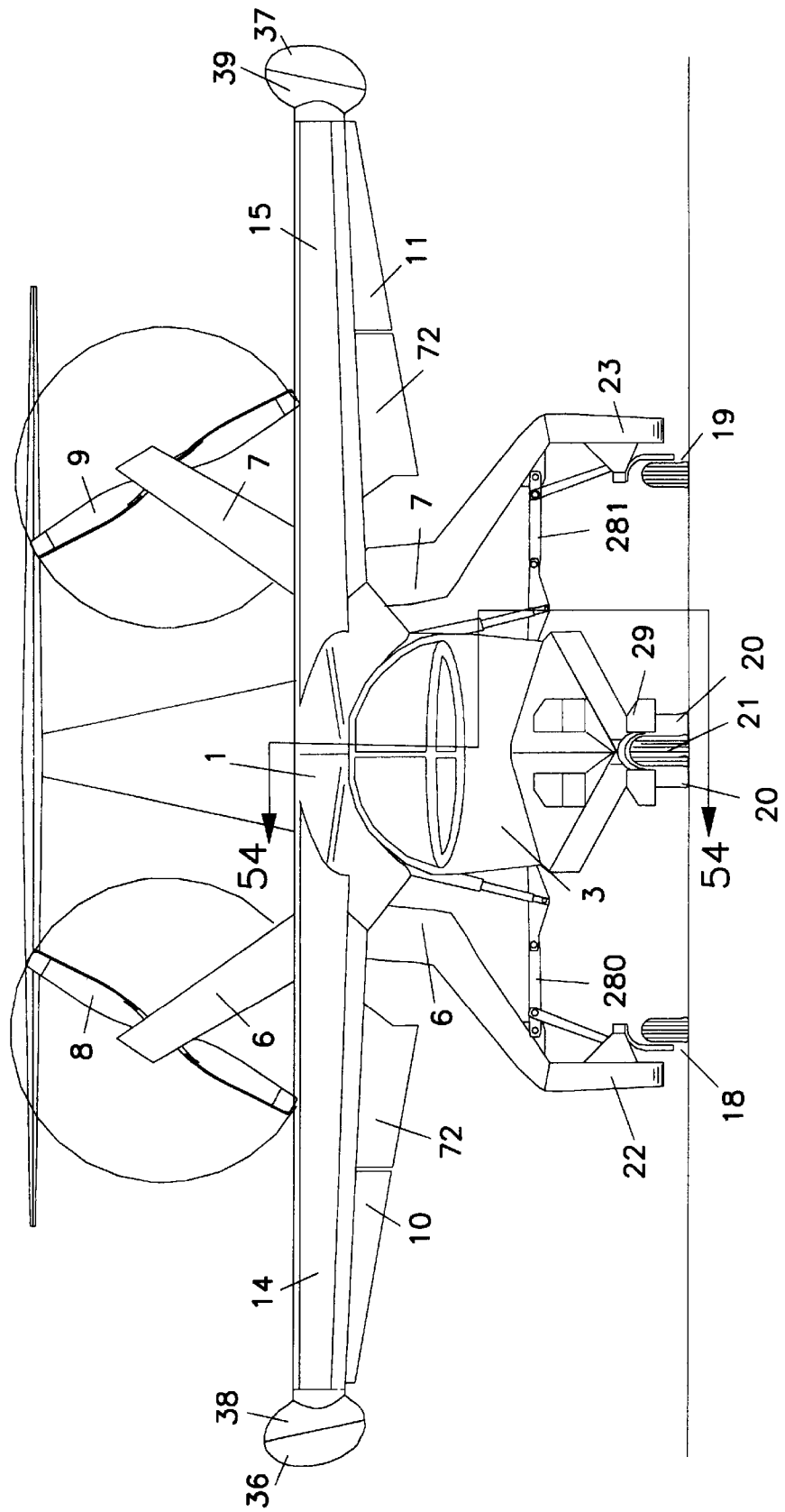
FIG. 7 is a front elevation view of the aircraft as illustrated in FIG. 6, but with telescoping wing panels in a fully retracted position.

Referring to FIGS. 6 and 7, an aircraft according to the invention is shown in frontal elevation, viewed nose-on. The aircraft incorporates the compound wing assembly discussed supra, comprising main wing structure (1) and telescoping extendable wing sections (4 and 5). As pictured, the fixed wing section (1) also comprises leading edge slats (14 and 15) and teardrop or bullet-shaped wing tips (38 and 39). The wing extension panels (4 and 5) are also pictured with leading edge slats (16 and 17) and wing tip caps (36 and 37), which mate with the fixed wing tips (38 and 39) to form aerodynamic teardrop wing tips, when the wing extension panels (4 and 5) are fully retracted within the fixed wing section (see, FIG. 7). Ailerons (10, 11) and flaps (72) are also shown.

The aircraft illustrated in FIGS. 6 and 7 also incorporates curved mounting armatures (6 and 7), pivotally attached to the roots of the wings, each armature comprising an upper end and a lower end with respect to the pivotal attachment, the upper end of each armature being equipped and configured to accept a propeller assembly or to act as a propeller mount, and the lower end of each armature being equipped and configured to accept or to act as a mount for a compound landing gear comprising stabilizing wheels (18 and 19) and pontoon members (22 and 23). Propellers (8 and 9) are shown mounted on the upper ends of the armatures (6 and 7). The position of the ends of the mounting armatures in relation to the fuselage of the aircraft (i.e., the degree of rotation about the pivotal attachment) is preferably controlled by means of multilink actuating struts (280 and 281). Extension of the struts (280 and 281) pivots the armatures so that the upper end of each armature (6 and 7) and thus the propeller mounts are rotated upward from the level of the wing and inward toward the centerline of the fuselage; extension of the struts (280 and 281) simultaneously pivots the armatures so that the lower end of each armature (6 and 7) and thus the compound landing gear (18, 19, 22, 23) are rotated outward from the fuselage. At an intermediate point of extension (shown) of the actuating struts (280 and 281), the armatures are in a position wherein the stabilizing rear landing wheels (18 and 19) are swung into the proper orientation to assist in supporting the aircraft during a hard-surface landing. At full extension (not shown here) of the actuating struts (280 and 281), the armatures (6 and 7) are rotated to a position where the upper ends of the armatures and the propeller mounts are at a maximum distance above the wing structure (1) and the pontoon members (22 and 23) of the compound landing gear are in the proper orientation to assist in supporting the aircraft during an amphibious landing. The armatures (6 and 7) are preferably shaped so that when the actuating struts (280 and 281) are fully retracted, the upper ends of the armatures (6 and 7) nest in recesses (not shown) in the fixed wing section (1), with one surface of each armature becoming flush with the aerodynamic surface of the wing and forming part of the airfoil, and the lower ends of the armatures (6 and 7) nest in recesses (not shown) of the fuselage, with the outer surface of lower end of each armature becoming flush with the surface of the fuselage.

Figure 58:
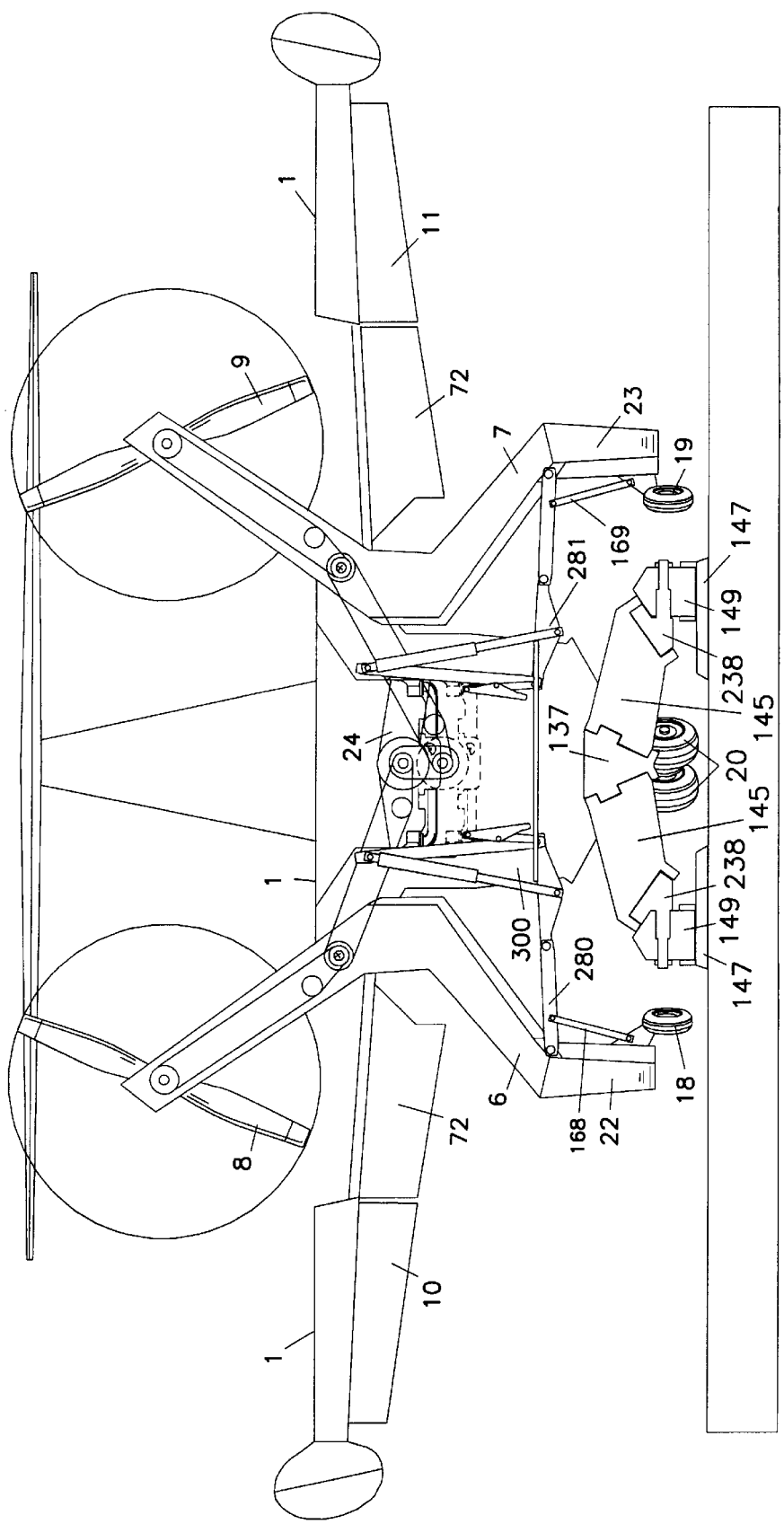
FIG. 58 is a cross-sectional front elevation of the midsection of the aircraft as illustrated in FIG. 56, showing structures of the main central landing gear and stabilizing landing gear components in the configuration appropriate for takeoff and landing on snow. (Cf.
Figure 59:
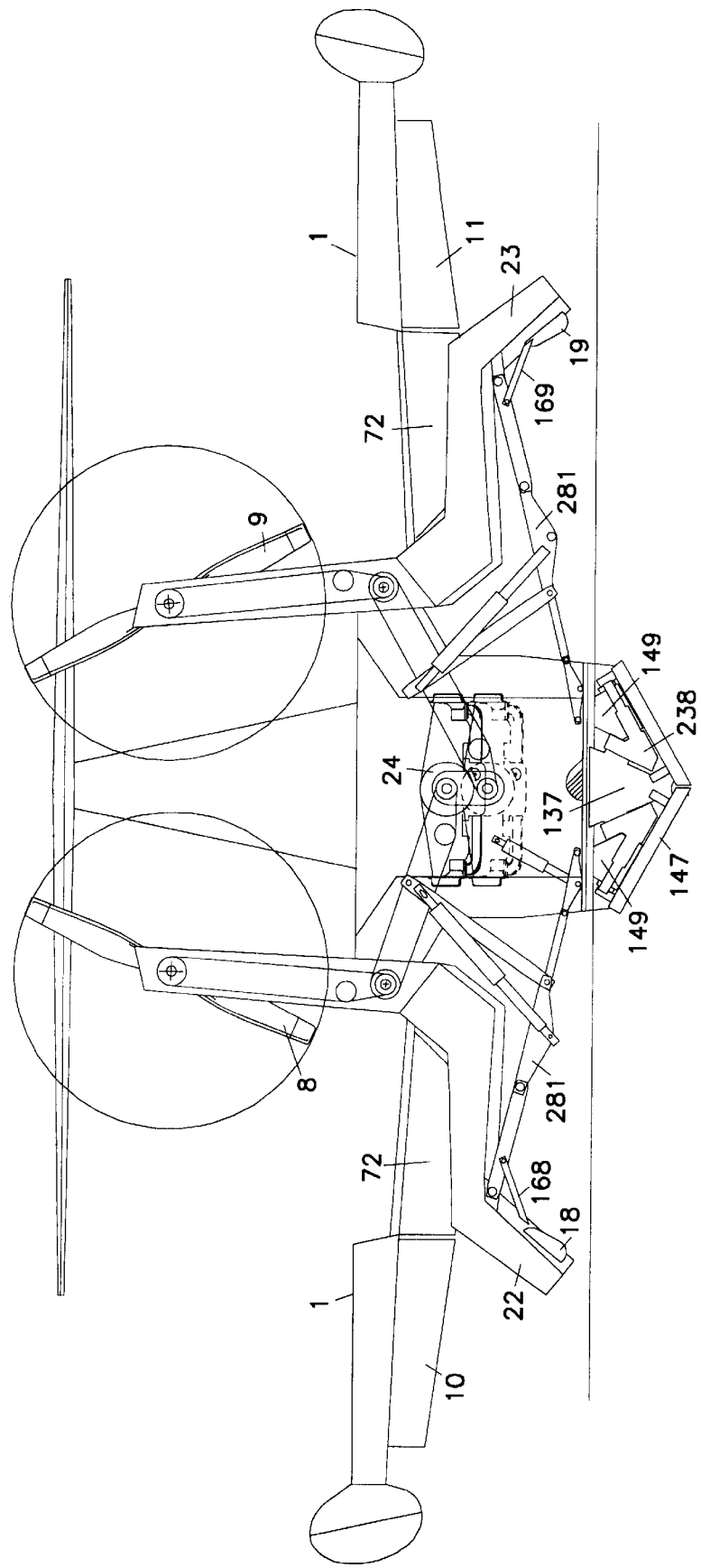
FIG. 59 is a cross-sectional front elevation of the midsection of the aircraft similar to the configuration depicted in FIG. 56, with main central landing gear retracted, showing the mounting armatures (6 and 7), and thus the pontoon subcomponents (22 and 23) fully deployed, i.e., in the configuration appropriate to takeoff and landing on water. (Cf.

Forward landing gear are also illustrated in FIGS. 6 and 7 and are also compound, comprising a steerable forward landing wheel (21) and forward skis (29). The forward landing gear (21, 29) are fully retractable within the nose section of the fuselage, and preferably the lower surfaces of the skis (29), when retracted, form part of the surface of the fuselage and thus do not create any external drag during flight. Steerable rear landing wheels (20) are also depicted in FIGS. 6 and 7, however they are partially hidden in this view by the forward landing wheel (21). (See, FIGS. 56 and 58, item 20.)

Figure 8:
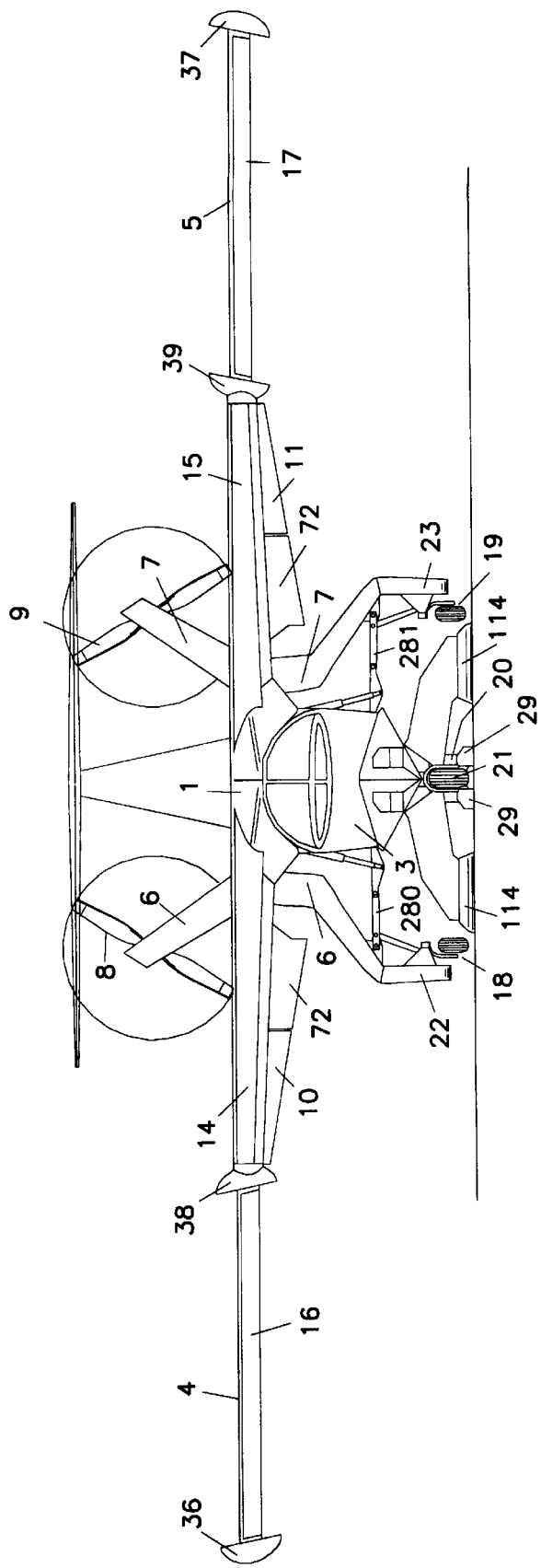
FIG. 8 is a front elevation view of an aircraft according to the invention, shown in the configuration appropriate for takeoff or landing on snow or ice.
Figure 9:
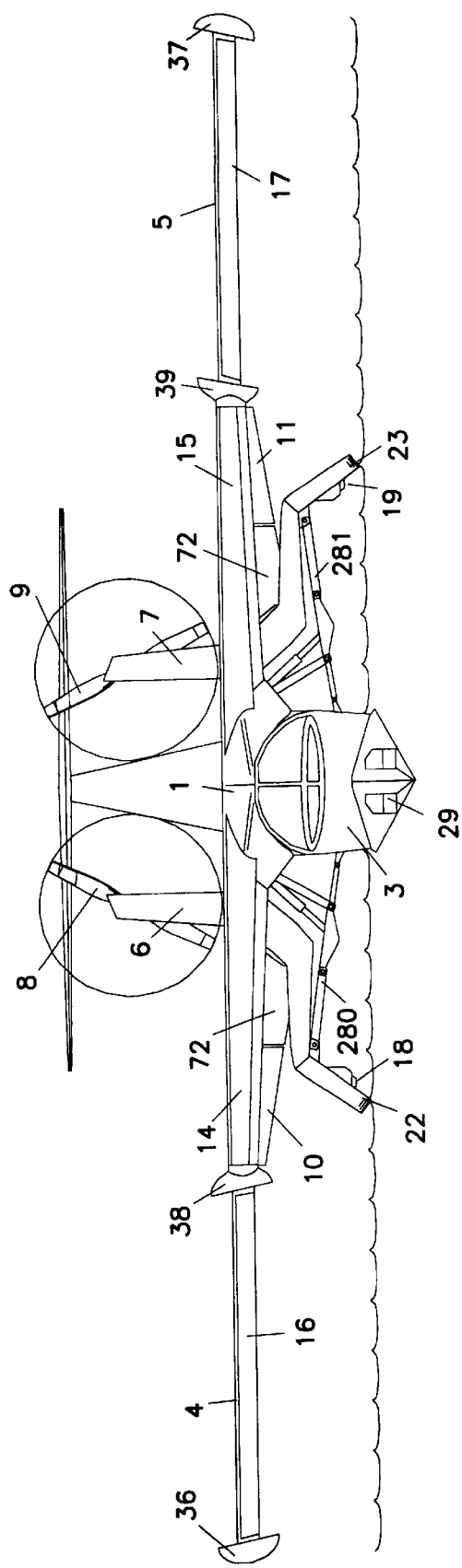
FIG. 9 is a front elevation view of an aircraft according to the invention, shown in a configuration appropriate for takeoff or landing on water.
Figure 10:
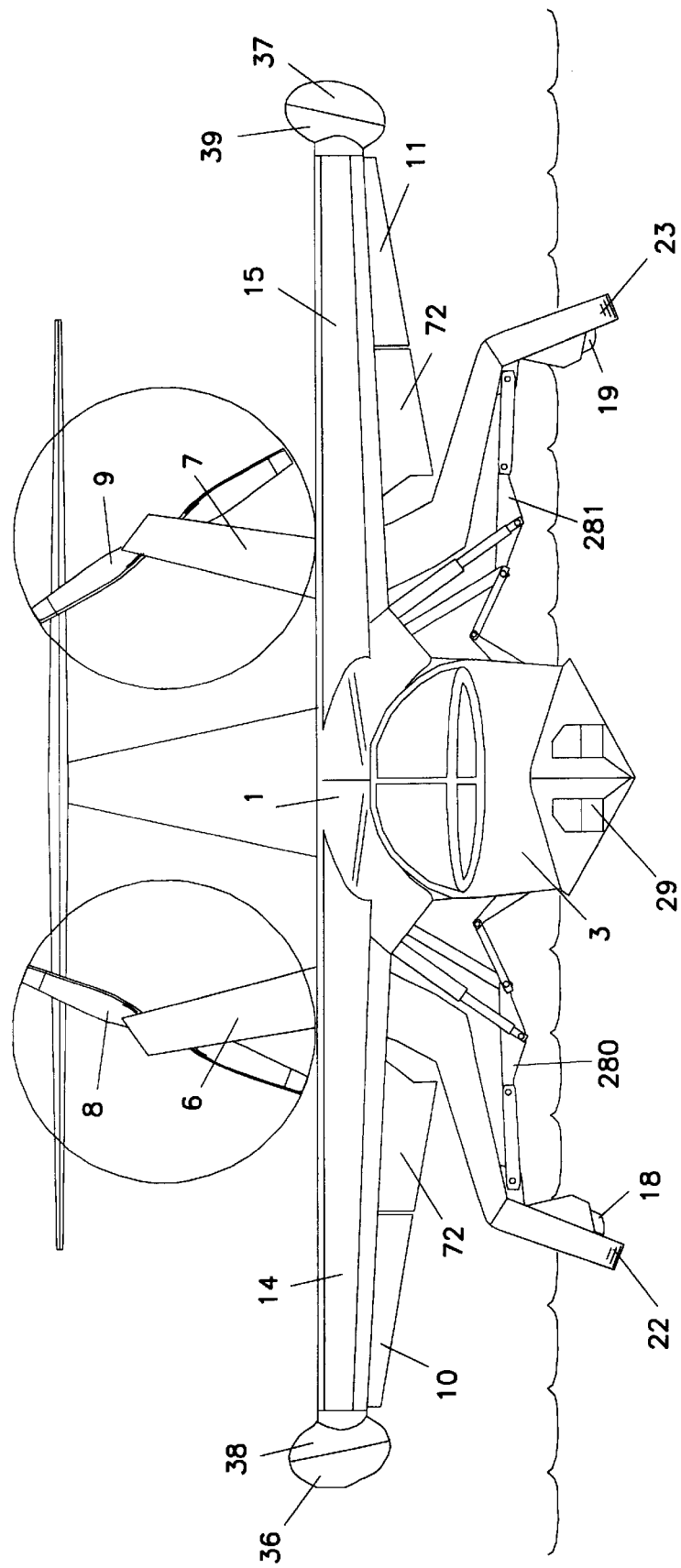
FIG. 10 is a front elevation view of an aircraft as depicted in FIG. 9, in a configuration appropriate for slow speed water taxiing operation.

Referring to FIGS. 8, 9 and 10, an aircraft similar to that depicted in FIG. 6 is shown, except that in these figures positioning of the compound landing gear in orientations appropriate for snow landing/takeoff (FIG. 8), water landing/takeoff (FIG. 9), and slow taxiing in water (FIG. 10), respectively, are illustrated.

In FIG. 8, a frontal view is shown of the forward skis (29) and the rear skis (114), deployed to a position where they are acting as the primary landing gear for the aircraft. All other aspects of FIG. 8 are as illustrated in FIG. 6.

In FIG. 9, a frontal view is shown of the pontoon members (22, 23), rotated into proper position to act as stabilizing outriggers during a water landing. This positioning of the outrigger pontoons (22, 23) is effected by full extension of the multilink actuating struts (280, 281). Note that full extension of the multilink actuating struts (280, 281) causes the stabilizing rear landing wheels (18, 19) to be retracted into recesses in the lower end of the armatures (6 and 7). The primary landing gear for the aircraft in such an operation is the hull-like fuselage, the forwardmost section of which is visible in this frontal elevation. The hull fuselage of the embodiment of FIG. 9 has a pronounced "V" shape in cross-section (high deadrise angle). In contrast to shallower hull designs, the V-shaped hull improves handling of the aircraft in choppy water and lowers the G load on the hull during water landings. All other aspects of FIG. 9 are as illustrated in FIG. 6.

FIG. 10 presents the same view of the aircraft as in FIG. 9, except that the auto-retracting rear stabilizing wheels (18, 19) have been partially lowered and the lower ends of the armatures (6, 7) have been rotated slightly downward and inward by articulation of the innermost link of each of the multilink actuating struts (280, 281). Flotational elements (18, 19, 22, 23) have thus been forced downward against the surface of the water, thereby leveling the aircraft and improving the taxiing performance of the aircraft at slow speeds on water. All other aspects of this figure are the same as in FIG. 6.

Figure 12:
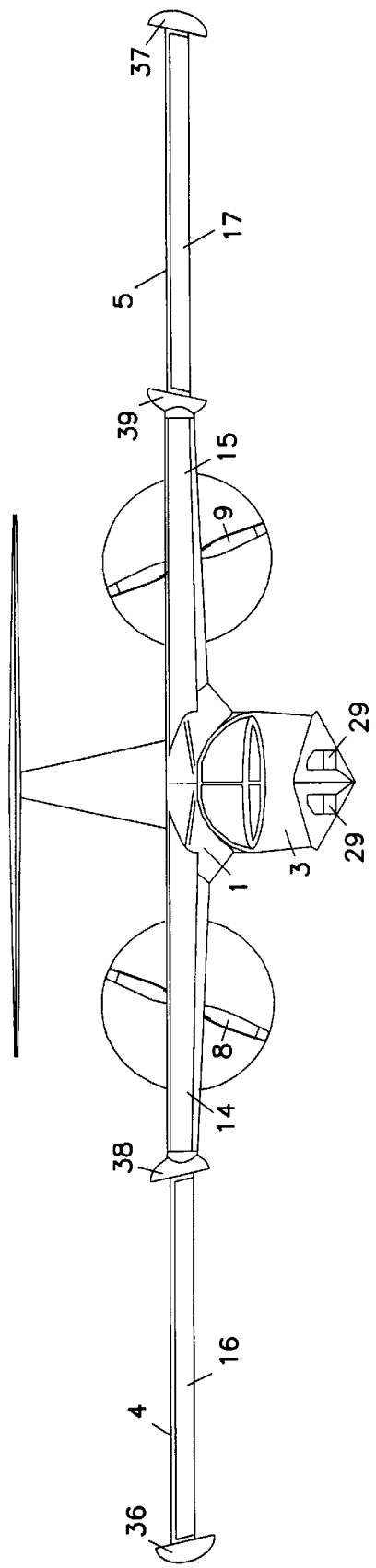
FIG. 12 is a front elevation view of an aircraft as depicted in FIG. 11, shown in a low speed configuration, with telescoping wing sections fully extended. This is the same overall configuration for the aircraft as illustrated in FIG. 4.

Referring to FIGS. 11 and 12, an aircraft according to the invention and as depicted in FIGS. 6 and 7 is shown in frontal elevation, with the extendable wing panels (4 and 5 in FIG. 12) fully retracted in FIG. 11, so that the wing tip caps (36 and 37) are mated with the fixed wing tips (38 and 39) to form aerodynamic teardrop wing tips, and with the extendable wing panels fully extended in FIG. 12. The main wing structure (1), the leading edge slats (14, 15, 16 and 17), the forward section with upper cockpit assembly (3), and the propellers (8 and 9) all are as depicted in FIGS. 6 and 7.

The forward skis (29) are illustrated in FIG. 11 in their fully retracted position, wherein the lower surface of the skis is flush with the fuselage surface. It is an especially preferred aspect of aircraft according to this invention that all landing gear may be fully retracted within the fuselage, out of the airstream, and that landing gear doors (and their associated mechanisms) may be eliminated, since the ski elements are preferably designed to merge with the fuselage. The landing gear designs disclosed herein are believed to be the first designs that combine full retractability of all landing gear elements (wheels, skis and pontoons) and elimination of gear-enclosing doors from the fuselage.

Figure 13:
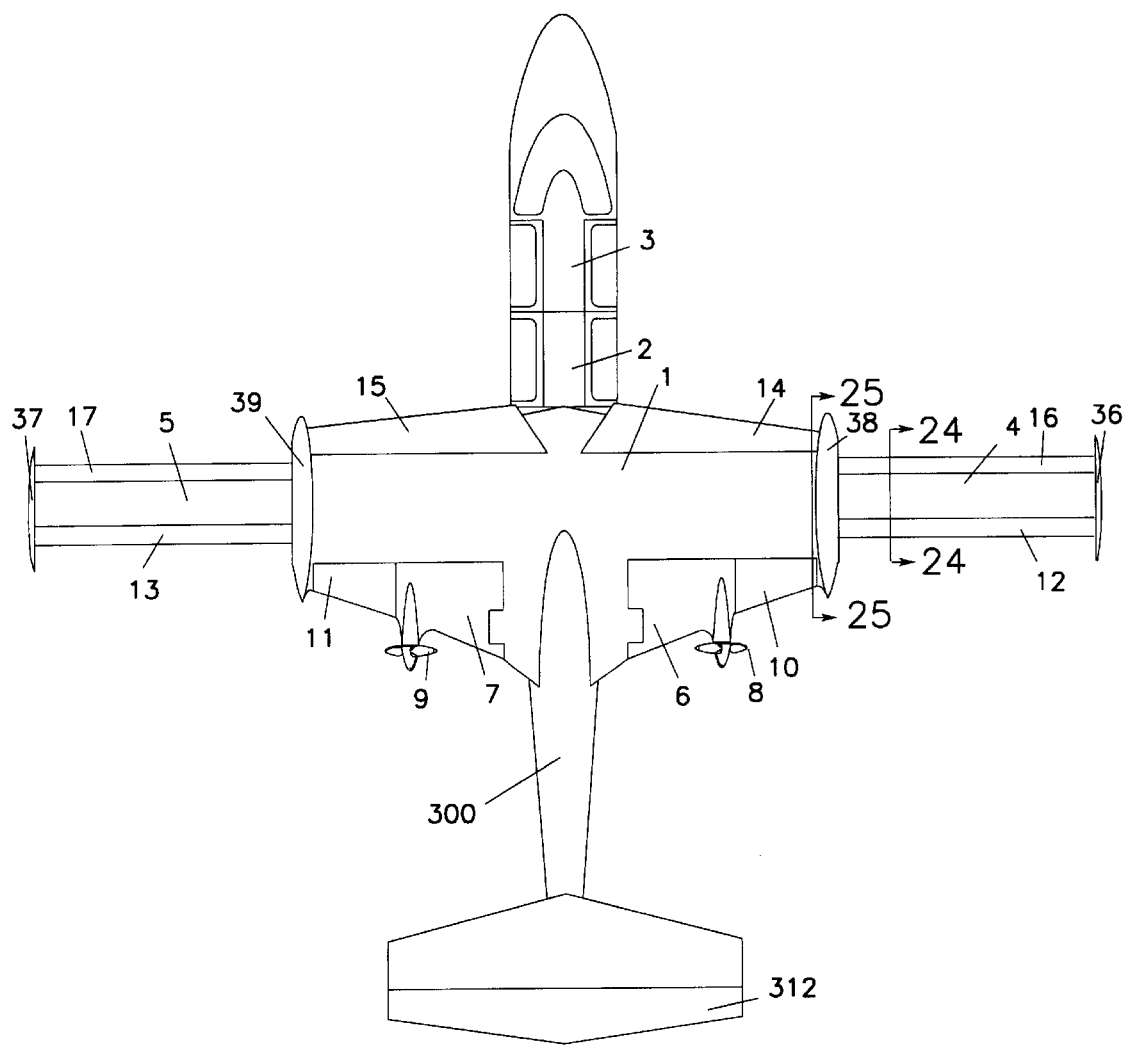
FIG. 13 is a plan view of an aircraft as depicted in FIGS. 3 and 12.
Figure 14:
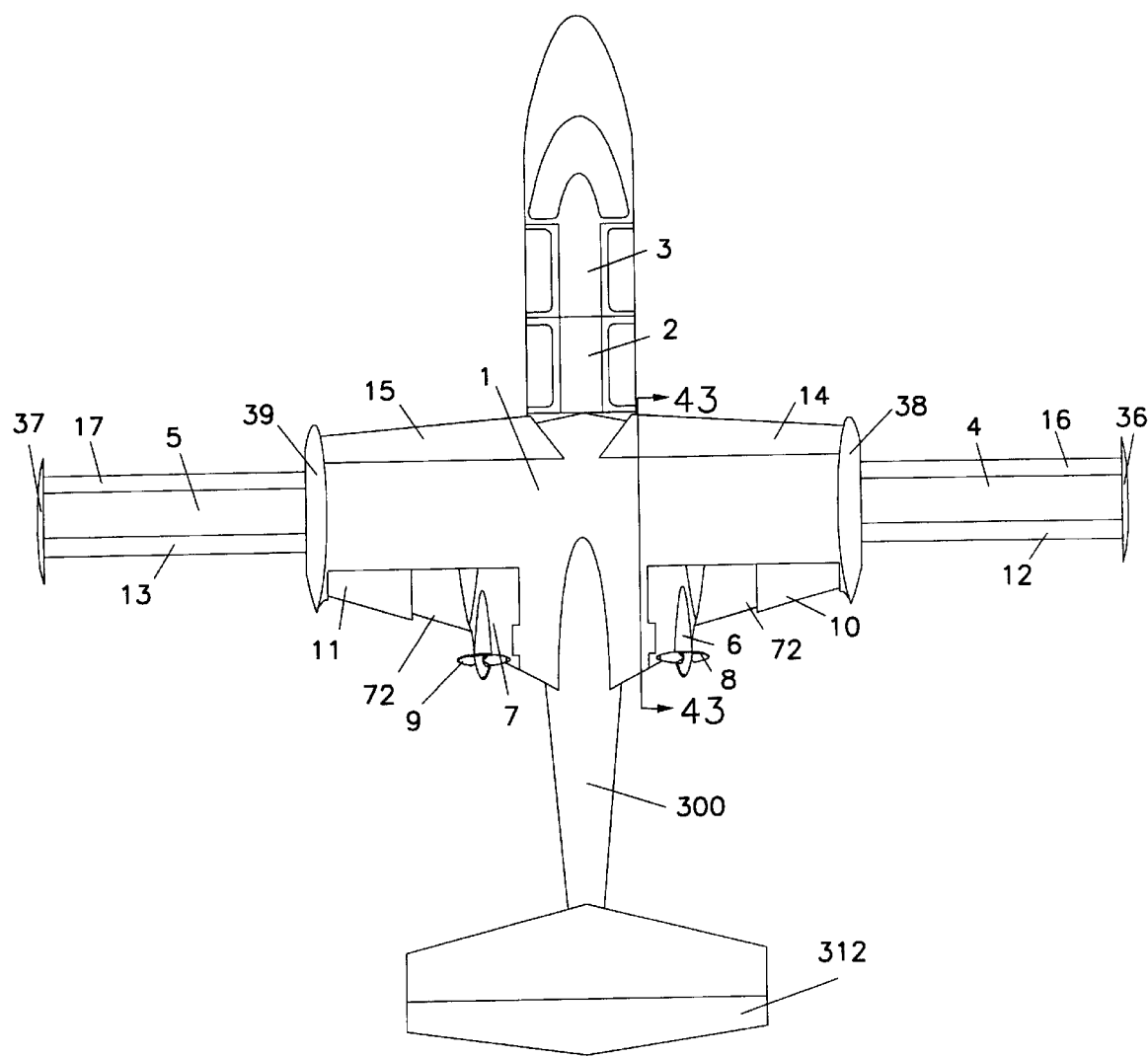
FIG. 14 is a plan view of an aircraft as depicted in FIGS. 1, 6, and 8.
Figure 15:
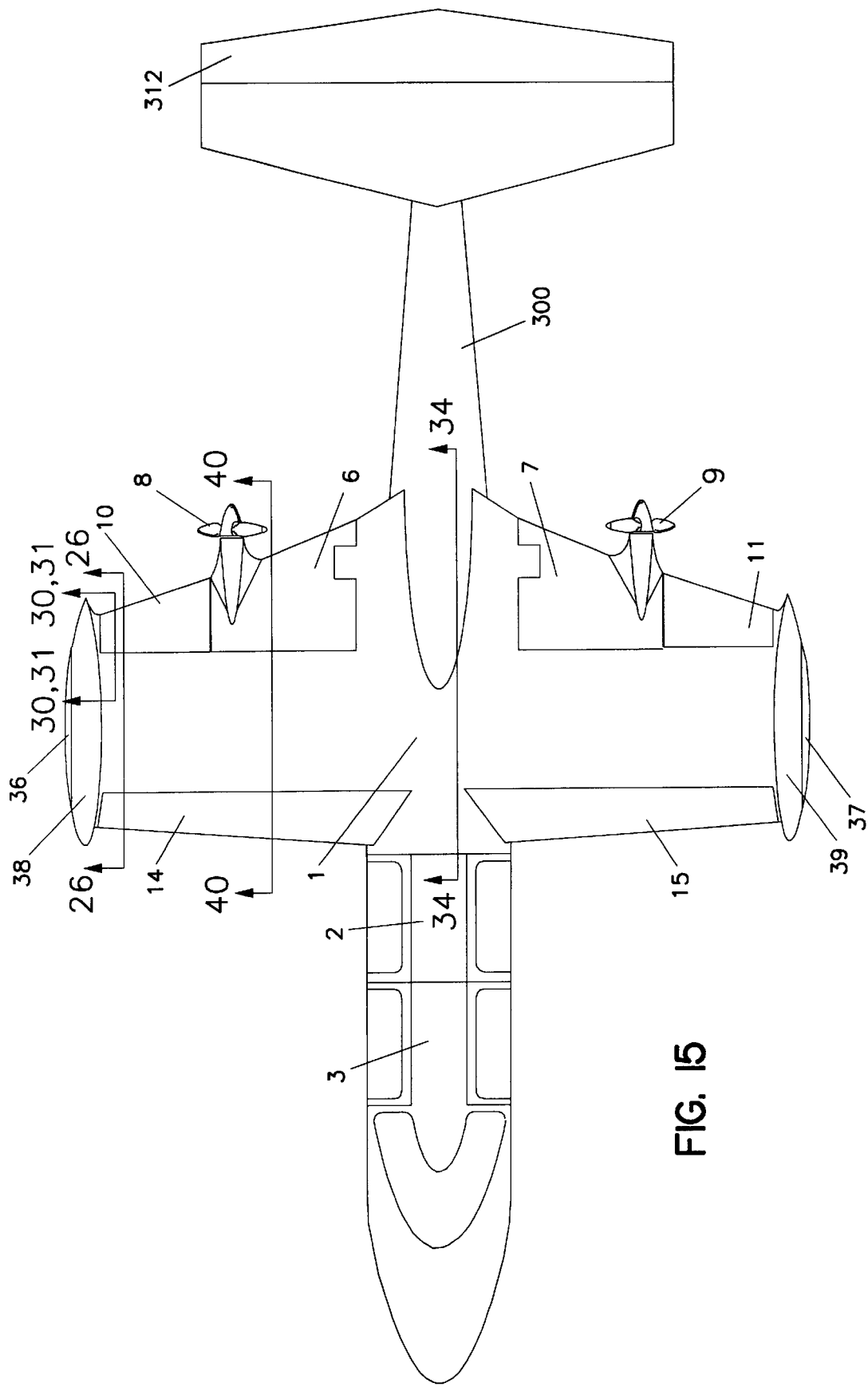
FIG. 15 is a plan view of an aircraft as depicted in FIGS. 4 and 11.

Referring to FIGS. 13, 14 and 15, the principal aspects of the compound wing structure of the present invention are shown in plan. All elements depicted in FIGS. 13, 14 and 15 are as described in FIGS. 4, 1 and 3, respectively. (See, also, FIGS. 12, 6 and 11.)

The Compound Wing

One of the principal inventive features of this invention is a compound wing. Aircraft incorporating this feature have the capability of being structurally modified, in flight, at the option of the pilot, so as to exhibit a wide range of flight characteristics or to adopt to a wide variety of flight conditions. In other words, aircraft incorporating the compound wing can be made to behave, aerodynamically, like several different types of aircraft, by the extension or retraction of extendable wing panels laterally from a central fixed wing section, as discussed supra. Aircraft of improved performance, versatility and safety are the result.

The compound wing feature and possible mechanisms for its operation are illustrated in FIGS. 16 through 33.

Figure 16:
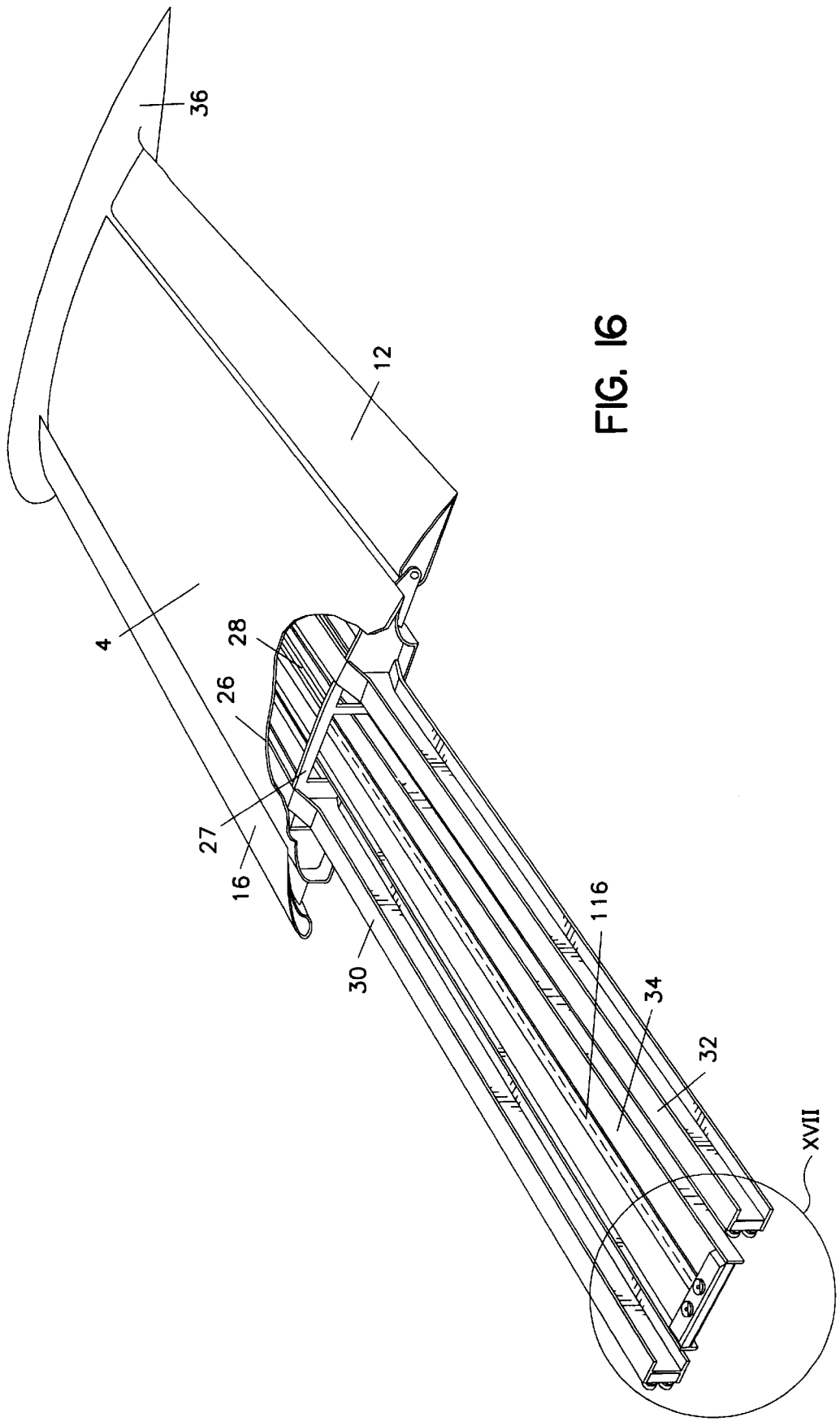
FIG. 16 is a perspective view of the starboard wing extension assembly of a compound wing structure according to the present invention. This figure shows the internal supporting beam structures of the extendable wing section.

FIG. 16 shows the construction of a starboard wing extension panel (4). Previously discussed external features such as the teardrop wing tip cap (36), the leading edge slat (16) and the aileron (12) are shown. In this figure, the outer skin (26, e.g., of flush riveted aluminum) of the panel (4) is shown cut away to reveal internal support structures, such as structural ribs (27), reinforcing stringers (28), a forward lift spar (30), and a rear or aft lift spar (32). All such structures are typically constructed of aluminum, fastened together by rivetting. The wing extension panel (4) also features a drag spar (34) positioned between the two lift spars (30 and 32). All of the spars (30, 32, 34) extend the entire length of the extension panel and roughly an equal length from the root of the wing extension panel (4). A guide bar (116) attached to the drag spar (34) provides a means for guiding the extension/retraction movement of the extension panel (4) relative to the fixed section of the wing (not shown).

Figure 17:
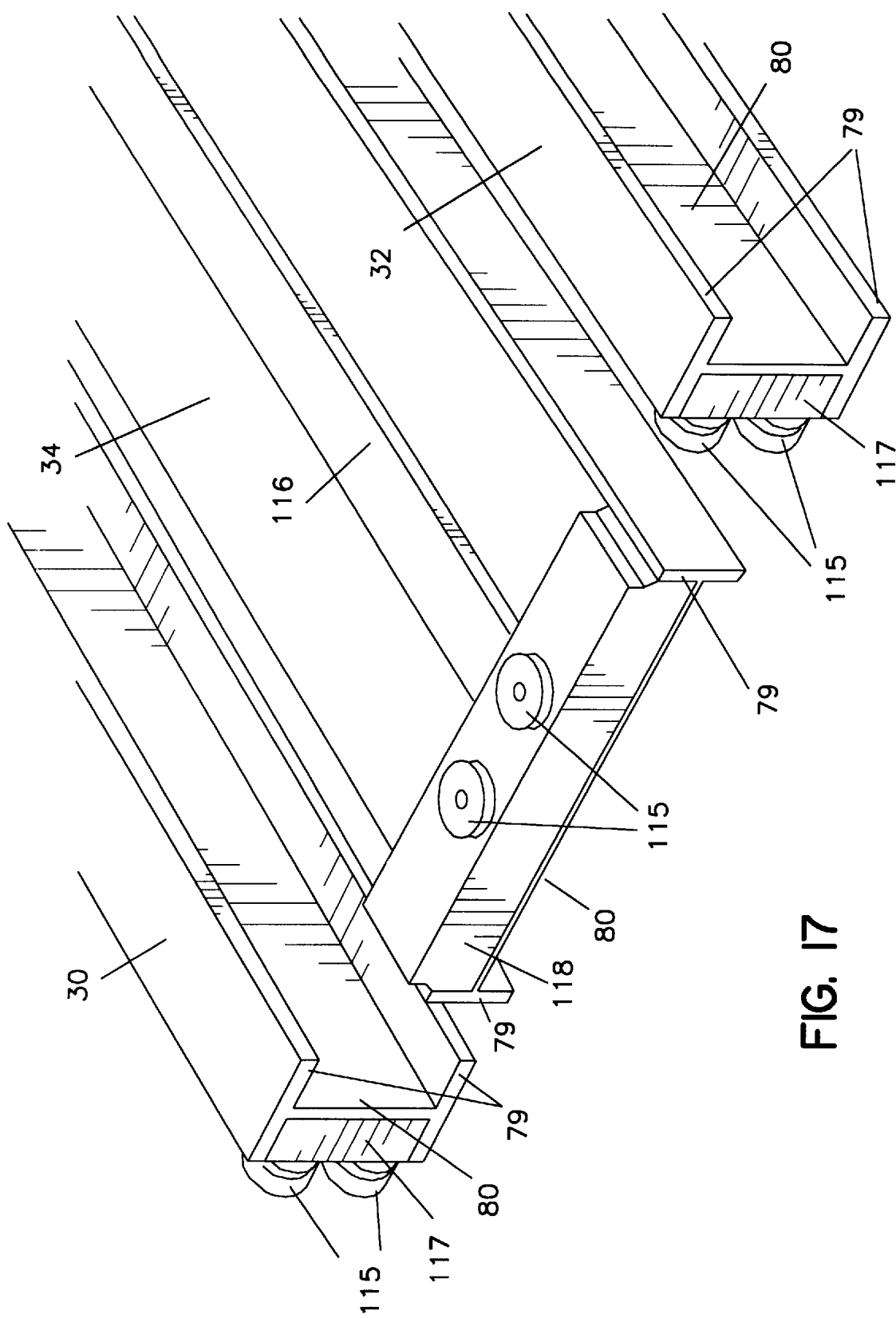
FIG. 17 is a detail of the encircled portion XVII of FIG. 16, showing the inboard end of the supporting spars of the extendable wing section.

FIG. 17 shows a more detailed view of the encircled portion XVII of FIG. 16. Lift and drag spars 30, 32 and 34 are seen to have an "I"-beam shape, characterized by flange (79) and web (80) portions. At the end of the lift spars (30 and 32), beam end guide blocks (117) are attached (e.g., riveted) into the area between the flanges (79) on one side of each spar (the forward side, in this figure); similarly, on the drag spar (34), a beam end guide block (118) is attached (e.g., riveted) in the area between the flanges (79) on one side of the drag spar (34) (here, the upper side). Pairs of guide rollers (115) are rotatably attached to each of the beam end guide blocks (117, 118). The lift spar guide rollers (117) are positioned so as to provide a roller guide that will be in communication with the inside of lift spar flanges of a port wing extension panel. Similarly, the guide rollers (115) fixed to the drag spar beam end guide block (118) are positioned to accept and provide a rolling guide for a guide bar fastened onto the drag spar of a port wing extension panel assembly (not shown), which port extension panel guide bar would correspond to the pictured starboard drag spar guide bar (116). The drag spar guide bar (116) is positioned to be accepted by a beam end guide roller system on a port wing extension assembly. This system of guide rollers and bars maintains the proper interlocking alignment of the support spars of port and starboard wing extension assemblies. Preferably, the drag spar guide bar (116) and its associated roller guides will have an interlocking tongue-and-groove shape, which will reduce any vibration. Although the system of roller guides and bars just described is not critical to the compound wing (i.e., the port and starboard wing extension panels' spars may simply be in slidable interlocking contact), the described system of guides (or its equivalent) will ensure smooth operation of the moveable panels of the compound wing, will decrease vibration of the spars, and will minimize the possibility of the panels jamming in flight.

Figure 18:
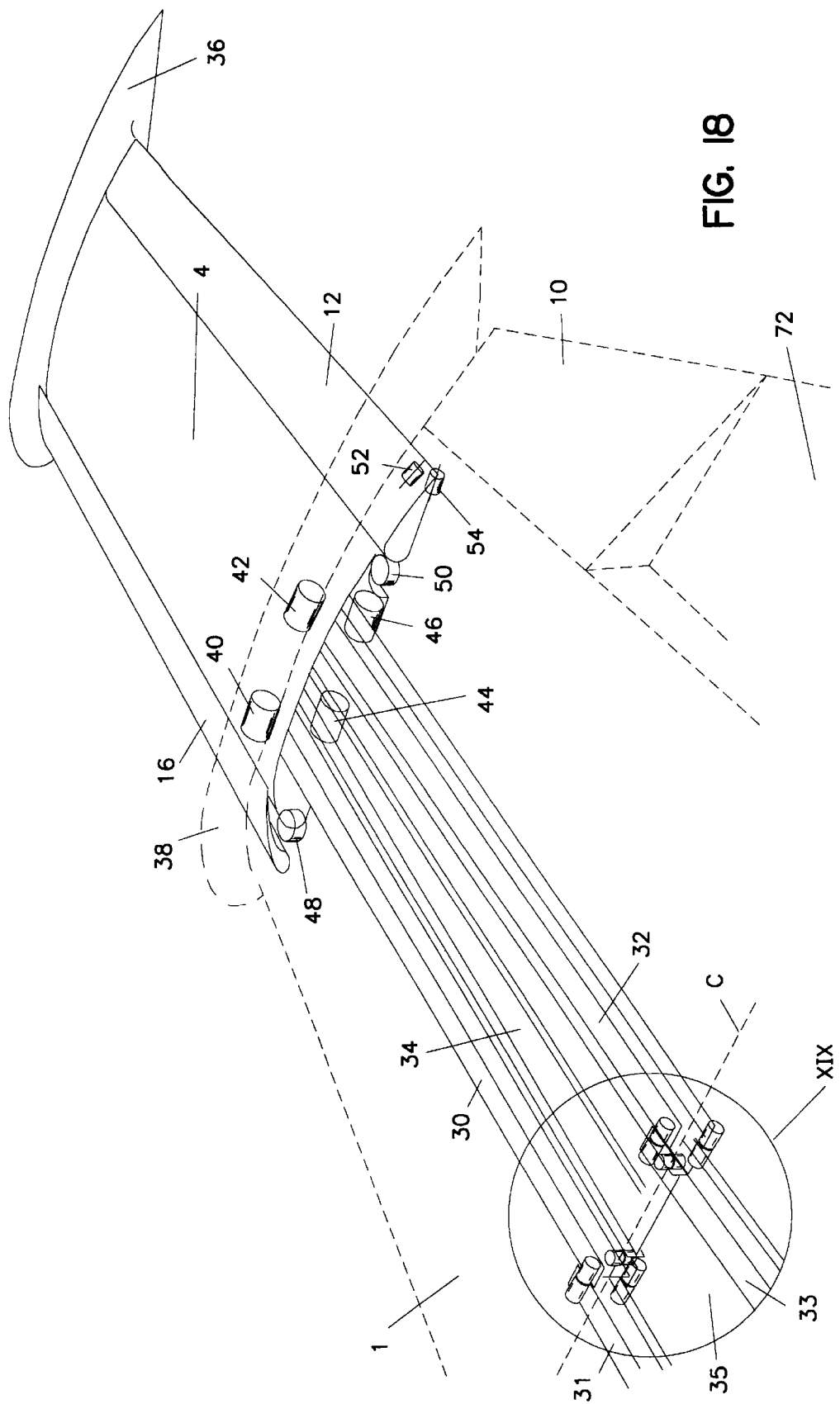
FIG. 18 is a perspective view of the starboard wing extension assembly as depicted in FIG. 16, showing its position relative to the main wing section (shown in phantom lines) when the wing extension panel is fully extended (ref.

Whereas FIGS. 16 and 17 illustrate the relative positions of the two wing extension panels (4 and 5 in FIG. 1) of the compound wing, FIGS. 18 and 20 show the position of the starboard wing extension panel (4) relative to the fixed wing section (1, in phantom lines), and show a preferred system of guide rollers for maintaining the position of the extension panels relative to the central fixed wing section. Referring to FIG. 18, a starboard wing extension panel (4), with wing tip (36), leading edge slat (16), trailing edge aileron (12), and supporting spars (30, 32, 34), is shown in similar aspect to that of FIG. 16. In phantom (dotted) lines, approximately half of the fixed wing section (1) of the compound wing is shown, extending from fixed wing tip 38 to the centerline C (dashed line), denoting the central plane of the aircraft to which the wing section (1) is attached. The portion of the fixed wing section (1) shown here includes an aileron (10) and a flap (72). As shown in this illustration, the starboard wing extension panel (4) is in sliding communication with the fixed wing section (1): The extension panel (4) is pictured at full extension from the distal end of the fixed wing section (1), and the entire assembly (e.g., 4, 12, 16, 30, 32, 34, 36) is capable of sliding as a unit inward toward the root of the fixed wing (i.e., toward centerline C). A plurality of extension panel positioning rollers (40, 42, 44, 46, 48, 50), which are fastened to the inside of the fixed wing section (1) at the distal end, is positioned in relation to the wing extension panel (4) to snugly hold the extension panel (4) while permitting (by rolling) extension and retraction of the panel (4) along the longitudinal axis of the wing section (1). Additional guide rollers (52 and 54) may be provided in association with some alternative mechanisms for co-actuation of the extension panel ailerons and the fixed wing section ailerons. (See, FIG. 30.) In embodiments using cable or rod co-actuation mechanisms, such additional guide rollers (52 and 54) may be eliminated. (See, FIGS. 33 and 32.)

A further plurality of supporting spar positioning rollers (unnumbered, within encircled area XIX) secures and positions the wing extension assembly along the centerline (C), where the starboard support spars (30, 32, 34) mesh with the series of support spars (31, 33, 35) of the port wing extension assembly of the compound wing.

Figure 19:
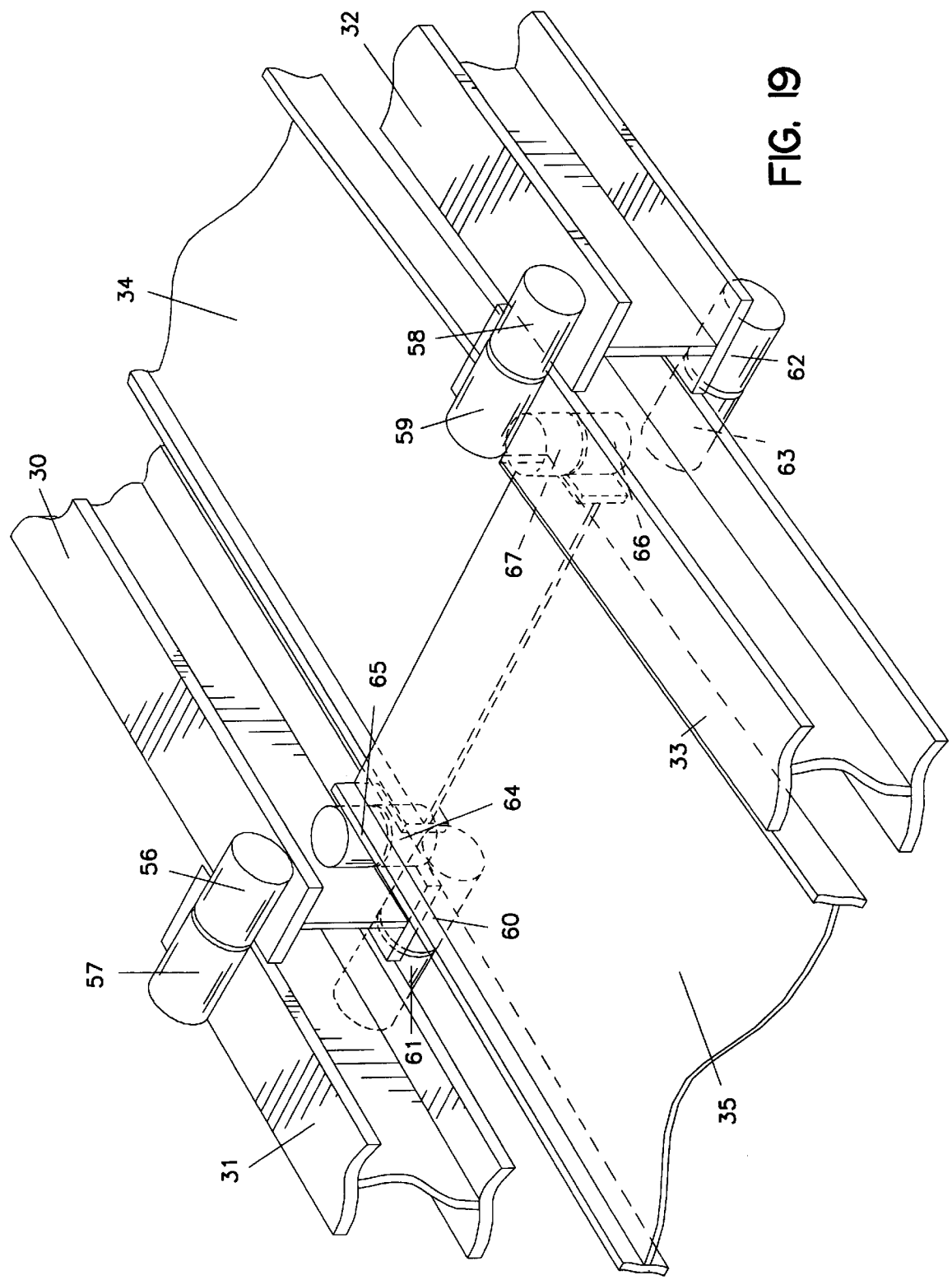
FIG. 19 is a detail of the encircled portion XIX of FIG. 18, showing the positioning of rollers in relation to the supporting spars for the extendable wing section.

Referring to FIG. 19, which is a more detailed view of encircled portion XIX of FIG. 18, the meshing juxtaposition of the port (31, 33, 35) and starboard (30, 32, 34) supporting spars of the port and starboard wing extension assemblies is illustrated. (Elements such as guide rollers and end guide blocks (i.e., items 115–118 in FIG. 17) have been omitted here for clarity.) Each spar is secured and guided by a pair of rollers, which are attached to the fixed wing structure (not shown):

| shown): | SPAR | ROLLERS |
|---|---|---|
| | port lift spar 31 | 57 and 61 |
| | starboard lift spar 30 | 56 and 60 |
| | port drag spar 35 | 65 and 67 |

-continued

| shown): | SPAR | ROLLERS |
|---|---|---|
| | starboard drag spar 34 | 64 and 66 |
| | port lift spar 33 | 59 and 63 |
| | starboard lift spar 32 | 58 and 62. |

Taken together, the series of rollers (40, 42, 44, 46, 48, 50, 52, 54, 56, 57, 58, 59, 60, 61, 62, 63, 64, 65, 66, 67), and additional rollers (port side) not illustrated in FIGS. 18 and 19, secure the moveable wing extension assemblies within the fixed wing structure of the compound wing, ensure smooth, rolling operation of both wing extension panels simultaneously, and maintain the proper alignment of the wing extension panels in relation to the fixed wing section. FIG. 20 shows this series of rollers in spatial relationship, with the relative positions of the fixed wing structure (1), starboard wing extension panel (4) and port wing extension panel (5) depicted in phantom lines (wing extension panels fully retracted).

Preferably, the positioning rollers described above will be made of metal, e.g., aluminum, coated with a thin plastic or rubber skin.

A further illustration of the position and operation of the rollers is provided by FIGS. 21, 22, and 23. FIG. 21 provides a cross-sectional view of the forward lift spar (30) and wing extension panel (4) of the starboard wing extension assembly (see, FIG. 16) and its position relative to the fixed wing structure (1), as maintained and secured by roller elements (e.g., 40, 44, 56, 60). FIGS. 22 and 23 illustrate the operation of the compound wing, wing extension panel (4) is retracted as a unit toward centerline (C). The wing extension panel (4) is fully retracted in FIG. 23, where the extension panel wing cap (36) mates with the fixed wing tip (38), and the entire wing extension panel (4) is enclosed within the fixed wing structure (1).

Figure 24:
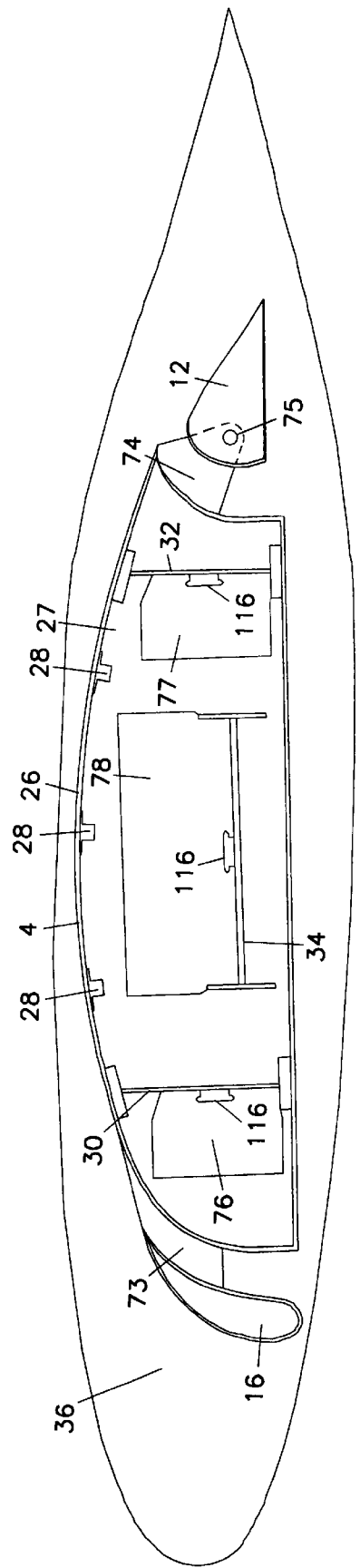
FIG. 24 is a cross-sectional view of a wing extension panel taken on the line 24—24 in FIG. 13.
Figure 25:
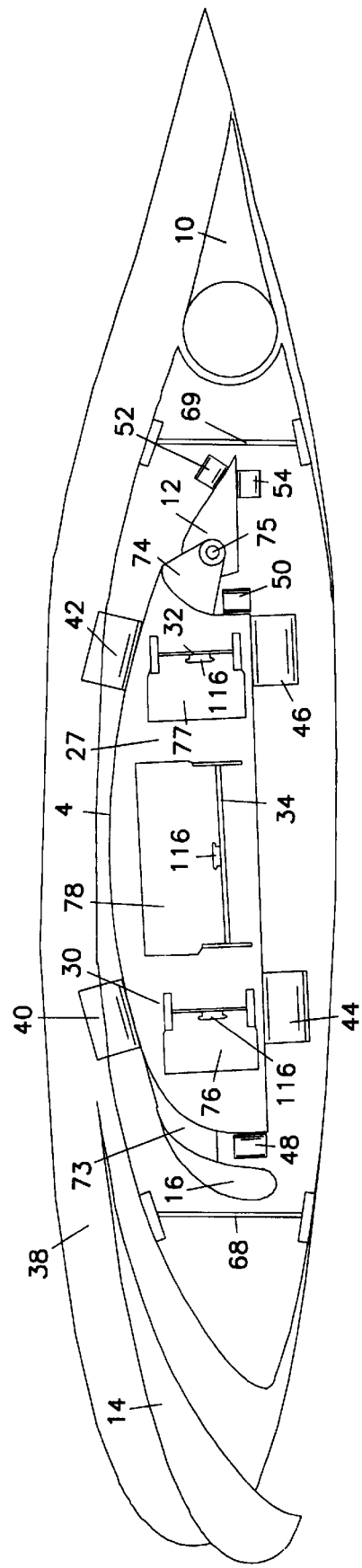
FIG. 25 shows a cross-sectional view of a wing taken on the line 25—25 in FIG. 13.
Figure 26:
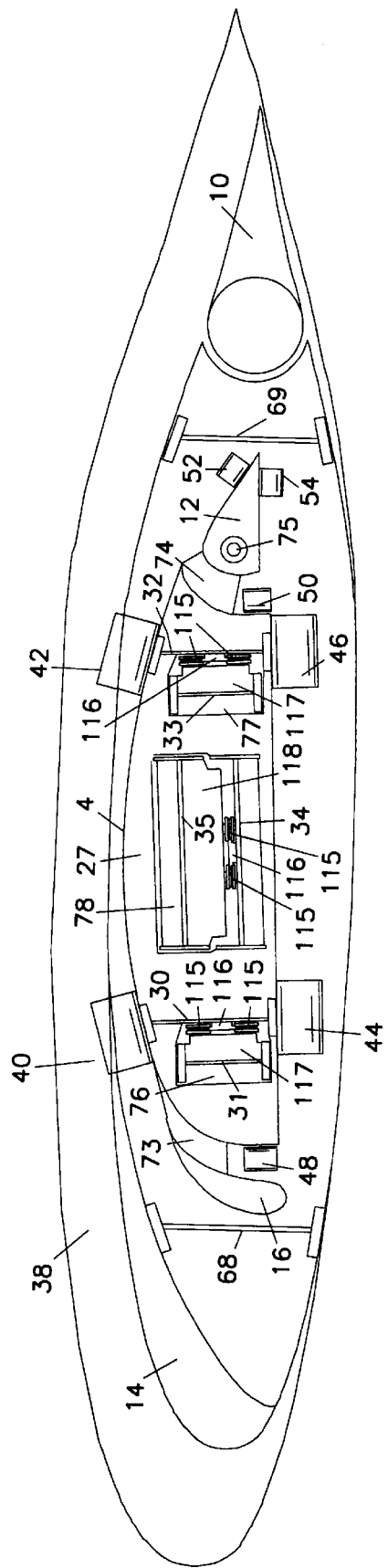
FIG. 26 shows a cross-sectional view of a wing on the line 26—26 in FIG. 15.

The cooperative construction of the compound wing is further illustrated in FIGS. 24, 25 and 26, which show various sectional views through starboard wing structures (ref. FIGS. 13 and 15, section lines 24—24, 25—25 and 26—26).

Referring to FIG. 24, a sectional view taken on line 24—24 of FIG. 13 shows the structures of the starboard wing extension panel (4), as viewed along its longitudinal axis toward the wing tip cap (36). Several previously described features of the starboard wing extension panel (4) are seen in cross-section: The leading edge slat (16) (fixed in position by one or more structural rib extensions (73)), aileron (12) (pivotally attached at one or more points to the wing extension panel (4) at structural rib extensions (74) through bearings (75), forward lift spar (30), drag spar (34), and aft lift spar (32). Guide bars (116) are visible in this figure not only on the drag spar (34) but also on the web of the two lift spars (30 and 32). FIG. 24 further shows reinforcing stringers (28), which run substantially the entire length of the wing extension panel (4) and are riveted to the underside of the outer skin (26) of the panel. FIG. 24 additionally shows clearance holes 76, 78, and 77, which are provided to accommodate the corresponding forward lift spar, drag spar, and aft lift spar, respectively, of a port wing extension panel as the two extension panels slide together within the fixed wing structure of the compound wing. (See, FIG. 26.)

Referring to FIG. 25, a sectional view taken on line 25—25 of FIG. 13 shows the structures of the starboard wing extension panel (4), as viewed in a fully extended position, looking spanwise, toward the wing tip, from a point just inboard of the fixed wing tip (38). Several previously described features of the compound wing are seen in cross-section: The leading edge slats (14, 16), structural rib extension (73), positioning rollers (40, 42, 44, 46, 48, 50), guide bars (116), panel skin (26), stiffening or structural rib (27), ailerons (10 and 12), structural rib extension (74), bearing fastener (75), guide rollers (52 and 54), forward lift spar (30), aft lift spar (32), drag spar (34), and clearance holes (76, 77 and 78). Additional structures of the fixed wing section are also visible in FIG. 25, i.e., fore and aft supporting spars (68 and 69, respectively).

Referring to FIG. 26, a sectional view taken on line 26—26 of FIG. 15 shows the structures of the starboard wing extension panel (4), as viewed in a fully retracted position, looking spanwise toward the wing tip, from a point just inboard of the fixed wing tip (38). Referring momentarily to FIGS. 13 and 15, it will be appreciated that in contrast to the view in FIG. 25, the view of FIG. 26 is taken when the wing extension panels (4 and 5 in FIG. 13) are fully retracted, and thus many of the associated internal support structures are intermeshed. Previously described features of the compound wing seen in FIG. 25 are also seen here in cross-section: The leading edge slats (14, 16), structural rib extension (73), positioning rollers (40, 42, 44, 46, 48, 50), guide bars (116), panel skin (26), stiffening or structural rib (27), ailerons (10 and 12), structural rib extension (74), bearing fastener (75), guide rollers (52 and 54), forward lift spar (30), drag spar (34), aft lift spar (32), main wing supporting spars (68 and 69), and clearance holes (76, 77, 78). Additional structures, i.e., from a port wing extension assembly that have retracted into this sectional view of the starboard wing, are now seen: The forward lift spar (31), with associated end block (117) and guide rollers (115), which are in rolling communication with the guide bar (116) fastened to the web of the forward lift spar (30) of the starboard wing extension assembly; the port drag spar (35), with associated end block (118) and guide rollers (115), which are in rolling communication with the guide bar (116) fastened to the web of the starboard drag spar (34); and the aft lift spar (33), with associated end block (117) and guide rollers (115), which are in rolling communication with the guide bar (116) fastened to the web of the aft lift spar (32) of the starboard wing extension assembly.

From FIGS. 25 and 26 it will be appreciated that clearance holes (76, 77, and 78) are cut in each of the structural ribs (27), which are spaced approximately 1–1½ feet apart for the length of each of the wing sections, in accordance with conventional wing construction. These passages (76, 77, 78) are sized and positioned to permit the wing extension spars (31, 33, and 35) of the port wing to pass through substantially the entire length of the starboard wing extension panel (4). Similar clearance holes will exist in each of the structural ribs of the port wing extension assembly. Further detail of the relative positions of the overlapping spars is shown in FIG. 36.

Figure 28:
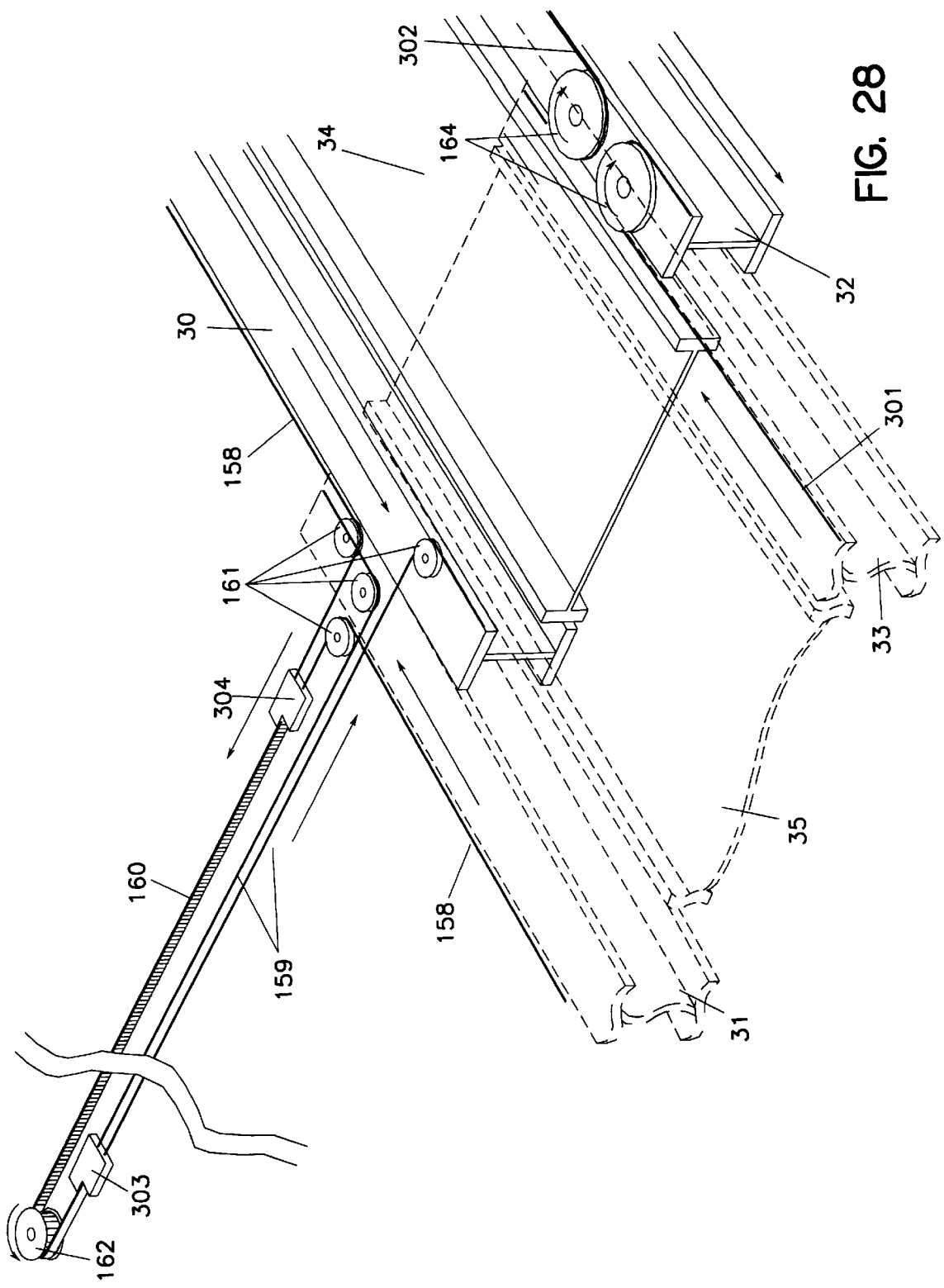
FIG. 28 is an enlarged detail of encircled portion XXVIII of FIG. 27.
Figure 29:
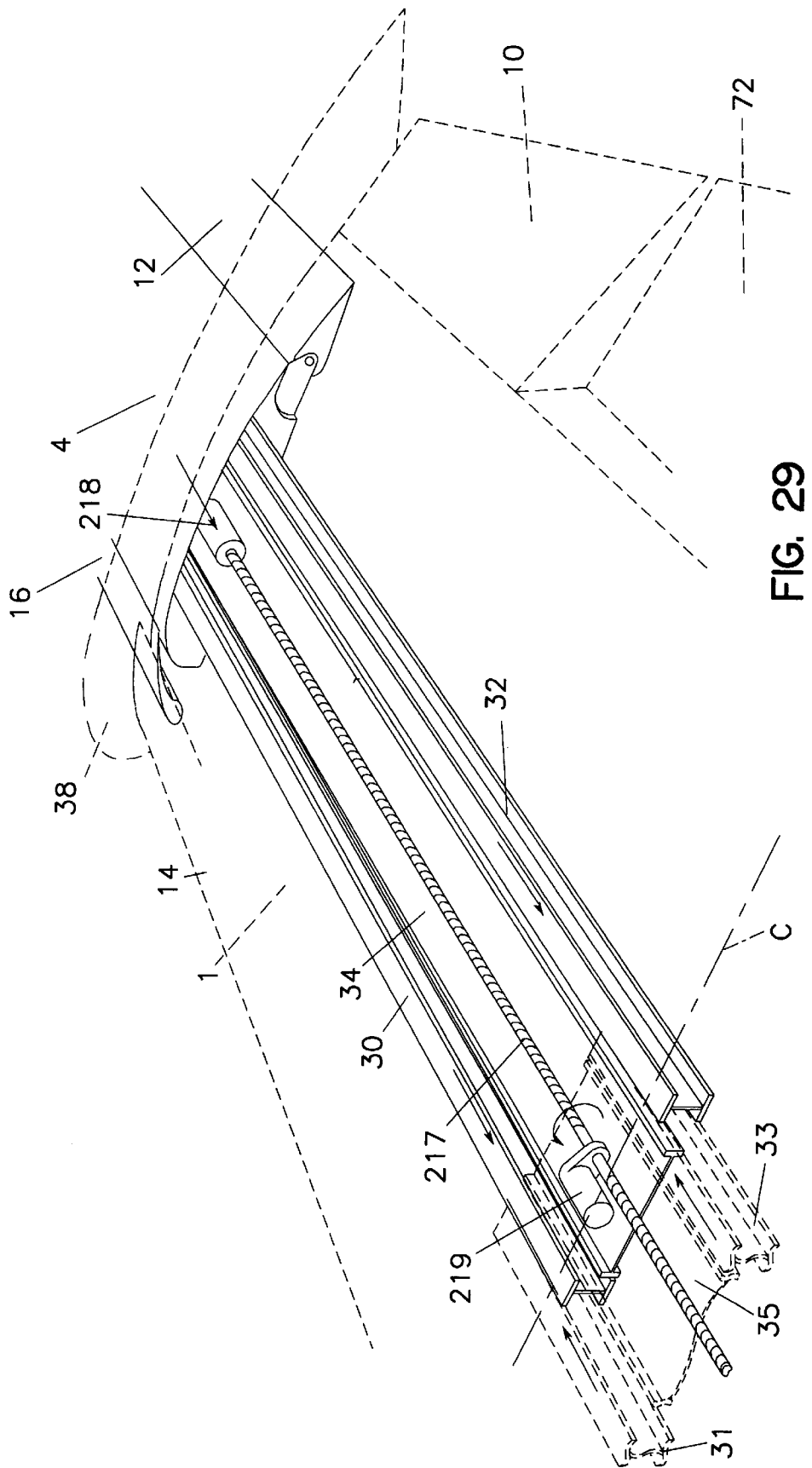
FIG. 29 is a perspective view of starboard wing support structures similar to FIG. 27, showing an alternative screw-type mechanism for extending and retracting the wing extension panels.

Extension and retraction of the wing extension panels may be effected by any means that reliably moves both panels simultaneously. Differential extension or retraction of the panels which results in bilaterally asymmetrical wing span will increase yaw and result in loss of directional control. Several suitable methods for actuating the components of the compound wing described herein will be apparent to those skilled in the art, however by way of illustration FIGS. 27, 28, and 29 depict two suitable mechanisms.

Figure 27:
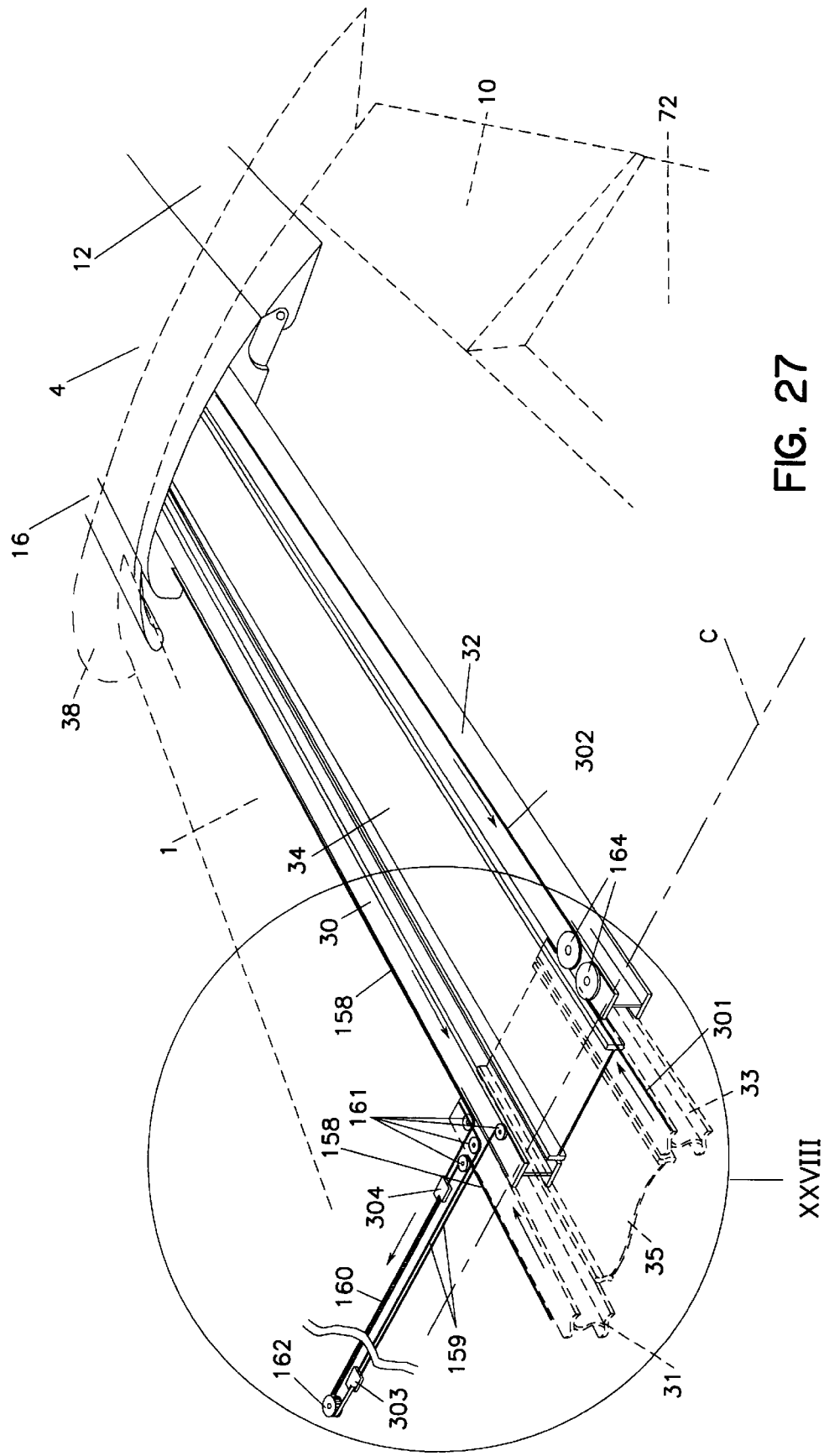
FIG. 27 is a perspective view of the supporting lift and drag spars of a starboard wing extension assembly according to the invention, showing the interlocking relationship of lift and drag spars of a port wing extension assembly and also showing a preferred cable mechanism useful for extending and retracting the extendable wing sections. The arrows indicate direction of motion during wing retraction.

FIG. 27 depicts a cable system for retracting and extending the wing extension panels. In phantom lines, the starboard side of the fixed wing structure (1) is shown enclosing the lift and drag spars (30, 32, 34) of the starboard wing extension panel (4), and the extension panel (4) is fully extended. Also shown in phantom lines are the opposing lift and drag spars (31, 33, 35) of the port wing extension panel. In the system illustrated here, extension and retraction of the wing extension panels is controlled by two control cables (158 and 159). Optional coordinating cables (301 and 302) may also be provided as a safety measure, to ensure that the port and starboard wing extension panels will always be extended or retracted to substantially the same degree.

One end of control cable 158 is attached to the starboard forward lift spar (30) near the base of the wing extension panel (4). The cable (158) is threaded through a pulley (161) rotatably fixed to the fixed wing structure (1), through an anchor block (304), through another pulley (161) attached to the fixed wing section (1), and the other end of the cable (158) is attached to the opposing port forward lift spar (31) near the base of the port wing extension panel (not shown). The anchor block (304) is attached to a specific point of the cable (i.e., the midpoint), and the control cable (158) cannot slide through the anchor block (304). Alternatively, of course, two cables could be employed wherein one end of each cable is attached to the anchor block (304) and the other end of each cable is attached to the port or the starboard lift spar near the base of the respective wing extension panels.

The second control cable (159) is attached at one end of the starboard lift spar (30), threaded through a pulley (161) rotatably attached to the fixed wing structure (1), through an anchor block (303), through another pulley (161) rotatably attached to the fixed wing structure (1), then attached to the end of the opposing port lift spar (31). Again, the single control cable (159) may alternatively be substituted with two cables, both attached to the anchor block (303) at one end and then attached respectively to either the port or starboard lift spars.

A belt or chain (160) is attached to anchor block 303 at one end, threaded around a drive pulley (162), and attached at the other end to anchor block 304. The belt (160) is driven by the drive pulley (162), which, in turn, is controlled by a motor or mechanism (not shown) attached to the main wing structure (1). In operation, when the drive pulley (162) is rotated counterclockwise, control cable 158 is pulled, and control cable 159 is relaxed, thereby drawing the wing extension assemblies together (retracting the wing extension panels). When the drive pulley (162) is rotated clockwise, control cable 159 is pulled and control cable 158 is relaxed, thereby extending the wings. The arrows in FIG. 27 show the direction of movement of the cables (158, 301, and 302) when the drive pulley (162) is turned counterclockwise and the extension panels are retracted.

Because asymmetric extension or retraction of the wing extension panels, e.g., due to a control cable failure, would cause a loss of control characteristics, an optional fail-safe mechanism for keeping the movement of the wing extension panels coordinated may be employed and is illustrated in FIG. 27. Two coordinating cables (301 and 302) are utilized: Cable 302 is attached at one end to the middle of the starboard aft lift spar (32) near the base of the starboard wing extension panel (4), threaded around a pulley (164) which is attached to the fixed wing section (1), then attached at its other end to the end of the port aft lift spar (33); and similarly, cable 301 is attached at one end to the middle of the port aft lift spar (33) near the base of the port wing extension panel (not shown), threaded around a pulley (164) which is attached to the fixed wing section (1), then attached at its other end to the end of starboard aft lift spar (32). In the event that any of the control cables (158, 159) fails, the coordinating cables (301, 302) would ensure that the degree of extension or retraction of the port and starboard wing extension assemblies would be substantially the same.

FIG. 28 is a detailed view of encircled portion XXVIII of FIG. 27. All of the features (drive pulley (162), anchor blocks (303, 304), control cables (158, 159), drive belt (160), pulleys (161, 164), starboard and port lift spars (30, 31, 32, 33), starboard and port drag spars (34, 35), and coordinating cables (301, 302)) are as described above. Arrows in this figure show the direction of movement of the adjacent structure (pulley, spar, or cable) as the wing extension panels are retracted by counterclockwise drive of the drive pulley (162).

Alternative methods for actuating a cable control system such as that of FIGS. 27 and 28 will be apparent to those skilled in this art. For example, the anchor blocks (303 and 304) could be attached to threaded nuts at either end of a leadscrew, instead of being attached by a drive belt (160) as illustrated.

Referring to FIG. 29, an alternate method of extending and retracting the wing extension panels is shown. Most of the structural items of this figure have been described previously and are the same as illustrated in FIG. 27. Instead of the cable control system of FIG. 27, however, there is a leadscrew (217) that extends from tip to tip of the fixed wing section (1). One end is threaded with a right hand thread and the other end has a left hand thread. An appropriately threaded leadscrew nut (218) is attached to the wing extension panel (4), and a leadscrew drive motor (219) is provided that is capable of rotating the leadscrew in both clockwise and counterclockwise directions. Operation of the drive motor (219) causes the leadscrew nut (218) to be pushed outward or pulled inward, depending on the rotation of the leadscrew, with a consequent extension or retraction of the wing extension panel (4).

The final aspect of the innovative compound wing of the present invention that must be addressed is the co-actuation of the ailerons of the fixed wing and of the wing extension panels. If the extension panel ailerons do not operate in concert with the fixed wing ailerons, the airplane becomes much more difficult to control. Accordingly, the full advantages of the compound wing described herein will not be realized without adopting some mechanism for co-actuation of the ailerons. Several mechanisms will suggest themselves to those skilled in the art, and three such mechanisms are illustrated in FIGS. 30, 31, 32, and 33.

Figure 30:
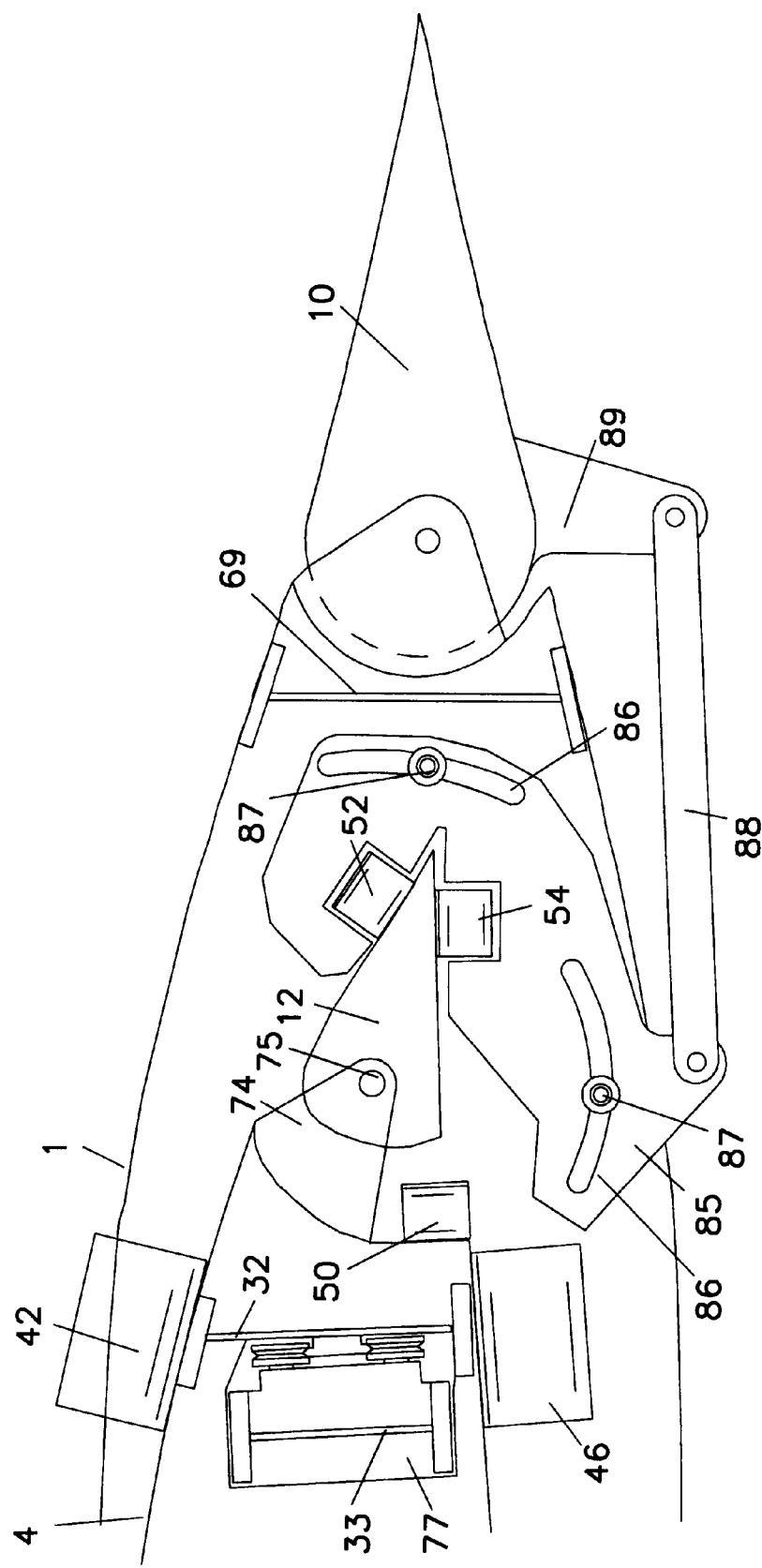
FIGS. 30 and 31 are cross-sectional views of a wing taken on line 30,31—30,31 of FIG. 15, showing a preferred mechanism for coordinated actuation of the ailerons on the fixed wing section and on the wing extension panel. The components of FIGS. 30 and 31 are exactly the same; the two figures show simultaneous adjustment of the positions of the fixed wing aileron (10) and the extension panel aileron (12) relative to the stationary surface of the wing (2) as the ailerons are trimmed from a raised position (FIG. 30) to a lowered position (FIG. 31).

Referring to FIG. 30, which is a cross-sectional view taken along line 30,31—30,31 of FIG. 15, a partial view is shown of a starboard wing extension panel (4) retracted within the fixed wing structure (1). Several of the structural elements such as support spars, clearance holes, and guide bars and rollers have been described previously and are the same as depicted in previous figures (see, e.g., FIG. 26). An additional feature shown in this figure is an aileron actuator plate (85) fastened to the fixed wing structure (1) by actuator plate guides (87), which permit sliding reorientation or pivoting of the actuator plate (85) along guide slots (86) cut in the plate, in response to conventional actuation of the fixed wing aileron (10), through connecting arms (88 and 89). The aileron actuator plate (85) also acts as a housing for two guide rollers (52 and 54), which are in rolling communication with the extension panel aileron (12). It is readily seen that movement of the fixed wing aileron (10) is automatically translated via the aileron actuator plate (85) and the guide rollers (52 and 54) to the extension panel aileron (12); and because the aileron actuator plate (85) is in contact with the extension panel aileron (12) through rollers (52 and 54), the action of the fixed wing aileron (10) is translated to the extension panel aileron (12) during extension or retraction and regardless of the degree of extension or retraction.

Figure 31:
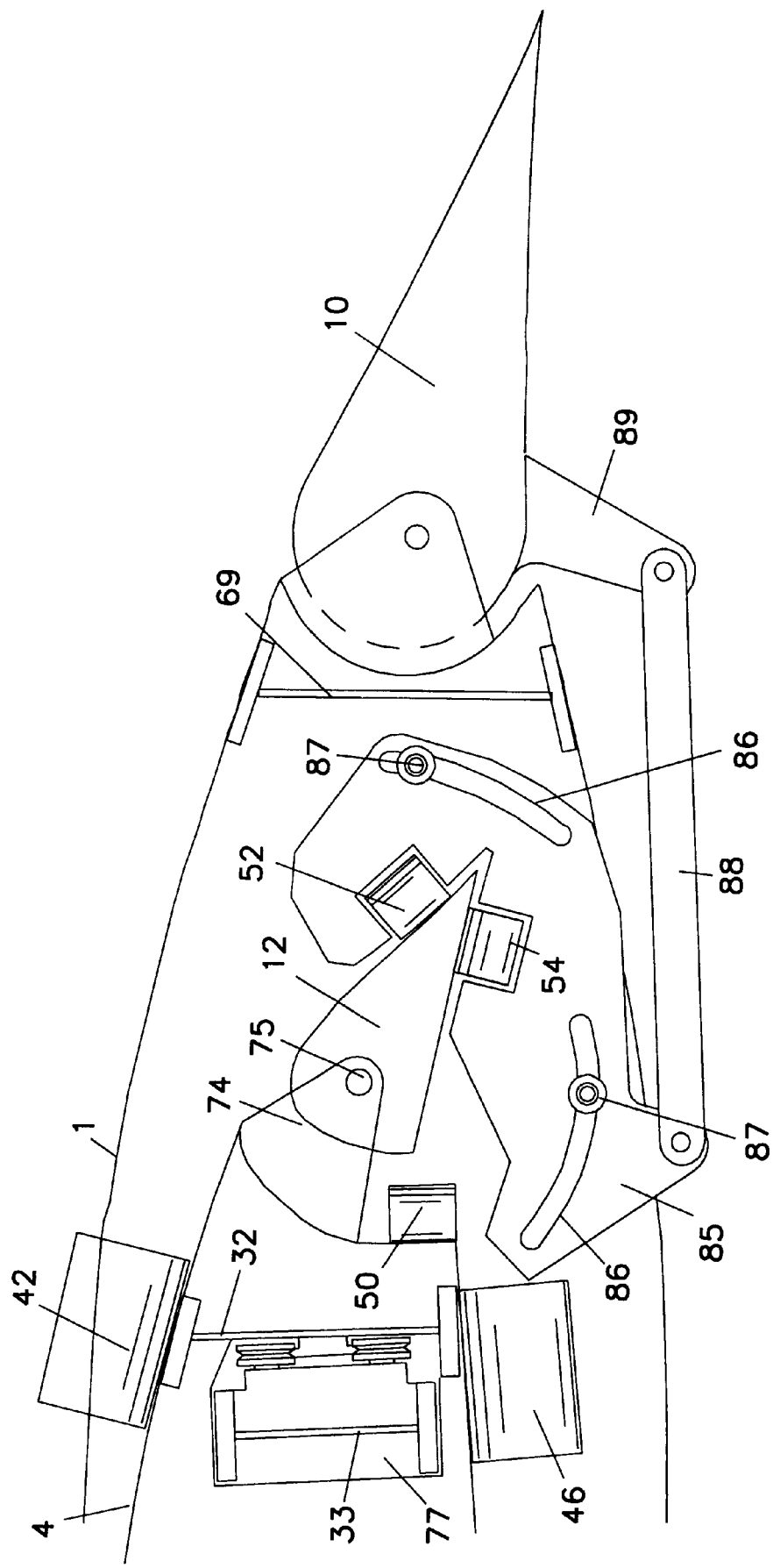

FIGS. 30 and 31 show two views of the same wing structures. In FIG. 30, the ailerons (10 and 12) are raised; and in FIG. 31, ailerons (10 and 12) are lowered. Comparison of these two figures illustrates the pivoting reorientation of the aileron actuator plate (85) and associated linkages (88 and 89).

Figure 32:
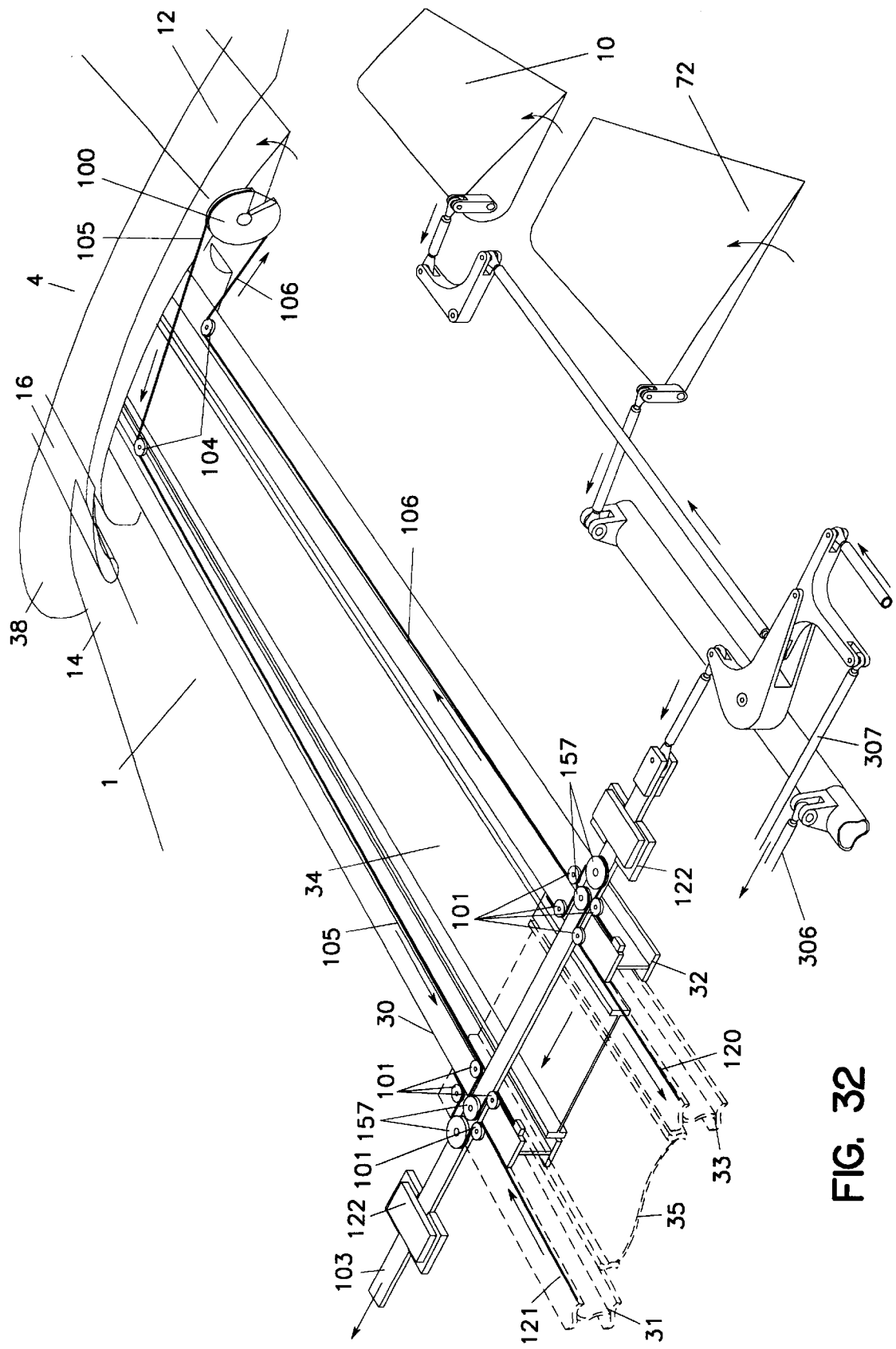
FIG. 32 shows the preferred design for actuation of the ailerons using a cable system for the extension ailerons (12) and a push-pull rod system for the fixed wing section flap (72) and aileron (10).

Referring to FIG. 32, a preferred method of actuating the wing extension aileron in concert with the fixed wing aileron is shown. The fixed wing ailerons (10) are controlled by movement of a sliding actuator bar (103), which movement is translated to the fixed wing aileron (10) through a conventional arrangement of bellcranks and rods. The actuator bar (103) runs through bar guides (122), which are fixed to the fixed wing section (1) along the centerline of the fuselage. The flaps are controlled by means of a control rod (307), the movement of which is translated to the flap (72) through conventional linkages.

It is often advantageous to co-actuate flaps and ailerons to increase lift (drooped ailerons) or increase roll control (flaperons). FIG. 32 illustrates a system wherein, if control rods 306 and 307 are co-actuated (i.e., under control of the flap lever), then aileron (10) will assist the action of the flap (72).

For co-actuation of the extension panel aileron (12) in concert with the fixed wing aileron (10), FIG. 32 illustrates a cable system controlled by the same sliding control bar (103) that actuates the linkages to the fixed wing aileron (10). In this embodiment, an aileron actuator cable (105) is attached at one end near the end of the forward lift spar (30), threaded through an actuator guide pulley (101) rotatably attached to the fixed wing structure (1), through an aileron control pulley (157) rotatably attached to the control bar (103), through another actuator guide pulley (101) rotatably attached to the fixed wing structure (1), through another guide pulley (104) rotatably attached to the lift spar (30) near the base of the wing extension panel (4), then attached at its other end to a sectioned pulley (100) fixedly attached to the extension panel aileron (12). A second aileron actuator cable (106) is attached at one end of the sectioned pulley (100), threaded through a guide pulley (104) rotatably attached to the aft lift spar (32), through an actuator guide pulley (101) rotatably attached to the fixed wing section (1), through an aileron control pulley (157) rotatably attached to the aileron control bar (103), through another actuator guide pulley (101) rotatably attached to the fixed wing structure (1), then attached at its other end near the end of the aft lift spar (32).

It will be appreciated from FIG. 32 that when the sliding control bar (103) is moved, this arrangement of cables (105, 106) and pulleys (101, 104, 157) causes one cable (i.e., 105 or 106) to slacken while the other cable tightens with respect to the sectioned pulley (100), which causes that pulley to rotate and thus raise or lower the extension panel aileron (12) accordingly. It will also be appreciated that as the wing extension panel (4) is retracted, the entire wing extension assembly, including the starboard lift spars (30 and 32) will roll inward, across the longitudinal axis of the control bar (103), but the relationship of the cables (105, 106), control bar (103), sectioned pulley (100) and aileron (12) is preserved: As the lift spars (30 and 32) roll across the longitudinal axis of the control bar (103), the actuating cables (105 and 106), which are attached to the ends of the lift spars (30 and 32) will move as a unit with the lift spars (30 and 32), sliding through the arrangement of pulleys (101, 157) but not altering the ability of control bar movements to be directly translated to the panel aileron (12).

A corresponding actuating system for the port side extension panel aileron is indicated in FIG. 32 by the corresponding cables (120 and 121) attached to the port fore and aft lift spars (31 and 33), the ends of which are indicated by phantom lines. The arrows in FIG. 32 show the direction of movement of the components of the system when the control bar (103) is moved forward.

The bellcranks, rods, pulleys and cables depicted in FIG. 32 are all of standard construction and are typically fabricated of stainless steel. The size (diameter) of the pulleys (100, 101, 104, 157) and positioning of the aileron control pulleys (157) with respect to the actuator guide pulleys (101) fixed to the wing section (1) will be calculated so that the amount of cable slack paid out or taken up by movement of the control bar (103) does not exceed the amount of cable required for the entire range of movement of the aileron (12). Viewed another way, it will be kept in mind that in the arrangement of cables and pulleys illustrated here, if the aileron control pulleys (157), moving with the control bar (103), are taken up to or beyond the point of alignment with the spar guide pulleys (101) through which the associated cable (e.g., 105, 106) is threaded, the aileron control pulley (157) would no longer be in effective contact with its associated cable, and movement of the control bar (103) would no longer affect the tension of the actuation cables (105, 106). Pulleys accordingly will be sized and positioned in relation to each other so as to maintain control of the ailerons.

Figure 33:
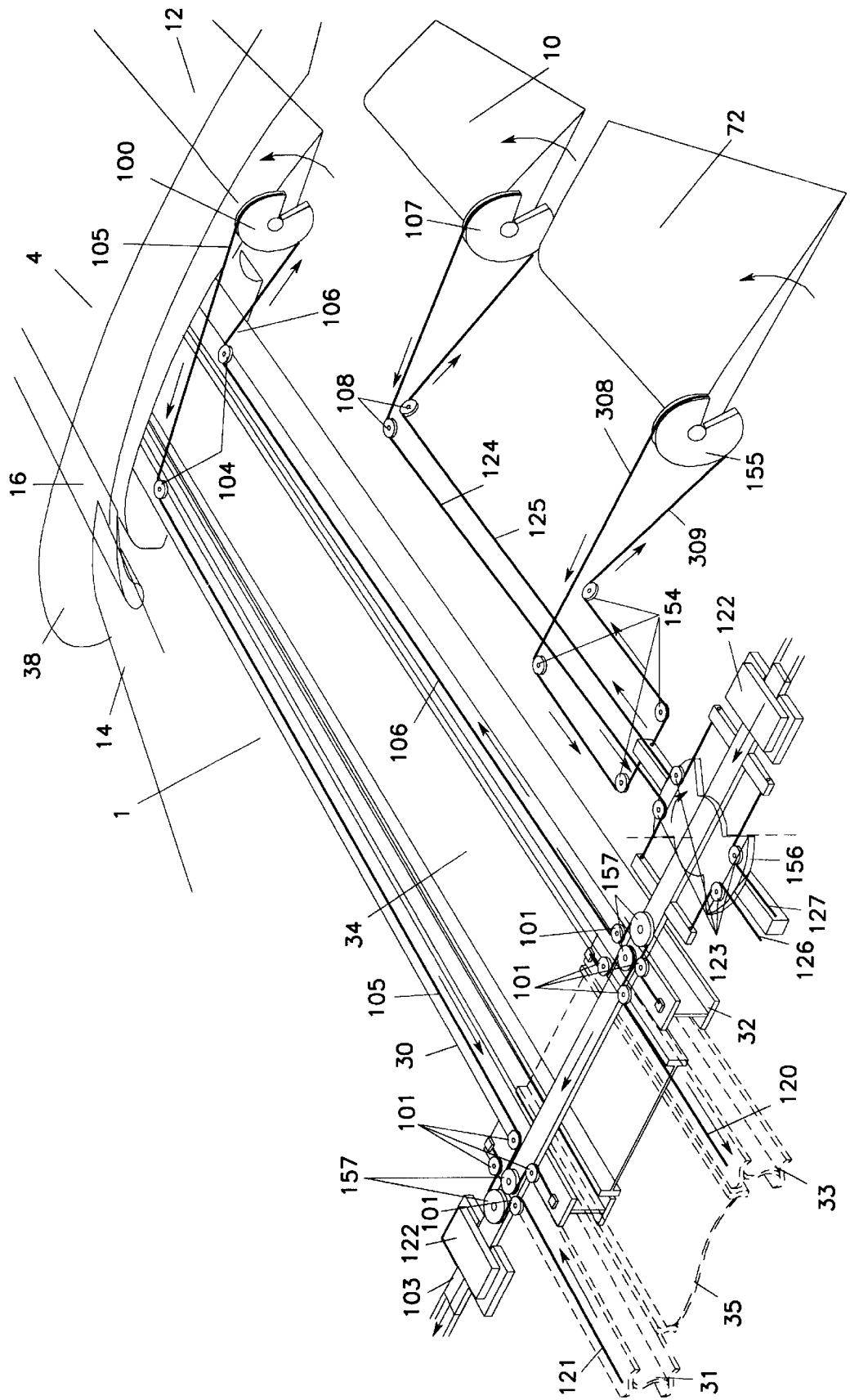
FIG. 33 is a perspective diagrammatic view of an alternate design for the actuation of the aileron systems of an aircraft according to the invention. In contrast to the actuation system depicted in FIG. 30, this figure shows a cable system for actuating both the flaps (72) and ailerons (10) of the fixed wing section and the ailerons (12) of the wing extension assembly.

Referring to FIG. 33, an alternative system for co-actuation of the fixed wing aileron (10) and the extension panel aileron (12) is shown. In this system, cable linkages are responsible for actuation of all ailerons (10, 12) and flaps (72), rather than a combination of cable linkages and control rods, bars and bellcrank-type joints. (Cf. FIG. 32.) The actuation system for the extension panel aileron is essentially as depicted in FIG. 32. For actuation of the starboard fixed wing aileron (10) and starboard flap (72), the control bar (103) is connected to the fixed wing aileron (10) via two cables (124 and 125). Cable 124 is fastened at one end to the control bar (103), threaded through an inner aileron actuator pulley (123) rotatably fastened to a pivoting master flap actuator plate (156) (controllable by the pilot by a mechanism not shown here), through an aileron guide pulley (108), then fastened at the other end to a sectioned pulley (107) fixedly attached to the aileron (10). Cable 125 is similarly attached, in opposing fashion with respect to cable 124, as shown in FIG. 33. A sectioned pulley actuating plate (155) fixed to the main wing flap (72) is similarly attached, via two cables (308 and 309), through guide pulleys (154) to the pivoting master flap actuator plate (156), as shown.

In operation, pivoting of the master flap actuator plate (156) by the pilot causes the flap (72) and the main wing aileron (10) to move together. Fore-aft movement of the actuator control ion wing aileron (12) to move in concert.

A corresponding actuating system for the port side extension panel and fixed wing section ailerons is indicated in FIG. 33 by the corresponding cables (120 and 121 for the wing extension panel aileron; 126 and 127 for the fixed wing section aileron) attached to the port fore and aft lift spars (31 and 33) and the master flap actuator plate (156), respectively. As in FIG. 32, the inboard end of a port wing extension panel assembly is depicted in phantom lines. The arrows in FIG. 33 show the direction of movement of the components of the system when the control bar (103) is moved forward.

The Engines and Belt-Driven Propellers

Preferred aircraft according to the present invention will employ an innovative power train and means of propulsion incorporating two engines, mounted inboard (i.e., within the fuselage on the centerline of the aircraft), which drive (via a system of drive belts) two pusher-type propellers mounted on the wing or, most preferably, on mounting armatures such as described previously that permit the position of the propellers to be changed at the option of the pilot. This propulsion system not only harmonizes with other aeronautical discoveries described herein, such as the bilaterally extendable compound wing, the pivoting mounting armatures and the multi-purpose compound landing gear, but also eliminates many safety hazards unavoidable in conventional multi-engine aircraft, improves the efficiency of the airfoil, eliminates gravity loads that conventionally must be borne by the wings, offers greater protection to the engines and lowers the aircraft's center of gravity while utilizing space normally wasted in conventional aircraft, and virtually eliminates the dangers ordinarily associated with unexpected failure of one engine.

According to the present invention, two engines are mounted in the fuselage of the aircraft, in tandem and in opposed relation, immediately aft of the cabin section, under the wings. Referring momentarily to FIG. 51, which is a cross-sectional view of the midsection of an aircraft according to the invention, two aircraft engines (24 and 25) are seen in silhouette. Air-cooled aircraft engines, such as the six-cylinder, horizontally opposed Lycoming IO-540, are suitable, however water-cooled automobile engines, such as a GMC 454-cubic inch V-8 engine, would also be suitable.

The engines are preferably mounted, using conventional rubber engine mounts, to a steel frame, which frame is bolted to the fuselage. This permits easy removal of the engines for servicing or replacement. Moreover, if changes occur in the specifications for the engines (or changes occur in regulations governing the power requirements), the engines can be switched without the necessity of designing new external engine mounts, fairings or nacelles, and without refiguring the physics of the airfoil. Thus, even where the aircraft is in mass production, a complete alteration of the power plant can be implemented without interruption of the production line or retooling of production machinery.

Mounting two engines in opposed relationship permits the propellers to be driven in opposite directions (counter-rotating propellers), without requiring one engine to be a custom-made counter-rotating engine. There are several disadvantages to multi-engine aircraft with propellers that turn in the same direction. Such aircraft have a tendency to yaw in one direction (left or right) for several reasons rooted in the same-direction motion of the propellers: Reaction of the aircraft to the torque required to turn the propeller, asymmetric thrust due to unequal angles of attack of the upward-turning and downward-turning blades, the effect of the twisted air flow behind the propeller, and gyroscopic turning moments. All of these forces tend to compromise the controllability of the aircraft, and the negative traits can be amplified where there is a differential power output to the propellers.

In an aircraft according to the invention, two identical engines can be used to drive two oppositely rotating propellers, and the disadvantageous reaction to torque, asymmetric thrust and gyroscopic turning moment resulting from one rotating propeller are all cancelled by the opposite forces of a counter-rotating propeller. The turbulence behind the propellers is also balanced, and the aircraft rotational inertia is minimized by placing the items of greatest mass (the engines) near the center of gravity. In addition, since the engine mass is near the center of the fuselage rather than on the wings, the center of gravity is lower, which is especially beneficial to amphibious aircraft for taxiing and performing other operations on the water.

In conventionally designed multi-engine propeller aircraft, the engines are housed in nacelles on the wings. Although the nacelles are shaped to be as aerodynamically harmless as possible, there is no escape from the fact the area of the wing surface taken up by the nacelles and aft of the nacelles provides no lift, and the nacelles themselves create drag. These disadvantages are eliminated by placing the engines inboard and modifying the wing surface only to the extent necessary to accommodate the propeller mounts. The efficiency of the airframe is thus improved.

Conventionally mounted propeller/engines on a multi-engine aircraft must be located far enough from the longitudinal centerline of the aircraft for the propellers to clear the sides of the fuselage. This distance off the centerline makes conventional multi-engine aircraft difficult to control in the event of an engine failure, which requires immediate correction of the asymmetric thrust provided by the live engine (s) and sudden drag of the dead propeller/engine if uncontrollable spin or unintentional "wing-over" are to be avoided. These hazards are eliminated in aircraft according to the present invention, because by employing a system of overrunning clutches and a simple gearbox (see FIG. 37, discussed infra), the failure of one inboard engine will not lead to the failure of either propeller. Rather, the power from the engine that remains in service is transferred instantly to both propellers, requiring the pilot to adjust only to the power reduction and not requiring compensation for a sudden imbalance of thrust and responsiveness of the control surfaces.

Figure 34:
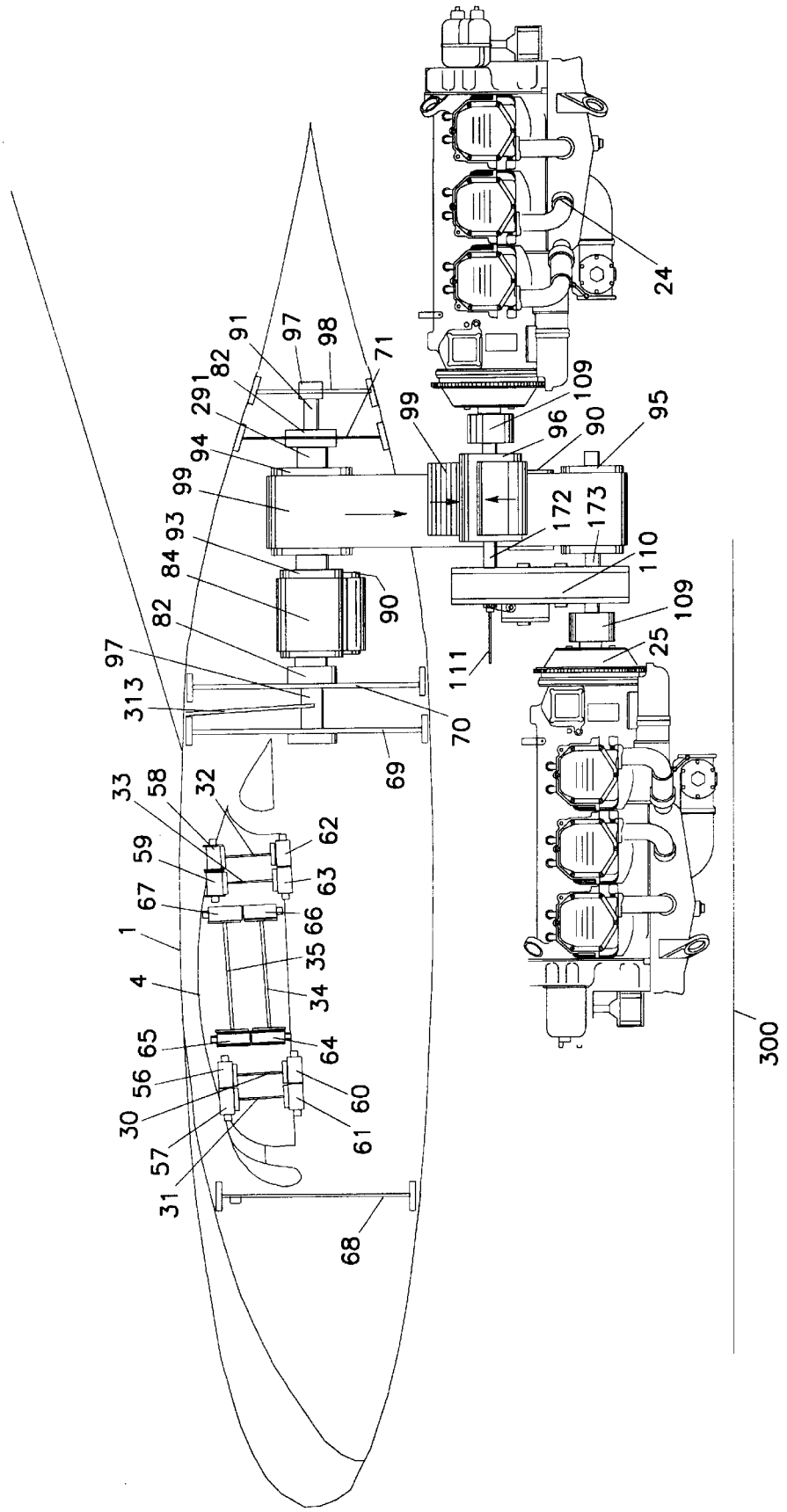
FIG. 34 is a cross-sectional view of the fuselage taken on line 34—34 in FIG. 15, showing the relative positions of the powerplants and the belt drive system in a preferred embodiment of this invention. Air cooled aircraft engines are depicted.

Referring to FIG. 34, the midsection of the aircraft pictured in FIG. 15 is shown in cross-section (view 34—34). The relative position of the engines (24 and 25) to the fixed wing structure (1) and the fuselage (300) is seen.

FIG. 34 also shows, within the fixed wing structure (1), the intermeshed support structures of fully retracted starboard and port wing extension panels, including the forward lift spars (30, 31) and guide rollers (56, 57, 60, 61), starboard and port drag spars (34, 35) and guide rollers (64, 65, 66, 67), and starboard and port aft lift spars (32, 33) and guide rollers (58, 59, 622, 63). Support structures of the main fixed wing section (1) are also shown, including a forward main wing spar (68) and a rear main wing spar (69).

The two engines (24 and 25) drive overrunning clutches (109) which allow torque (power) to be transmitted in one direction only (in this case clockwise). In the opposite direction the clutches (109) turn freely. The rear engine (24) and its overrunning clutch (109) drive a shaft (172) on which a belt pulley (96) (or, alternatively, a chain sprocket) is attached. The belt pulley (96) drives a cog belt (99) (or chain), which cog belt (99), in turn, goes on to drive mechanisms in the port wing not seen in this figure. In addition to driving the port belt pulley (96), the rear engine shaft (172) also drives a gear (184 in FIG. 37, discussed infra) inside a gearbox (110).

In like fashion, the forward engine (25) and its overrunning clutch (109) drive a forward engine shaft (173), on which are attached a gear (187 in FIG. 37, discussed infra) in the gearbox (110) and a starboard belt pulley (95) (or, alternatively a chain sprocket). This belt pulley (95) drives a cog belt (99) (or chain), which runs to the starboard side of the wing as shown in FIG. 34, and drives a pivot transfer pulley (94). The pivot transfer pulley is attached to a pivot transfer drive shaft (291) rotatably mounted in bearings (82) attached to a forward upper armature spar (70) and a rear upper armature spar (71). There is a co-axial armature pivot shaft (91) running through the length of the pivot transfer drive shaft (291) and extending fore and aft to armature pivot bearings (97), which are attached to the rear main wing spar (69) at the forward end and a rear auxiliary wing spar (98) at the aft end. The pivot transfer drive shaft (291) is therefore itself a tubular bearing, freely rotatable about a co-axial armature pivot shaft (91).

Referring momentarily to FIG. 1, it will be recalled that the propellers (8 and 9) are preferably mounted on pivotally mounted armatures (6 and 7) that may be raised and lowered to change the position of the propellers relative to the wing (1). The cog belts (99 in FIG. 34) driven by the inboard engines (24 and 25 in FIG. 34) extend, in this embodiment, to the pivot points of the armatures where the engines' power is transferred to propeller drive belts extending into the upper ends of the armatures (6 and 7) to drive the propellers (8 and 9). Of course, in embodiments that do not incorporate the armature structures disclosed herein, the cog belts (99) may extend directly to pulleys attached to propeller shafts mounted in the wings.

As shown in FIG. 34, the starboard cog belt (99) drives a transfer pulley (94) fixed to pivot transfer drive shaft (291), which extends from a forward upper armature spar (70) to a rear upper armature spar (71). Also attached to the pivot transfer drive shaft (291) is a pivot transfer drive pulley (93). The spinning of the pivot transfer drive shaft (91) and pivot transfer drive pulley (93) drive a propeller drive belt (84) (or, alternatively, a chain), which extends to a starboard propeller drive pulley and shaft (not shown). Alternatively, a single rotatable pivot shaft may be utilized in place of the co-axial shafts 91 and 291, but this is less preferred, since then a constantly rotating pivot shaft would be at the center of all the mounting armature pivot points. Another alternative would be to have a single stationary pivot shaft and to have both the cog belt (99) and the propeller drive belt (84) connected to a single freely spinning pulley mounted on the pivot shaft (replacing the transfer pulley (94) and the pivot transfer drive pulley (93)), or connected to separate pulleys which are fastened together.

In the arrangement of drive belts shown in FIG. 34, small idler pulleys (90) adjust and maintain a desired tension in the belts (84 and 99). Standard, commercially obtainable toothed belts (timing belts) constructed, e.g., of steel reinforced rubber, may be used throughout this system. In the most preferred embodiments, the components of the power train will be positioned so that all four drive belts (2×84 and 2×99) are the same length. Likewise, standard toothed pulleys, shafts and bearings used in modern aircraft construction are suitable. Proper selection of the diameters of pulleys 83, 93, 94, 95, and 96 provide an overall speed reduction ratio that allows the engines (24 and 25) to run at a relatively fast speed (4400 rpm, for example), for optimum power production, while the propellers may turn at a relatively low speed, i.e., without approaching their maximum design speed (2700 rpm, for example). This propeller speed reduction eliminates the need for a costly speed reduction gearbox used on some existing aircraft engines.

Incidentally, the positioning of the engines, cog belts and propellers as described above places these major sources of the aircraft's noise behind the cabin area. This will result in an aircraft that is comparatively quiet from inside the cabin, even though the engines are inboard.

Figure 35:
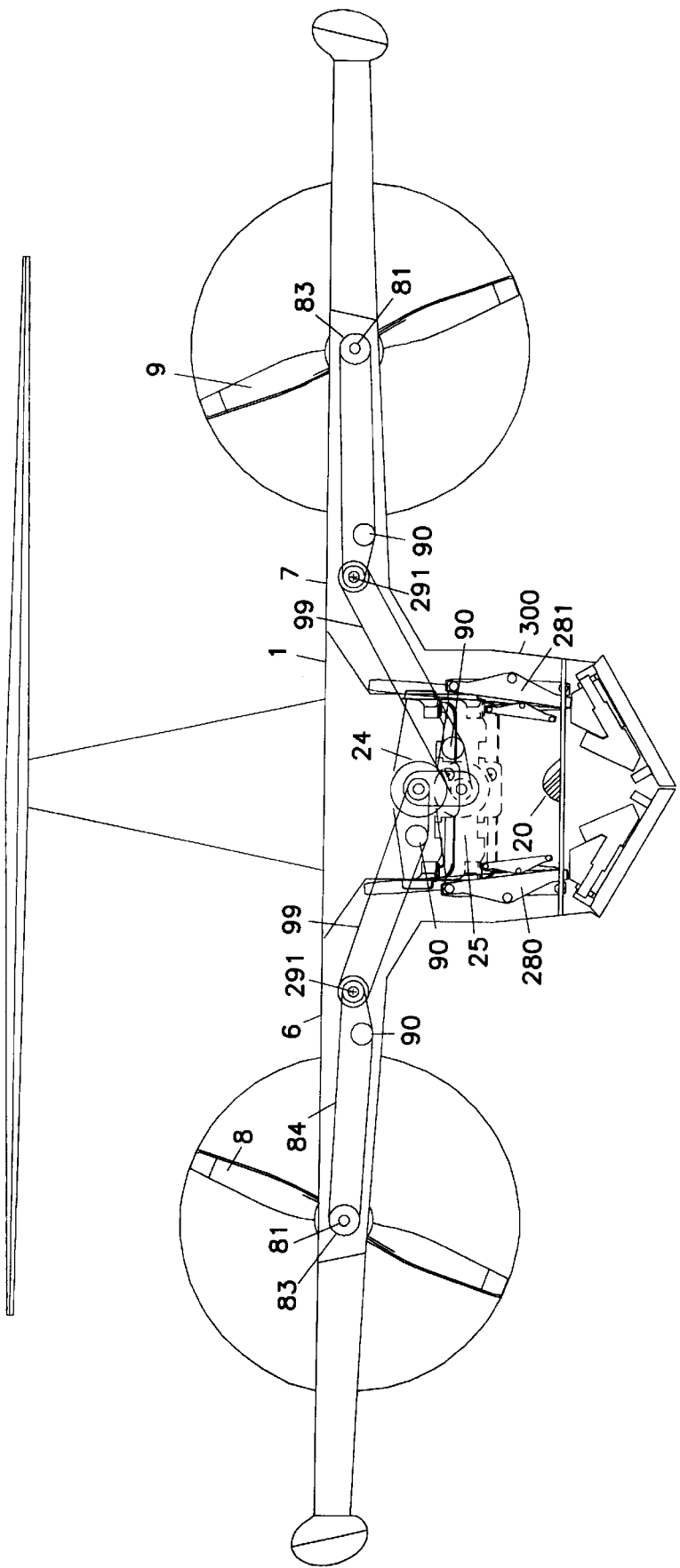
FIG. 35 is a cross-sectional front elevation of an aircraft according to the invention showing the positioning of the engines in the fuselage, the belt and pulley system for driving the propellers, and the pivotally mounted armatures providing pivoting mounts for both the landing gear and the propellers. The components depicted in this figure are shown in a configuration typical of in-flight operation (cf.

FIG. 35 is a cross-sectional front elevation of the aircraft illustrating the relative positions of several components already discussed. The position in the fuselage (300) of the rear engine (24) is shown in solid lines; the position of the forward engine (25) is seen in dotted lines. This figure shows how the starboard and port cog belts (99) extend into the mounting armatures (6 and 7) to actuate the pivot transfer drive shafts (291), at the pivot points of the mounting armatures (6 and 7).

Rotation of the pivot transfer drive shafts (291) causes propeller drive belts (84) to turn the starboard and port propeller drive pulleys (83), which are attached to the starboard and port propeller drive shafts (81), to which the starboard propeller (8) and port propeller (9) are attached. Through these belt and pulley linkages, the power of the engines (24 and 25) mounted inside the fuselage (300) is transferred to the propellers (B and 9) mounted on the armatures (6 and 7) (or, alternatively, mounted in the wings). The positions of idler pulleys (90) is also shown in this figure.

FIG. 36 provides a plan view of the midsection of an aircraft incorporating the compound wing, mounting armatures and internal engine mounting features of the present invention. Nearly all of the structures pictured in FIG. 36 have been described previously and have the same item numbers as in previous figures (see, e.g., FIGS. 1, 13, 16, 26, 34 and 35). The engines are represented in this figure only by the shafts 172 and 173 (see, FIG. 34). Additional preferred auxiliary spars for the wing (98) and for the mounting armature (119) are shown here and were not included in previous figures.

The interlocking relationship of the support structures of the extendable wing panels (4 and 5) is clearly shown in FIG. 36. With the extension panels (4 and 5) in partial extension, as shown, the starboard and port forward lift spars (30 and 31), the starboard and port drag spars (34 and 35), and the starboard and port rear lift spars (32 and 33) are seen to overlap within the enclosing structure of the fixed wing section (1). From this figure it is seen that when the wing extension panels (4 and 5) are fully retracted within the fixed wing structure (1), each of the wing extension assemblies extends across nearly the entire (fixed) wing span, i.e., from wing tip to wing tip.

FIG. 36 also shows the plan of the drive belts (84 and 99) that transfer the power provided by the engines (represented here by shafts 173 and 172) to the propellers (8 and 9). Assuming clockwise rotation of the opposed engine shafts (172 and 173), the arrows in FIG. 36 show the direction of the belts (84 and 99), which produces inwardly counter-rotating propellers. Inward counter-rotation of the propellers is preferred.

Figure 37:
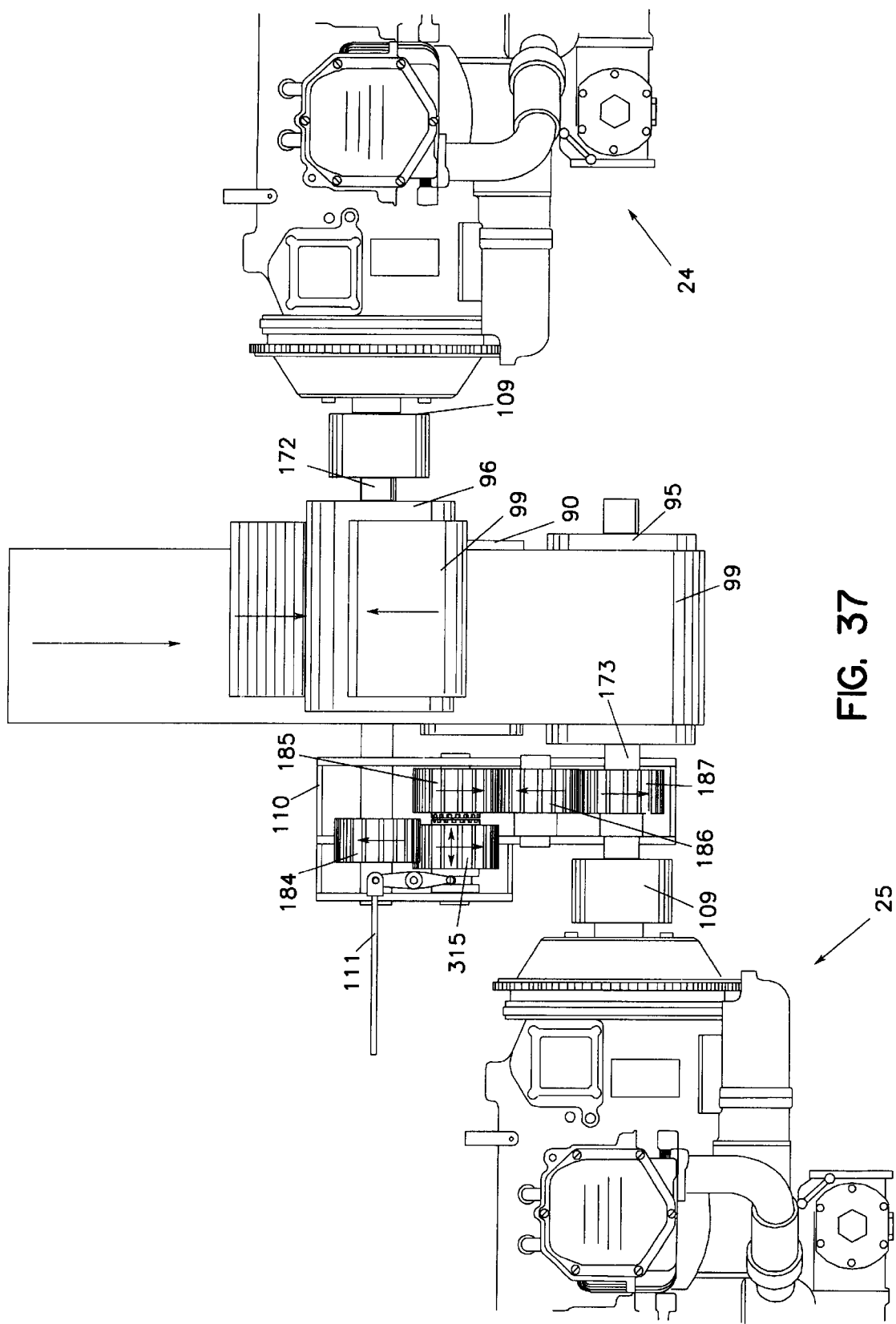
FIG. 37 is a side elevation of the engines and drive belt system disclosed herein, showing details of the gear box (110) of FIG. 34.

Referring to FIG. 37, a diagram of the simple gearbox (110 in FIG. 34) is shown. The gearbox permits power from one engine (24 or 25) to be automatically transmitted to both propellers, in the event of the other engine failing or being shut down. Disengaging the gears, by means of a gearing control arm (111), makes the rotation of the propellers completely independent.

The gearbox (110) preferably houses five gears (184, 185, 186, 187 and 315). Gear 184 is driven by the rear engine (24); gear 187 is driven by the forward engine (25). The two gears 185 and 186 are idler gears, and gear 315 is an idler gear that can be moved along its shaft (see double-headed arrow) by means of the gearing control arm (111) while in motion. The moveable idler gear (315) can be positioned so that it is disengaged from idler gear 185 (pictured), or it can be positioned so as to mesh via dogface sprockets (unnumbered) with gear 185. The idler gears 185 and 315 in FIG. 37 may alternatively be replaced by a single moveable idler gear that can be moved to engage both gears 184 and 186.

In the fully engaged position, the gears (184, 185, 186, 187 and 315) in the gearbox (110) cause the pulleys, belts, and propellers in this design to operate as one system (i.e., both propellers run at the same speed). With the gearbox disengaged, the front engine (25) and the port propeller (9 in FIG. 36) and associated pulleys and belts run as a separate system from the rear engine (24) and the starboard propeller (8 in FIG. 36) and associated pulleys and belts. In the disengaged configuration the aircraft operates much like a conventional twin-engine aircraft, at least in terms of the independence of the two propulsion systems. A great safety advantage is realized when the gears are engaged: The two propeller drive systems are connected by means of the gearbox to each other, so that if power from one engine should be compromised the other engine would automatically provide power to both propellers evenly without requiring the pilot to take corrective action. Thus, with the gears engaged, a single engine shutdown does not lead, as in conventional multi-engine aircraft, to the aircraft being suddenly asymmetrically powered, and consequently the aircraft according to the invention acquire the performance advantages of multi-engine aircraft while achieving the operating simplicity of single-engine aircraft, and they realize the best of the safety characteristics inherent in each type of aircraft.

The capability of unifying the power trains of all propellers through a simple gearbox as just described will have several carry-through advantages in subservient systems that may also be unified correspondingly. For example, in conventional engine/propeller systems, a separate propeller governor geared to the engine provides a means of adjusting the pitch of the propeller blades to maintain a speed set by the pilot. In accordance with this invention, both propellers may be driven at the same speed through a common gearbox, thus individual propeller governors to set the speeds of the propellers is not necessary. Instead, means such as an automatic hydraulic selector valve may be provided so that engaging the gears, e.g., via gearing control arm 111 (FIG. 37), will automatically select one propeller governor to control all the props, leaving the remaining propeller governor(s) as safety backups.

The Mounting Armatures

A particularly innovative feature of preferred aircraft according to this invention is the incorporation of pivotal mounting armatures, already discussed with reference, e.g., to FIGS. 1, 4, 6, 7, 34, 36 (and many of the other drawings). Further appreciation of composition and function of the pivotal mounting armatures will be gained by reference to FIGS. 38, 39, 41, and 42, which show starboard and port mounting armatures isolated from the body of the aircraft but in proper spatial relationship to each other, as if they were installed on an aircraft in accordance with the teachings herein.

Figure 38:
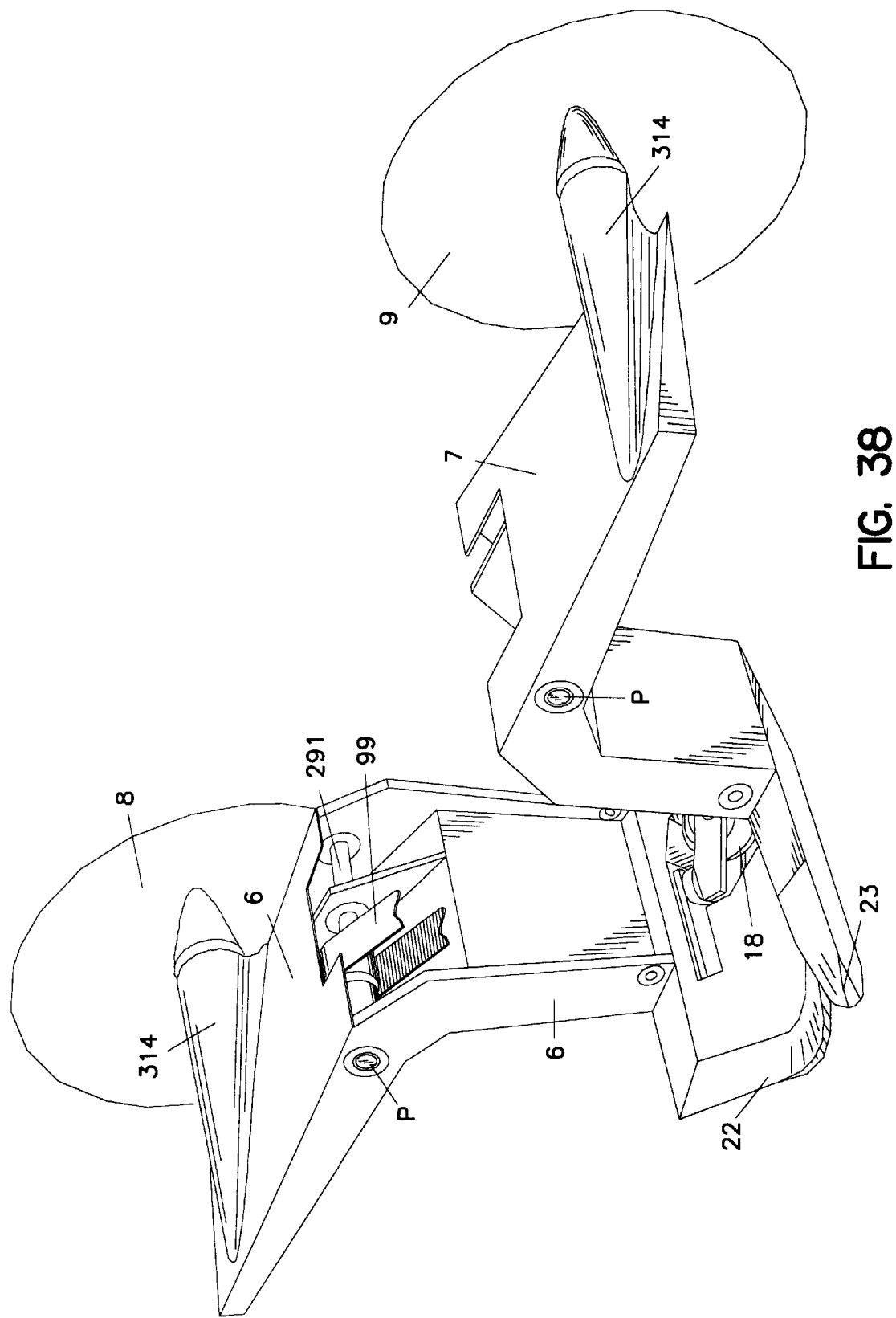
FIG. 38 is a perspective view of starboard and port curved mounting armatures and mounted propellers, shown in isolation from the aircraft (cf.

Referring to FIG. 38, opposingly positioned starboard (6) and port (7) mounting armatures are shown in perspective, in the orientation they would have in, e.g., an aircraft as pictured in FIG. 5 (landing gear retracted, propeller centers level with the wings). Flotational pontoon landing gear (22 and 23) are incorporated in or mounted at one end of each mounting armature (6, 7), and a starboard caster-type stabilizing wheel (18) is shown retracted into a recesses in the starboard pontoon (22) (the like port caster-type stabilizing wheel is not visible in this view). The pivot points of each armature are indicated at P in FIG. 38, and it is through the pivot points that the mounting armatures (6 and 7) are pivotally fixed to the main wing structure (1 in FIG. 36) by a pivot shaft (91 in FIG. 36). The propellers (8 and 9, indicated by circular arcs in FIG. 38) are mounted at the opposite end of either armature (6, 7) from the landing gear, in nacelles (314) formed in the surface of the armatures. The belt-and-pulley drive system for the propellers, discussed previously with reference to FIGS. 34, 35 and 36, is recalled in this figure by the partial cog belt (99) and the pivot transfer drive shaft (291). The propeller drive belt (84 in FIG. 36), and the propeller drive pulley and shaft are enclosed within the mounting armature and thus are not visible in this drawing.

The pivotal mounting armatures of the present invention provide a means of coordinating the placement of the propellers and the exposure of different types of landing gear. It will be appreciated by reference to drawings such as FIG. 38 that the compound landing gear mounted at the lower ends of the armatures are kept at substantially the same distance from the propellers mounted on the upper ends of the armatures. But while the separation of landing gear and propellers remains constant, their orientation with respect to the rest of the aircraft (and the ground) may be changed, because of the pivotal attachment of the armatures to the fixed wing structure (1 in FIG. 1) of the aircraft.

Figure 39:
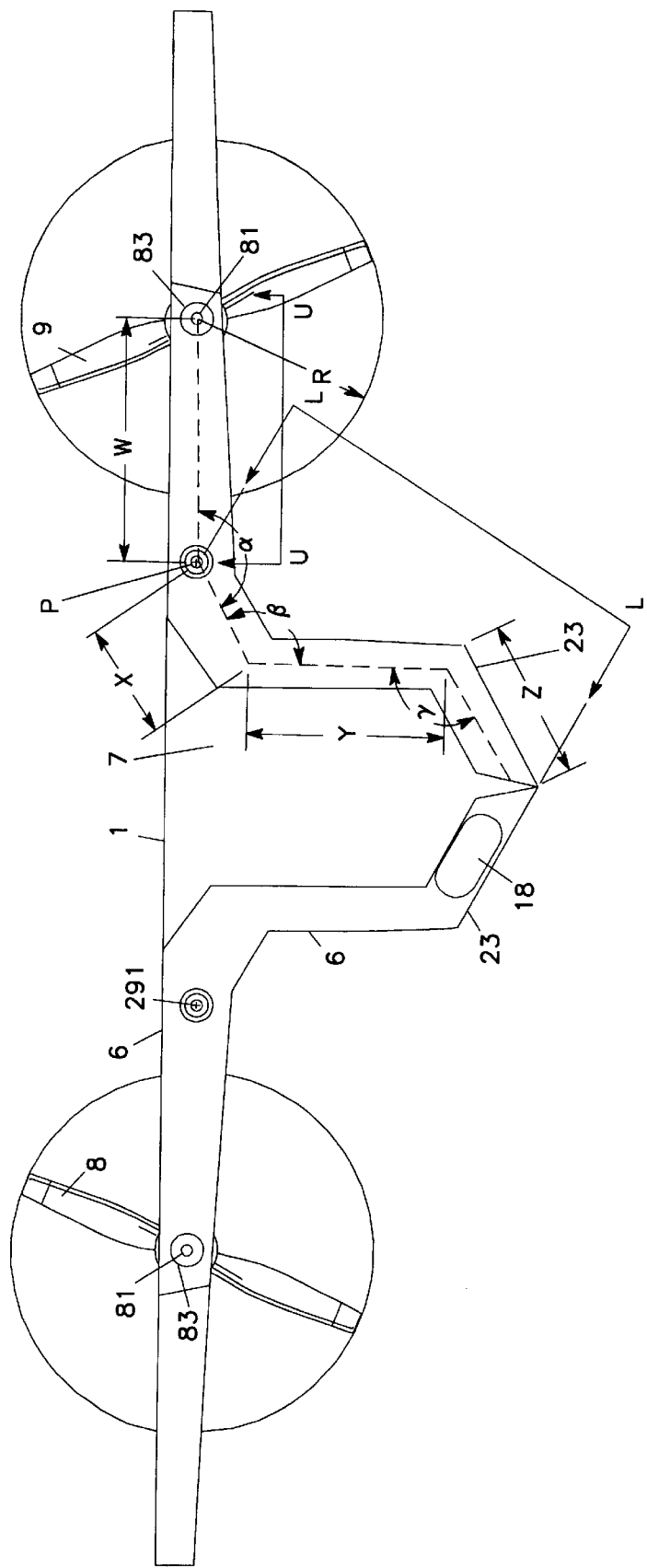
FIG. 39 is a frontal diagram of two pivotal mounting armatures in the same relation as depicted in FIG. 38, provided to indicate the preferred shape and dimensions of such armatures.

Referring to FIG. 39, the armatures (6 and 7) may be considered as having an upper end (or propeller end) and a lower end (or landing gear end) with respect to the pivot points (P). For example, the upper end of armature 7 in FIG. 39 is indicated by the arrowed line U—U, and the lower end of the armature 7 is indicated by the arrowed line L—L. While not wishing to be limited to one particular shape or any particular set of concrete dimensions, the preferred mounting armatures depicted in the drawings may be broadly described as incorporating four segments, at differing angles to one another, indicated as W, X, Y, and Z in FIG. 39. A dashed line represents a centerline through all four segments of mounting armature 7. It will be appreciated that segments W and Y are substantially perpendicular to each other, since, in the orientation illustrated here, segment W is coextensive with the wing structure and segment Y is coextensive with the fuselage. The relative angle of segment X, which connects segments W and Y, may vary widely according to design choices but ideally is sufficient to accommodate the angle of a single drive belt (e.g., 99 in FIG. 35) extending from the inboard engine shaft (172 or 173 in FIG. 34) to the transfer pulleys on the pivot shafts (e.g., 291 in FIG. 35). The angle of segment Z, which extends inboard from segment Y, also may vary widely in accordance with design choice but ideally is sufficient to conform the angle of the segment Z to the angle of the keel of the hull-type fuselage (300 in FIG. 35). The barrier dimensions of the armatures will generally follow the centerline but may taper and curve in order to provide fairing, to improve the fit of the armature into recesses, or to make the outer surfaces of the armatures aerodynamically smooth or capable of merging with an aerodynamic surface (i.e., wing or fuselage).

Referring again to FIG. 39, the precise dimensions of the segments W, X, Y and Z may vary, so long as at least one-object of the invention is accomplished. Segment W must be long enough to prevent the propeller blades (8 and 9) from striking the fuselage at all points of rotation of the armatures and must not be so long that at the armatures' farthest rotation away from the fuselage (see, e.g., FIG. 9) the propellers (8 and 9) mounted in the upper end (U—U) physically interfere with each other. (Slight overlap of the propeller arcs may be accommodated, however, by fore-and-aft staggering of the propellers.) The dimensions of segments X, Y and Z together cannot be so long that the lower end (L—L) of the armature (i.e., the pontoons 22 and 23) fail to clear the water during a water landing. That is, at maximum rotation of the armatures away from the fuselage (see, e.g., FIG. 9), the pontoons (22 and 23) must be above the water line of the fuselage. It will be additionally appreciated, referring briefly to FIGS. 6–10, that the mounting armatures (6 and 7) are shaped such that deployment of the stabilizing landing gear to any of the landing positions places the lower end of the armatures outboard of the pivot point, and therefore the forces encountered on landing tend to open rather than to collapse the armatures and landing gear. In accordance with these factors, in an aircraft according to this invention having the dimensions recited supra for a most preferred embodiment having the general configuration illustrated in FIG. 1 (see page 20), by way of illustration and not of limitation, the dimensions of the mounting armatures would be as follows: Segment W, 44 to 48 inches; segment X, 19 to 24 inches; segment Y, 34 to 38 inches; segment Z, 28 to 32 inches; angle $\alpha$ (between W and X), 145° to 155°; angle $\beta$ (between X and Y), 115° to 125°; and angle $\gamma$ (between Y and Z), 110° to 130°. The most preferable dimensions for this particular embodiment: W, 46 inches; X, 21.5 inches; Y, 36 inches; Z, 30–31 inches; $\alpha$, 150°; $\beta$, 120°; $\gamma$, 120°.

Figure 40:
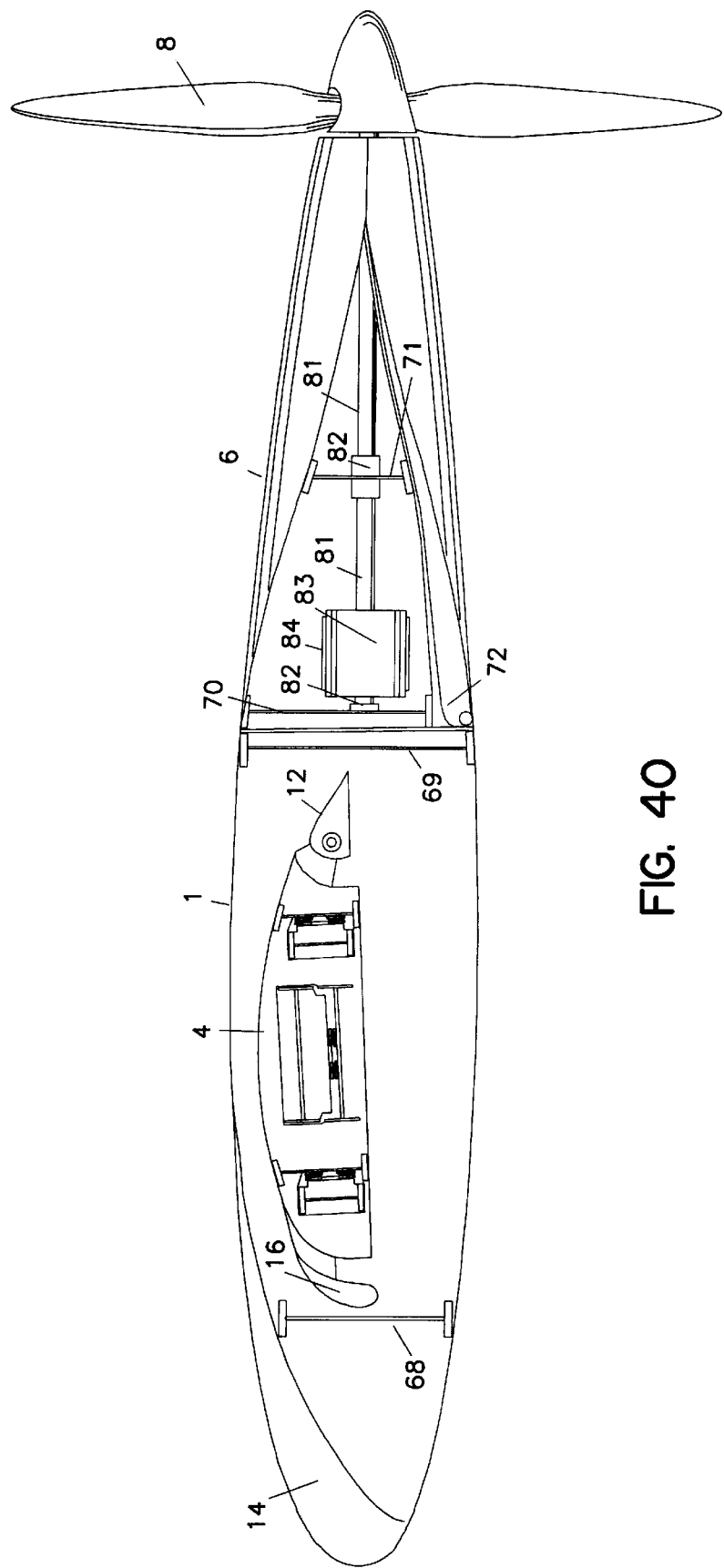
FIG. 40 shows a cross-sectional view of a wing taken on the line 40—40 of FIG. 15.

Referring to FIG. 40, a cross-section of the starboard wing (ref. FIG. 3) is shown, where the mounting armature (6) is rotated fully inboard, so that the upper end of the mounting armature has merged with the fixed wing structure (1). FIG. 40 shows a smooth aerodynamic surface provided by the now juxtaposed wing structure (1) and mounting armature (6). Within the armature housing, the propeller shaft (81) is seen to extend from the starboard propeller (8) through a bearing (82) in the rear upper armature spar (71) to a bearing (82) in the forward upper armature spar (70). The split flap (72) of the fixed wing section (1) is shown in raised position, and the leading edge slat of the main wing section (1) is shown fully retracted.

Figure 41:
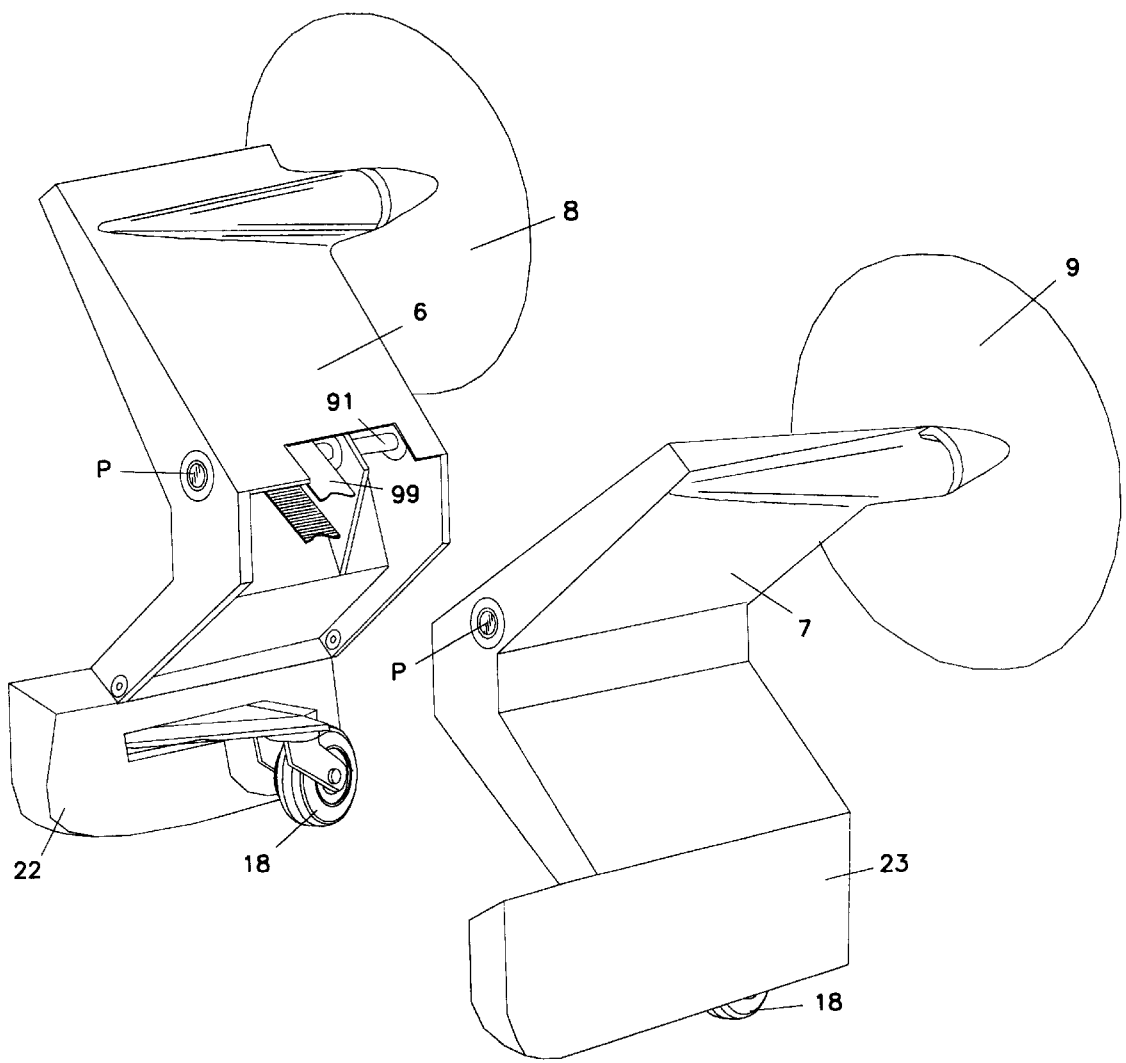
FIG. 41 is a perspective view of starboard and port curved mounting armatures and mounted propellers, shown in isolation from the aircraft (cf.

Referring to FIG. 41, the two pivotal mounting armatures (6 and 7) are shown as in FIG. 38, except that both armatures have been rotated around the pivot points (P) to be in the appropriate orientation for landing on a hard surface or runway. Rotation of the armatures to the position illustrated brings the stabilizing wheels (18) into position for landing. The wheels are swung out from the recesses in the pontoons (22 and 23, ref. FIG. 38), e.g., by means of an actuating lever linked to one segment of a multilink actuating strut (not shown, discussed infra). The propellers (8 and 9), in this orientation, are raised far enough above the wing so that substantially all of the arc of each propeller is above the wing. This is advantageous for takeoff and landing attempts, because the propeller blades in raised position are less likely to encounter debris from the ground and the propeller wash is directed over the control surfaces of the tail section.

Figure 42:
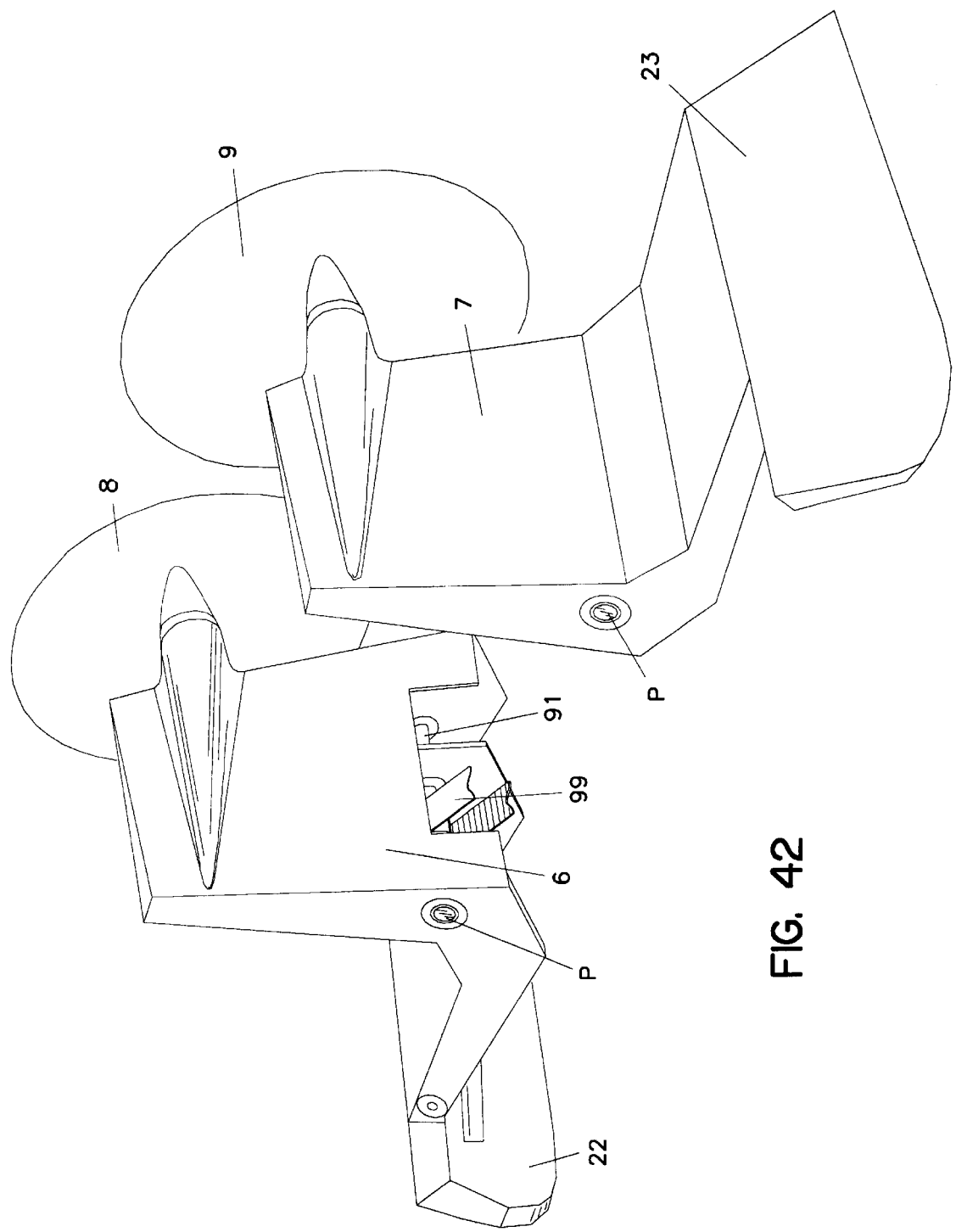
FIG. 42 is a perspective view of starboard and port curved mounting armatures and mounted propellers, shown in isolation from the aircraft (cf.

Referring to FIG. 42, the two pivotal mounting armatures (6 and 7) are shown as in FIG. 38, except that both armatures have been rotated around the pivot points (P) to be in the appropriate orientation for landing on water, i.e., the pontoons (22 and 23) have been rotated into the appropriate position, the stabilizing wheels (18) have been retracted, and the propellers (8 and 9) have been raised to their maximum distance above the wing. In this orientation, the propellers are shielded by the wing from water spray, and the prop wash is conducted more directly over the control surfaces of the tail section. The increased downward lift caused by the prop wash over the tail section partially counteracts the undesirable forward (nose-down) pitch that results from raising the thrust line. It should be recalled, however, that even though the thrust line is raised by rotation of the armatures, the center of gravity does not change appreciably, since the mass of the engines remains below the wings, in the fuselage.

Figure 43:
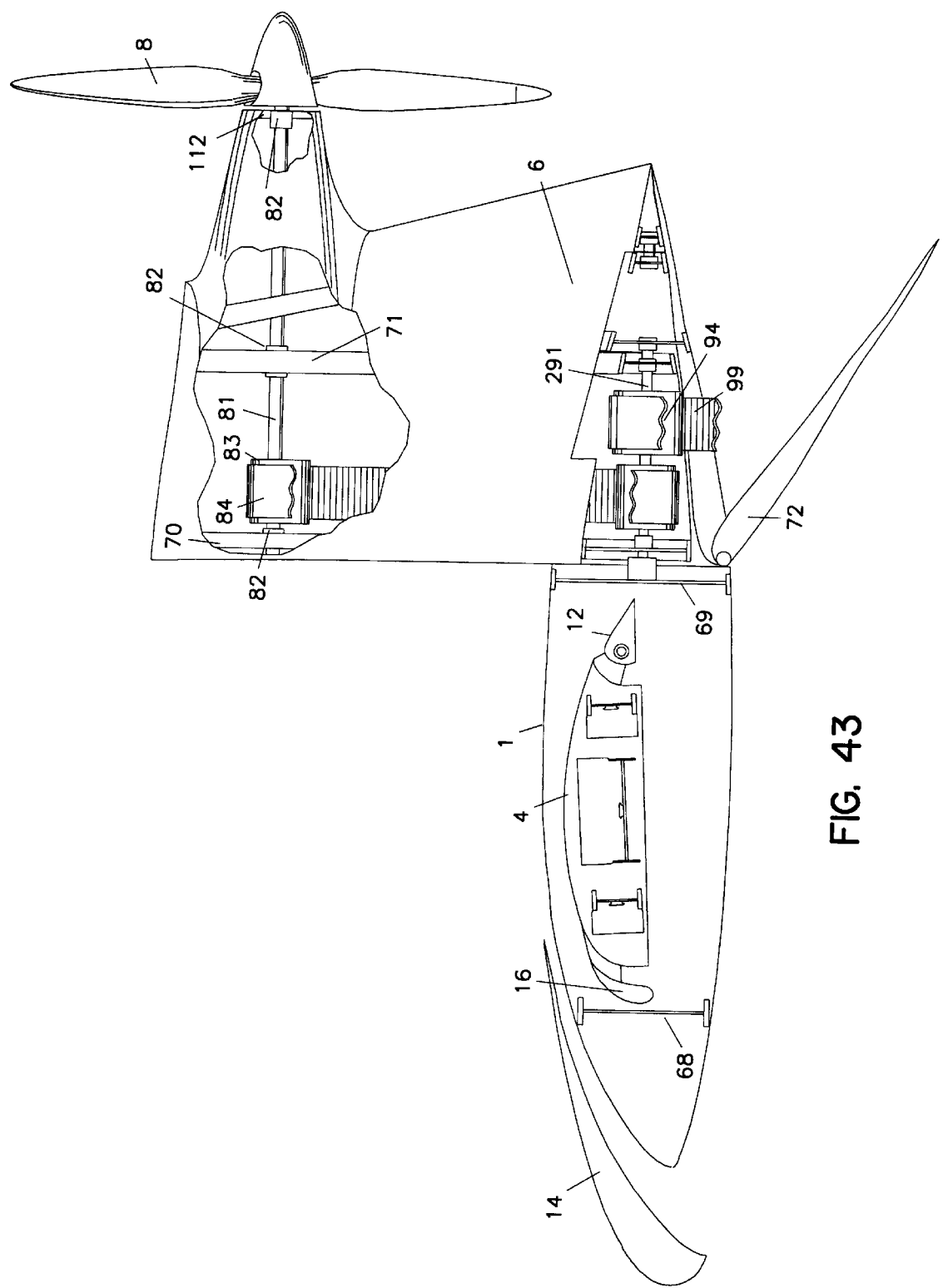
FIG. 43 is a cross-sectional view of a wing taken on the line 43—43 of FIG. 14, showing the relative position of the propeller mounting to the wing when the aircraft is in a takeoff/landing configuration as depicted in FIGS. 1, 6, and 8. In a cutaway, the relationship between the propeller, propeller shaft and propeller drive belt is shown.

Referring to FIG. 43, a cross-section of the starboard wing (ref. FIG. 1) is shown, where the mounting armature (6) is rotated partially outboard, so that the upper end of the mounting armature is raised above the fixed wing structure (1). Within the armature housing, the propeller shaft (81) is seen to extend from the starboard propeller (8), through a bearing (82) in the propeller nacelle bulkhead (112), through another bearing (82) in the rear upper armature spar (71), to a bearing (82) in the forward upper armature spar (70). A propeller drive pulley (83) is attached to the propeller shaft (81) and is turned by a propeller drive belt (84), which extends down to a pivot transfer drive pulley (unnumbered) attached to a pivot transfer drive shaft (291). A transfer pulley (94) also attached to the pivot transfer drive shaft (291) is turned by a drive belt (99). The split flap (72) of the fixed wing section (1) is shown in a lowered position, and the leading edge slat (14) of the main wing section (1) is shown fully extended.

The mounting armatures of the present invention may be actuated by any conventional means that serve to rotate the armatures about their pivot mounts. Pressure-driven (e.g., hydraulic, air) or screw-driven rods, for instance, that are set transversely in the fuselage and are extended horizontally to push the lower ends of the armatures away from the fuselage may by utilized, or gear-driven pivots (P in FIG. 42) may also be employed. These mechanisms, however, have disadvantages relating to the precision with which the armature extension can be controlled and relating to the absorption of landing stresses.

The preferred actuator mechanism for extending and retracting the pivotally mounted armatures according to this invention is a multilink actuator strut such as is depicted in several of the frontal elevation drawings discussed previously. (See, for example, items 280 and 281 in FIGS. 6, 7, 8, 9 and 10.) Referring first to FIG. 9, in which the multilink actuator struts (280 and 281) are at their fullest extension, the struts are seen to form (with the fuselage and the armatures) an arrangement of two back-to-back 4-bar linkages.

For each multilink actuator strut, a series of four rectangular links, connected end-to-end and together measuring the proper length to achieve the maximum desired outboard rotation of the mounting armatures, is attached at one end to the Y fuselage and at the other end to the lower end of the mounting armature. These connections leave three joints in the series of four links between the fuselage and the mounting armature. A fifth link is attached at one end to the center joint in the 4-link series and is attached at the other end high on the fuselage, so that the fifth link, the fuselage and the inboard two links of the 4-link series form a 4-bar linkage. Two hydraulic (pictured) or screw-driven actuators are connected to the 4-link series so as to permit collapse (independently) of the outboard two links and the inboard two links at the unbraced joints. By collapsing the inboard two links, an intermediate positioning of the armatures is achieved (see, FIGS. 6, 7 and 8); and by collapsing both the inboard two links then the outboard two links, the entire 4-link series is folded into the fuselage (see, e.g., 280 and 281 in FIG. 35), and the armatures are fully retracted.

The links of the multilink actuator struts will be sized to provide the exact positioning of the armatures necessary to deploy the desired configuration of landing gear or propeller position. Collapse of one or both of the 4-bar linkages of the multilink actuator struts will provide automatic "stops" to the mounting armature rotation, eliminating the need to calibrate the pressure or screw-driven components of the actuator system.

The Compound Landing Gear

A further innovative feature of preferred aircraft according to the invention is the incorporation of compound landing gear that enable the aircraft to be modified in flight for landings on a variety of surfaces (water, hard surface, snow). Prior to this invention, there were no aircraft capable of safe landings and takeoffs from all of water, tarmac and snow, and certainly no aircraft that could be modified to land on any of those surfaces, at the option of the pilot, while still in flight.

Aircraft incorporating the compound landing gear described herein will not only have the capability of landing on many surfaces, they will realize additional advantages from the particular design of the compound landing gear. For example, the compound landing gear of the present invention is expected to provide more efficient transmission of the inertial load to the ground on hard landings. In addition, the utilization of ski-type gear that may be retracted to be substantially flush with the fuselage is expected to provide a shock-absorbing effect in the event of a "wheels-up" landing (belly landing). Also, having the primary landing gear descend from the fuselage requires shorter landing gear mounts (compared with wing-mounted landing gear) which have a lower bending moment and are thus less apt to collapse from incidental lateral loads, such as from tight radius turns at too high a speed, landings with incorrect drift correction, or even collisions with ground vehicles.

The compound aircraft landing gear of the present invention include three components:

A) a forward landing gear component positioned forward of the center of gravity of the aircraft, substantially completely retractable into the fuselage, including integrated steerable ski and steerable wheel subcomponents;

B) a main central landing gear component, substantially completely retractable into the fuselage, including integrated skis and steerable wheel subcomponents, each of which may be deployed to a point 8–13° (preferably 10–11°) aft of the center of gravity of the level aircraft and which, when retracted, assist in formation of (or retract to form) a step in the fuselage at a point 8–13° (preferably 10–11°) aft of the center of gravity of the level aircraft; and C) a lateral stabilizing gear component comprising two bilaterally situated stabilizing members, each of which may be deployed on either side of the aircraft to a point 8–13° (preferably 10–11°) aft of the center of gravity of the level aircraft and substantially aligned with the main central landing gear, and each member including integrated pontoon and wheel subcomponents.

Figure 46:
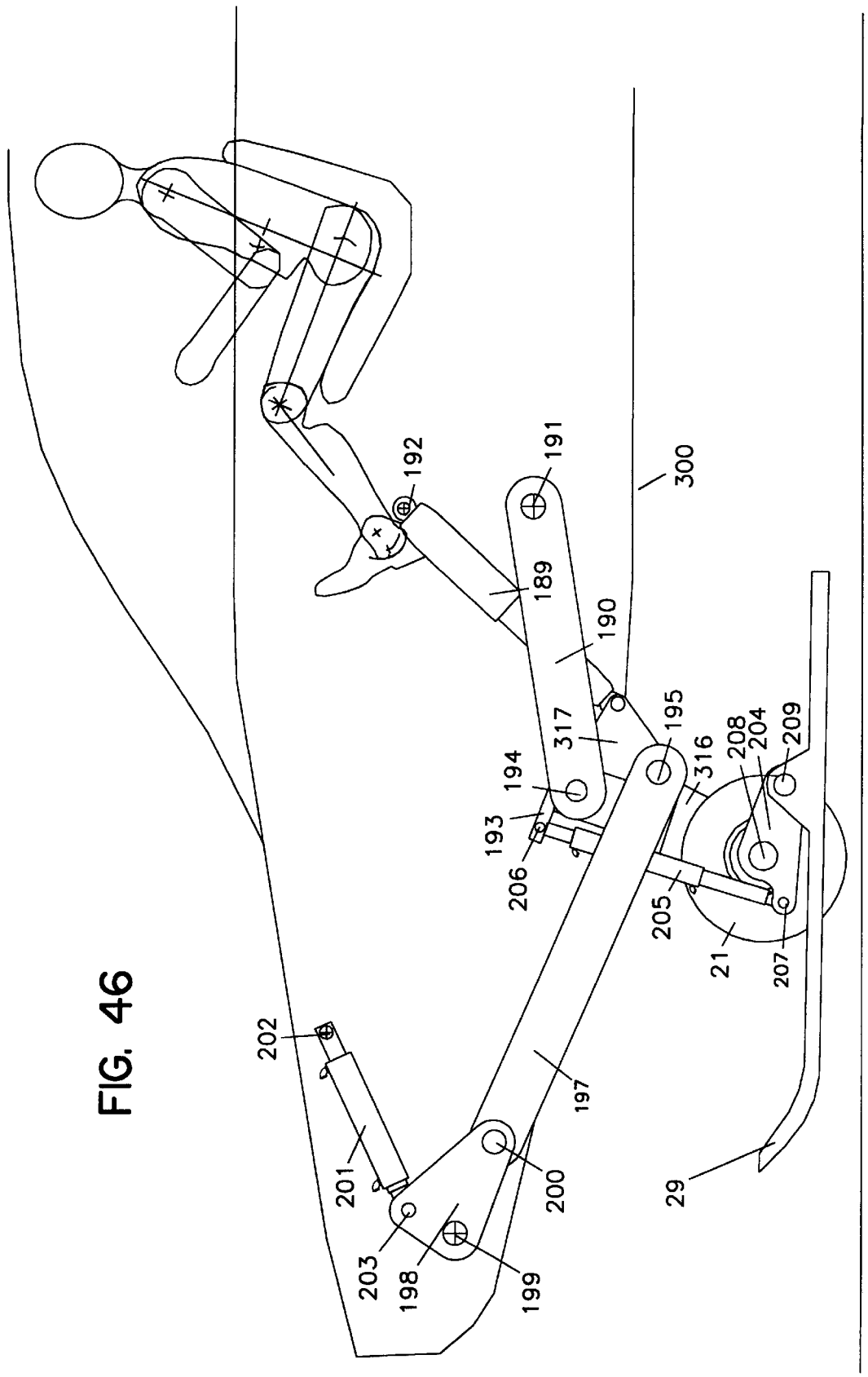
FIG. 46 is a similar cross-sectional view to FIG. 44, except the forward landing gear are shown fully extended (uncompressed), in a configuration typical of the instant before landing or the instant after takeoff.
Figure 47:
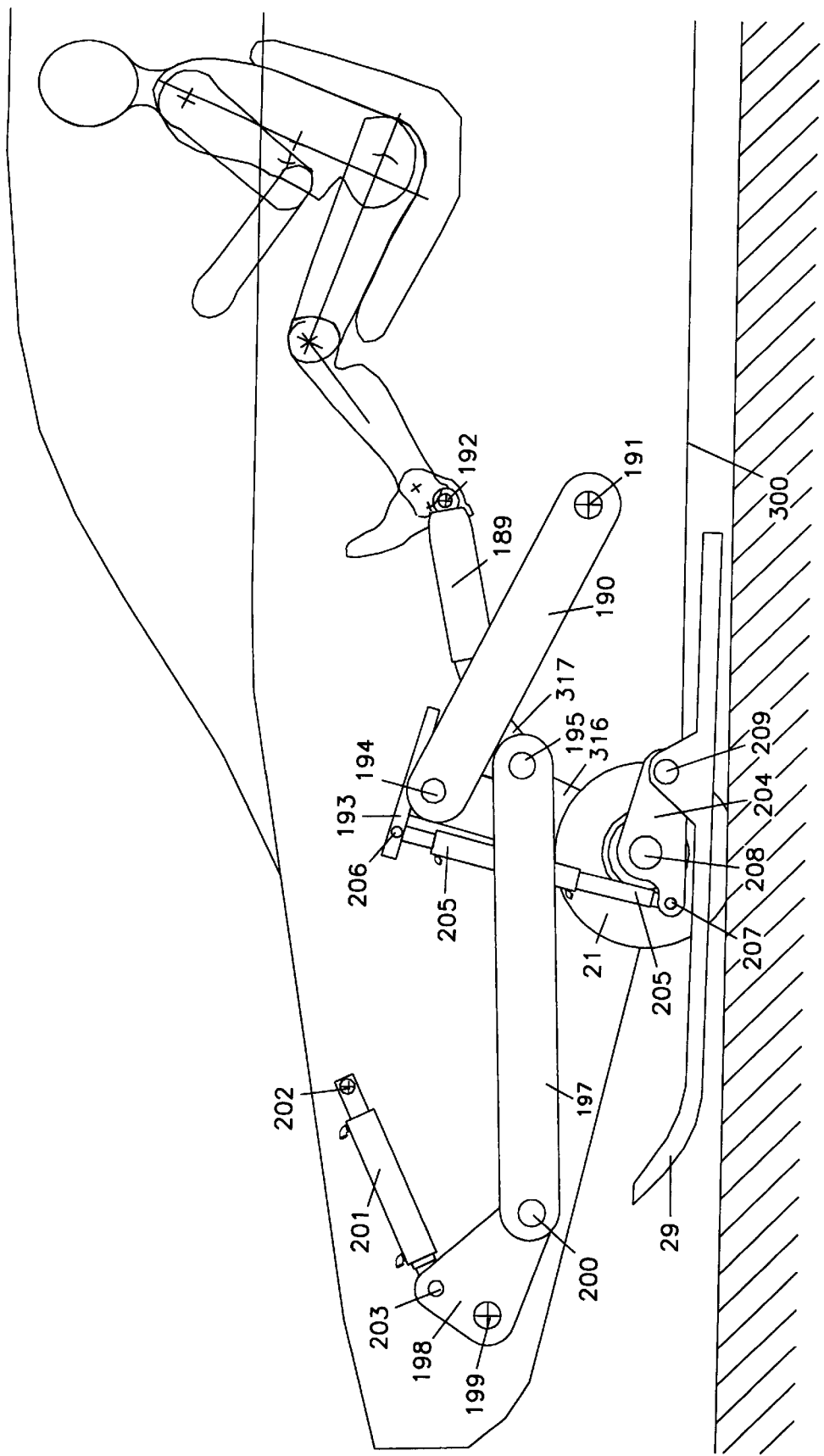
FIG. 47 is a similar cross-sectional view to FIG. 44, except that the forward landing gear are shown extended and fully compressed, in a configuration typical of a high-impact landing on a hard surface.
Figure 50:
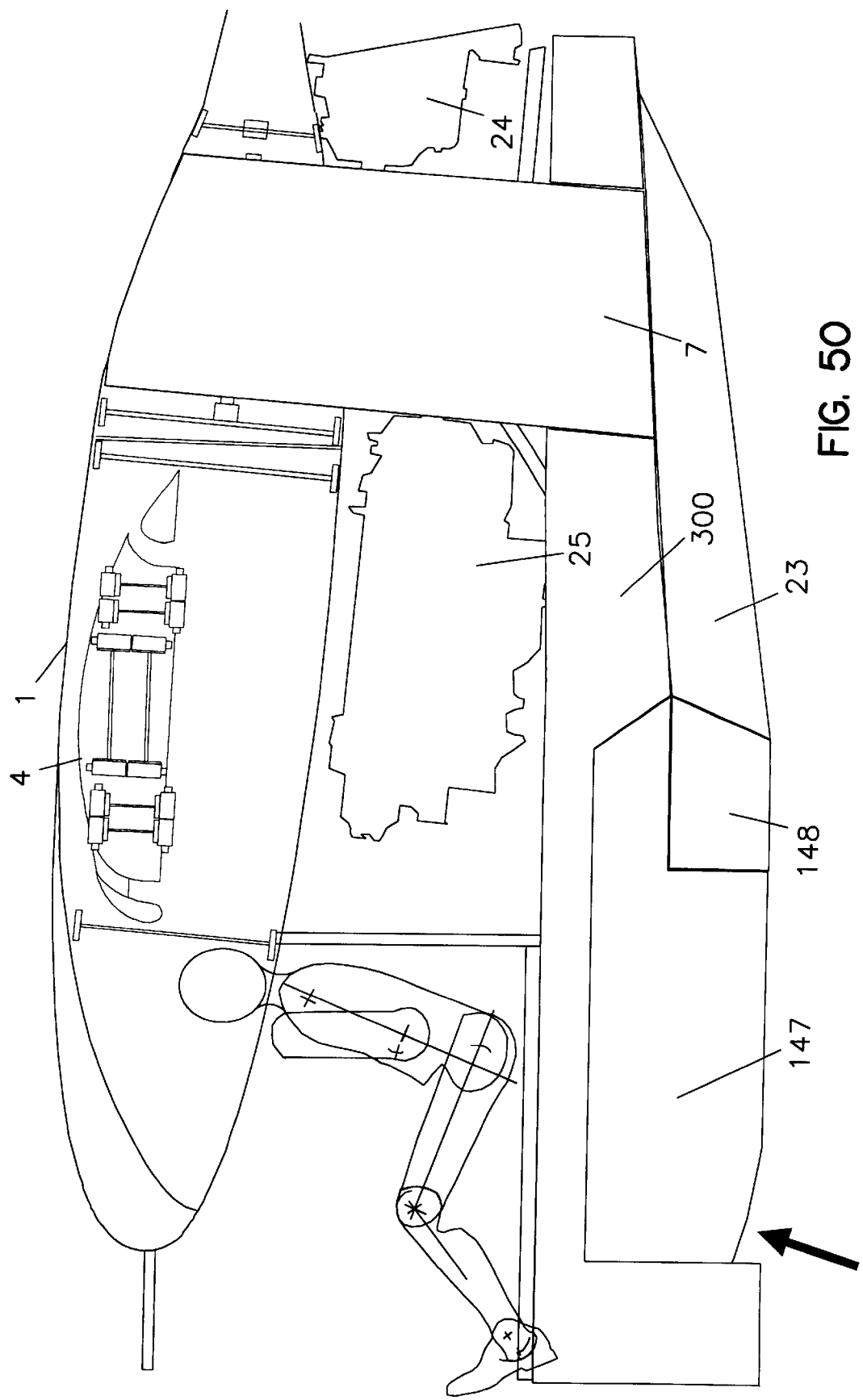
FIG. 50 is a cross-sectional diagrammatic view of the central portion of the fuselage of an aircraft according to the invention, taken on line 44,50—44,50 of FIG. 11. The outer fuselage panels that enclose the main central landing gear component of a compound landing gear are shown in the proper in-flight position, forming an aerodynamically smooth outer surface.

The subcomponents of each component of the compound landing gear will be mounted in such a way that each of all the wheel subcomponents, or all the ski subcomponents, or all the pontoon subcomponents will be separately deployable to act as the primary landing gear for the aircraft, that is, deployable to a position where the wheels, or the skis, or the pontoons become the lowest points of the level aircraft with respect to the ground (i.e., the points of contact with the ground during a landing operation). Preferably, the forward and main central landing gear will be mounted in such a way that when fully retracted the ski-type gear will nestle into the fuselage opening through which the gear are deployed, and the bottoms of the skis will be substantially flush with the outer surface of the fuselage, thereby eliminating the need for enclosing nose and gear bay doors. (See, FIG. 44, position of skis 29; FIG. 50, position of skis 147.) Most preferably the subcomponents of each landing gear component will be integrated in such a way that, wherever possible, full deployment of one subcomponent will automatically prevent full deployment of another subcomponent, so that no two sets of landing gear may be inadvertently deployed to their fullest extent and become, collectively, the primary (lowest deployed) landing gear for the aircraft. The most preferred embodiments will, however, permit coordinated action of the subcomponents where it is advantageous, for example, in providing ski-type landing gear that can be raised to a level just slightly above the lowest point of the tires of the wheel gear, which is the best configuration for landings on intermittent snow-covered and clear hard surfaces. (See, FIGS. 46 and 57.)

As described below and with reference to the drawings, aircraft incorporating the compound landing gear of this invention are uniquely serviceable and safe.

FIGS. 44, 45, 46, 47, 48 and 49 illustrate the deployment and operation of a preferred forward landing gear component of a compound landing gear according to the invention. The same structural members are shown in each of these figures at different stages of deployment. The reference numbers for each of the members are the same from figure to figure.

Figure 44:
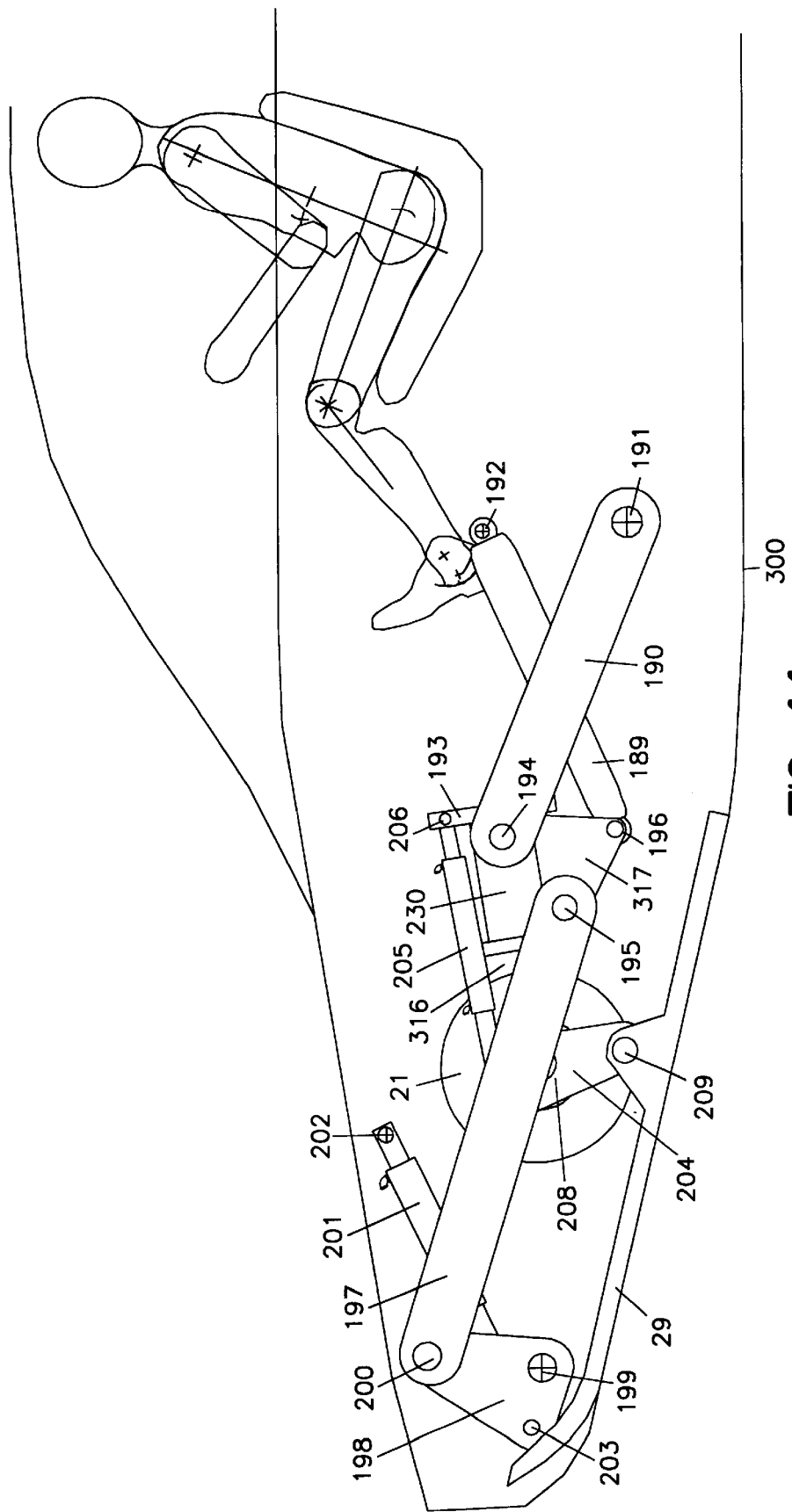
FIG. 44 is a cross-sectional diagrammatic view of the forward fuselage of an aircraft of the invention, taken on line 44,50—44,50 in FIG. 11, showing the structures of a forward landing gear component of the compound landing gear in a fully retracted configuration.
Figure 45:
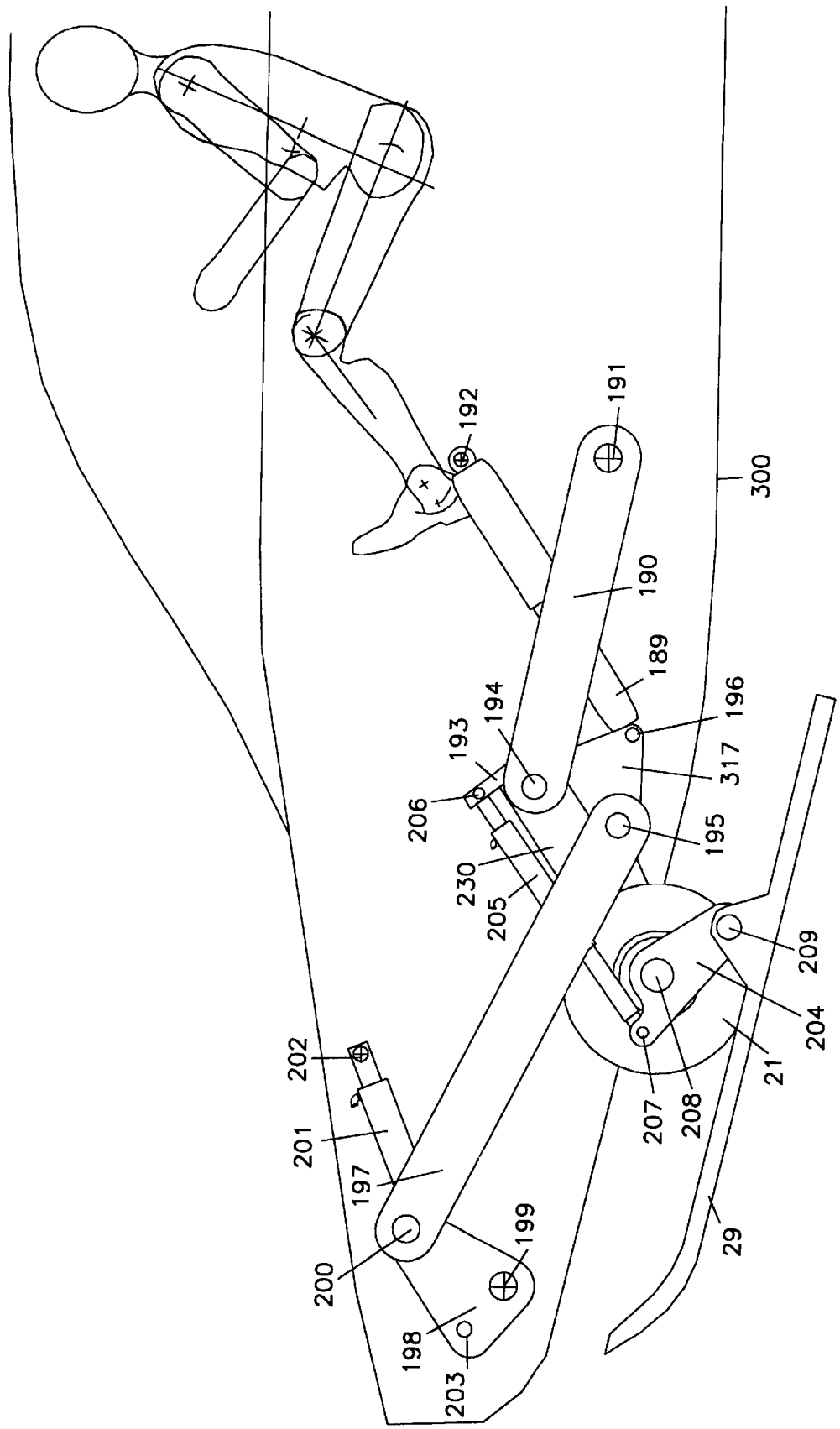
FIG. 45 is a similar forward cross-sectional view to FIG. 44, except that the forward landing gear are shown partially extended.

Referring to FIG. 44, a forward landing gear assembly is shown having the essential forward landing gear component functionalities, namely, full retractability within the fuselage (300) of the aircraft, separate deployability of either wheel or ski subcomponents, and steerability of the skis and wheels once deployed. As illustrated, the forward landing gear component is comprised of members for positioning (i.e., deploying or retracting) the wheel gear and ski gear, members for actuating the positioning of the gear relative to the aircraft, members for positioning the ski gear subcomponent relative to the wheel subcomponent, and (preferably) members for absorbing landing forces (i.e., one or more shock absorbers or springs). The actual steering mechanism has been omitted for the sake of clarity. Also, a braking mechanism will typically be included but is not illustrated here for the sake of clarity.

Referring again to FIG. 44, the subcomponents of the forward landing gear are embodied in a steerable wheel (21) (or, alternatively, two steerable wheels), preferably having a pneumatic tire, and two skis (29, port ski only is shown), connected to the front wheel axle (208) by a front ski actuator link (204), which connects to each ski at a pivotal mount (209). The wheel (21) of course turns freely on its axle (208), but the ski pivotal mounts (209) have stops (not shown) that will limit the arc that can be described by the skis, to prevent the skis from rotating so far forward or backward that the aircraft can nose into the snow or bottom out, during a snow landing.

Figure 60:
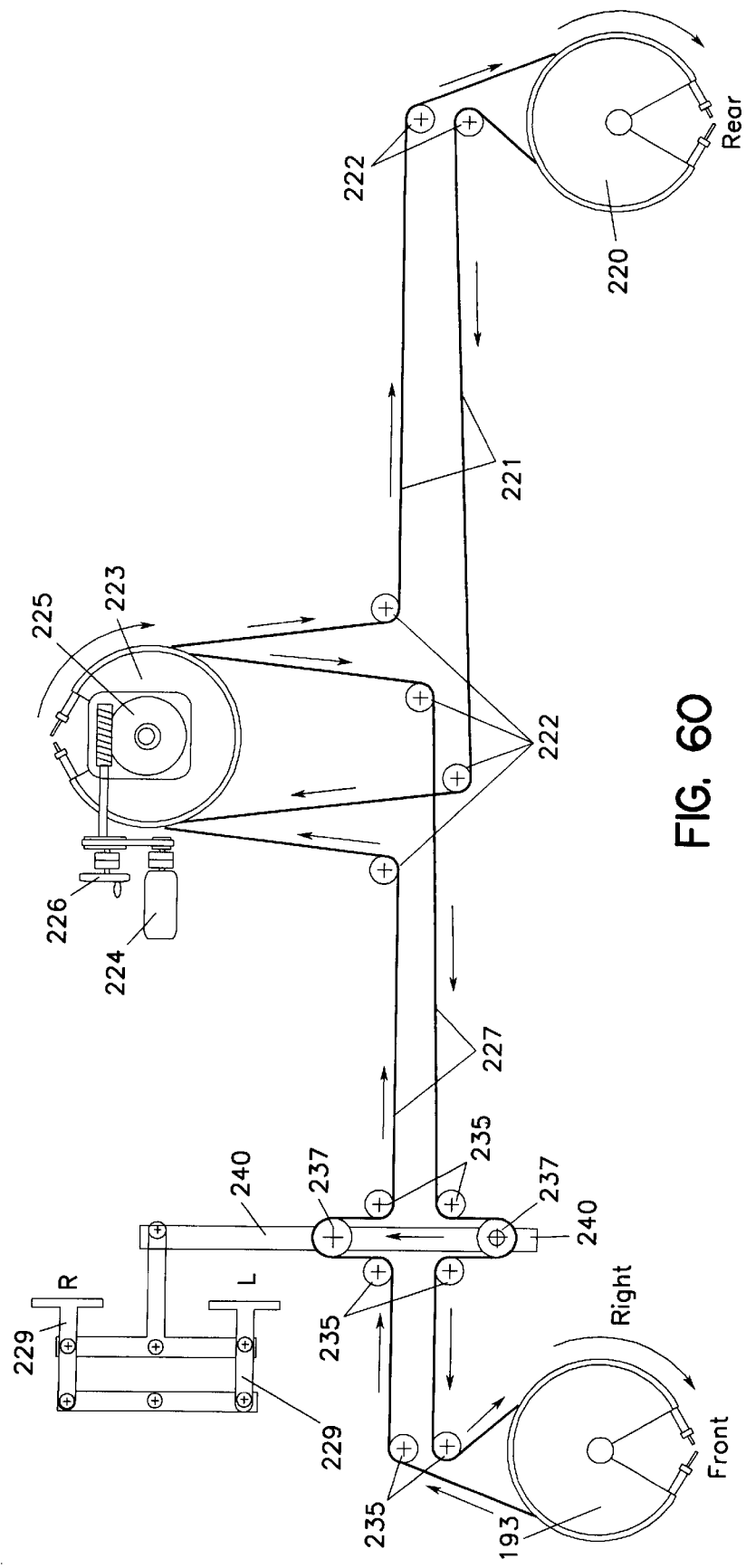
FIGS. 60 and 61 show schematic illustrations of steering mechanisms for aircraft of this invention.

The axle (208) of the front wheel (21) is connected by a tubular steering column (316) (or shaft) to a steering control plate (193). A swing-out mounting cylinder (230) acts as a housing for the steering column (316), within which the column is freely rotatable by actuation of the steering control plate (193). The actual steering mechanism, through which the steering control plate (193) is turned, is not shown here, but preferably the steering mechanism (e.g., steering cables or similar mechanism (ref. FIG. 60)) is attached to the steering control plate (193) in such a way that the control plate (193), and therefore the front wheel (21) and skis (29), become steerable only when they are lowered for landing:

That is, the steering column (316) can be rotated within the swing-out mounting cylinder (230) only when the mounting cylinder (230) is swung-out to an approximately vertical orientation with respect to the aircraft. When the swing-out mounting cylinder (230) is rotated to a substantially horizontal position with respect to the aircraft, as shown in FIG. 44, the steering mechanism, preferably, will not be able to actuate the steering control plate (193) or otherwise cause the forward landing gear (28, 29) to swivel.

Figure 48:
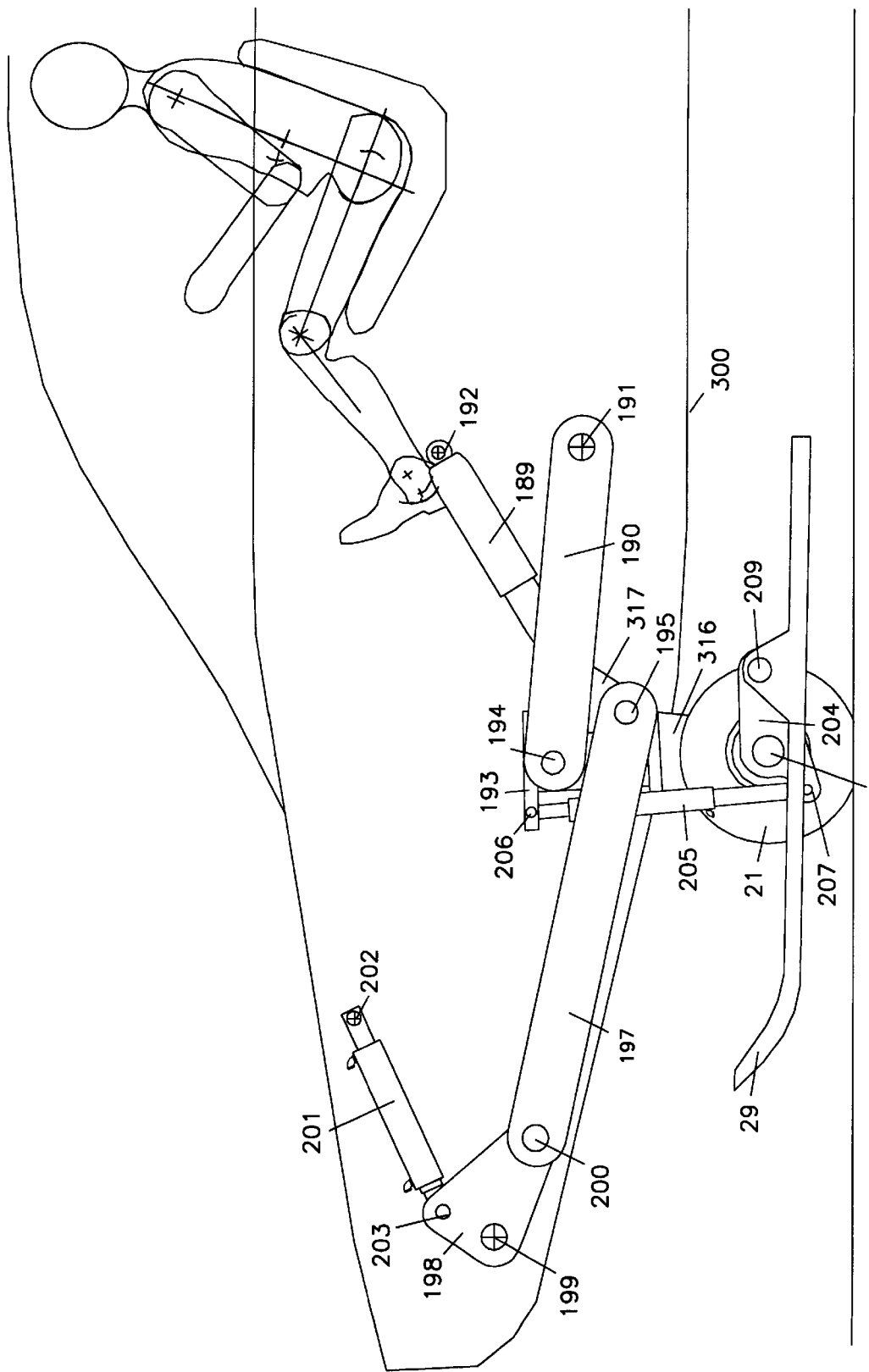
FIG. 48 is a similar forward cross-sectional view to FIG. 44, except that the forward landing gear are shown fully extended to support the weight of the nose of the aircraft and-in a configuration appropriate to taxiing.
Figure 49:
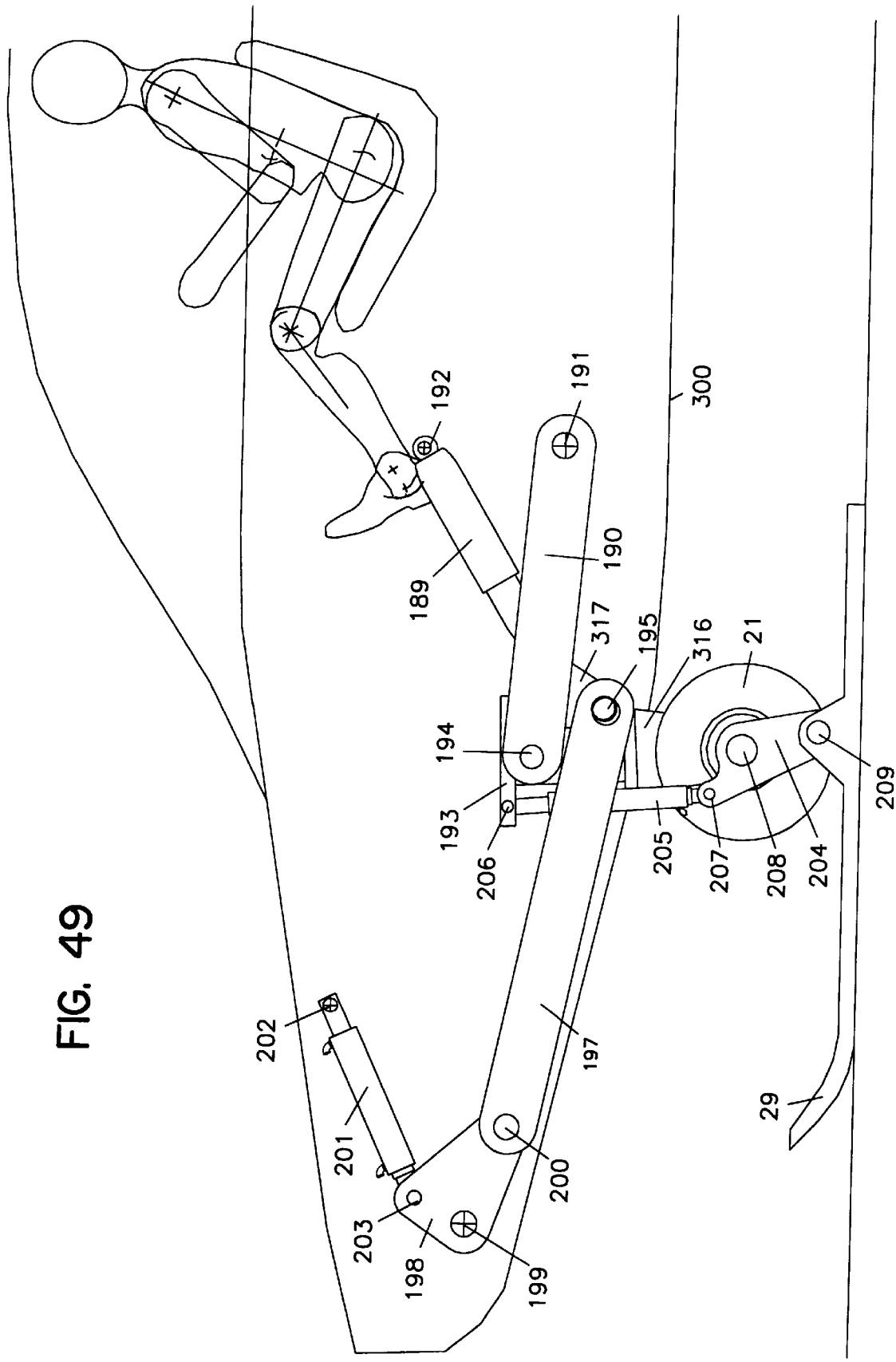
FIG. 49 is a similar cross-sectional view to FIG. 44, except that the skis of the compound forward landing gear are shown fully extended, in a configuration appropriate to landing on a snowy or icy surface.

A ski deployment actuator (205) is pivotally attached at one end (206) to the steering control plate (193), and pivotally attached at its other end (207 in FIG. 45) to the front ski actuator link (204). With these attachments and links, the front ski actuator (205) will turn with the steering control plate (193), wheel (21) and skis (29); furthermore, the actuator (205) at this position allows the differential deployment of either the wheel gear (21) or the ski gear (29), as shown in FIGS. 48 and 49. The front ski actuator (205), as well as the other actuators in the landing gear assemblies, may be powered by any suitable means, depending on manufacturer's preference. Hydraulic cylinders, air cylinders, electric screw jacks and even hand cranks are all known for this sort of mechanical task. It will also be appreciated that although the foregoing description discusses single links and actuating arms, certain of the members described may advantageously be installed in pairs. For instance, it is mentioned that two skis (29) are typically (and preferably) employed in the forward landing gear component; and accordingly two actuator links (204) may be employed (instead of a single, U-shaped actuator link connecting both skis and pivotally mounted around the front wheel axle (208)), which, in turn, would necessitate dual front ski actuators (205).

The forward landing gear (21, 29) and associated links and steering assemblies described previously and as mounted in the swing-out mounting cylinder (230) are connected to the fuselage (300) via a front gear suspension link (190) and a front gear connecting link (197) that is further pivotally connected to a front gear actuator link (198). The suspension link is pivotally attached to the fuselage (300) at one end (191) and pivotally attached at its other end (194) to the upper end of the swing-out mounting cylinder (230). The mounting cylinder (230) has a fin-like mounting appendage (317) projecting generally perpendicularly from the cylindrical housing for the tubular steering column (316), extending directly aft when the mounting cylinder is in an upright (vertical) orientation. The front gear connecting link (197) is pivotally attached at one end (195) to the swing-out mounting cylinder (230) at a pivot on this mounting appendage (317) and pivotally attached at its other end (200) to the front gear actuator link (198), which, in turn, is pivotally attached to the fuselage at a pivot (199). The front gear actuator link (198) also provides a pivot attachment (203) for a front gear actuator (201), which is pivotally attached to the fuselage at its other end (202). The mounting appendage (317) also provides a pivotal mounting point (196) for a shock absorber or spring (189), which is pivotally attached at its other end (192) to the fuselage (300).

By reference to the foregoing description and the drawings (FIGS. 44–49), it will be appreciated that actuation of the aforementioned series of linkages causes the swing-out mounting cylinder (230) to rotate generally in the sagittal plane of the aircraft (i.e., the plane including the centerline and dividing the aircraft into symmetric halves), thus deploying or retracting the forward landing gear (wheel (21) and skis (29)). Furthermore, shortening of the front ski actuator(s) (205) deploys the skis (29) over the front wheel (21) (see, FIG. 49). During extension and retraction, the shock absorber/spring (189) remains at its full length, since it does not support any of the weight of the aircraft. (See, FIGS. 44, 45 and 46.) In touching down for a landing (FIG. 47) and while operating on the ground (FIGS. 48 and 49), the front gear actuator (201) remains at its fully extended length, and the front gear actuator link (198) does not rotate, so that the connecting link (197) holds its position, and the shock absorber/spring (189) compresses and decompresses as the landing or taxiing load varies.

To position the skis (29) for operation on a snow-covered surface, the front ski actuator (205) is extended, which rotates the front ski actuator link (204) about the front wheel axle (208). (See, FIGS. 48 and 49.) On surfaces completely covered with snow it is desirable to position the skis (29) below the wheel (21) to eliminate drag from snow accumulating in front of the wheels, however during operation on surfaces where snow only partially covers the ground it is desirable to position the skis so that the tires of the wheel (21) extend slightly below the skis (29), so that the aircraft rides up on the tires where there is no snow but rides on the skis (with the wheels providing minimum drag) where the snow covers the ground. In order to raise or lower the skis (29) this small amount relative to the wheel (21), the front ski actuator (205) is retracted slightly from its full extension, which rotates the support (204) and lowers the skis (29) slightly.

FIGS. 50, 51, 52, 53, 54, 55, 56, 58, 57 and 59 illustrate the deployment and operation of a preferred main central landing gear component of a compound landing gear according to the invention. The same structural members are shown in each of these figures at different stages of deployment. The reference number for each member is the same from figure to figure.

Referring to FIG. 51, a main central landing gear assembly is shown having the essential main central landing gear component functionalities, namely, full retractability within the fuselage (300) of the aircraft and retractability to form a step in the hull (necessary to permit takeoff from water), separate deployability of either wheel or ski subcomponents, and steerability of the wheels once deployed. As illustrated, the main central landing gear component is comprised of members for positioning (i.e., deploying or retracting) the wheel gear and ski gear, members for actuating the positioning of the gear relative to the aircraft, members for positioning the ski gear subcomponent relative to the wheel subcomponent, and (preferably) members for absorbing landing forces (i.e., one or more shock absorbers or springs). The actual steering mechanism has been omitted for the sake of clarity. Also, a braking mechanism will typically be included but is not illustrated here for the sake of clarity.

Referring to FIG. 50, a sectional side elevation of the midsection of an aircraft according to the invention is shown, illustrating the general positioning, within the fuselage (300) and fixed wing section (1), of the major systems and structures, e.g., a wing extension panel (4) and associated structures (unnumbered), the engines (in silhouette, 25 and 24 (partial)), the lower end of a port pivotal mounting armature (7) including a pontoon section (23). The approximate position of the aft-most passenger within the aircraft is represented by the seated human figure (unnumbered). FIG. 50 shows the position that the main skis (147) occupy in the fuselage (300), and shows the position that the armature (7) and pontoon (23) occupy in the fuselage, when the aircraft is configured for cruising flight. (Cf. FIGS. 3 and 9.) Full retraction of the main central landing gear and of the mounting armatures brings the main skis (147), a main wheel hatch (148) and the pontoons (23) of the mounting armatures into alignment, flush with the fuselage (300), creating a smooth outer surface. In the preferred embodiment illustrated, it will be noted that complete retraction of the skis (147) brings the nose of the skis up into the fuselage (300), forming a slight notch or mini-step (arrow) in the fuselage, below the water line. Advantageously, this notch helps to ventilate the hull when the aircraft is on the water, and it helps reduce the suction of the water that must be overcome in order to take off from the water.

Referring to FIG. 51, the same view of the aircraft's midsection as in FIG. 50 is shown, except that the outermost sections of the fuselage (300), as well as the main skis (147), the main wheel hatch (148), and the fully retracted mounting armature (7) and pontoon (23), have been rendered transparent, and except for the fuselage (300) these components are represented by broken lines (— . — . —). The lower line of the fuselage (300) is shown by a dotted line ( . . . ) where it is covered by the pontoon (23).

The main central landing gear component as illustrated in FIG. 51 is comprised of one or two (preferably two, as pictured, e.g., in FIG. 52) wheels (20) with (preferably) pneumatic tires, two skis (147), one or more shock absorbers or spring suspension members (129), one or more powered actuators (hydraulic or air cylinders, or electric screw jacks, or similar apparatus) (141), and various connecting and supporting members.

The main wheels (20) are rotatably mounted on a central axle assembly (210 in FIG. 54), to which is attached a brake system (not shown). The axle assembly (210) is connected via a steering column (not shown) to a main gear steering control plate (220) pivotally housed in a swing-out main gear mounting cylinder (133), in a similar manner to the front landing gear assembly (see, FIGS. 44–49). The main gear mounting cylinder (133) is also equipped with a rearward-extending fin-like mounting appendage (318) fixed to the main gear mounting cylinder (133), to which a main gear connecting link (137), a main gear suspension link (130) and (preferably dual) shock absorbers/springs (129) can be pivotally attached, i.e., at pivot connections 135, 134, and 136 (FIG. 51), respectively. As in the forward landing gear component illustrated in FIGS. 44–49, the steering mechanism (not shown) for the main central landing gear wheels (20) will be connected to the steering control plate (220) so that the mechanism is engaged only when the swing-out main gear mounting cylinder (133) approaches a vertical (deployed) orientation with respect to the centerline of the aircraft.

The main gear suspension link (130) is pivotally attached to the fuselage (300) at a pivot connection (131). The shock absorbers/springs (129) are pivotally attached to the fuselage (300) at a pivot connection (132). The main gear connecting link (137) as illustrated in FIG. 51 is a tuning fork-shaped member which extends forward from its pivot connection (135) on the mounting appendage (318) to a main gear actuating link (138), where it is pivotally attached at a pivot connection (140). The main gear actuating link (138) is pivotally attached to the fuselage (300) at a pivot connection (139). A main gear actuator (141) is also attached to the main gear actuating link (138) at a pivot connection (143) and is pivotally attached at its opposite end to the fuselage (300) at a pivot connection (142).

It will be appreciated that actuation of the aforementioned series of linkages causes the swing-out main gear mounting cylinder (133) to rotate generally in the sagittal plane of the aircraft (similarly to the mounting cylinder (230) of the forward landing gear component, described supra), thus deploying or retracting the main wheels (20). See, e.g., FIG. 54, which shows the main wheels (20) and the associated main central gear structures fully deployed.

During extension and retraction, the shock absorbers/springs (129) remain at full length, since they do not support any of the weight of the aircraft. In touching down for a landing and while operating on the ground (FIGS. 54 and 55), the main gear actuator (141) remains at a fixed extension, and the main gear actuating link (138) does not rotate, so that the main gear connecting link (137) holds its position, and the shock absorbers/springs (129) compress and decompress as the landing or taxiing load varies. The shock absorbers/springs (129) operate in the same manner to absorb landing/taxiing loads during snow landings, because the main skis (147), as more fully described infra, are connected to the same main gear connecting link (137). This latter fact leads to a further safety advantage of aircraft employing the compound landing gear disclosed herein: As can be seen with reference to FIGS. 50 and 51, the main skis (147) are the lowest part of the fuselage when in the fully retracted position; however, even in the retracted position, the arrangement of the landing gear connecting and actuating structures described above permits forces applied to the skis to be transmitted to the shock absorbers/springs (129). Therefore, for water landings but more importantly for "wheels-up" landings on a hard surface (i.e., where the pilot either cannot or forgets to deploy landing gear), the portion of the fuselage to come in first contact with the ground is advantageously constructed to take more punishment than the rigid fuselage of conventional aircraft. This feature, accordingly, not only improves the safety of the aircraft from the passengers' standpoint but improves the likelihood that the aircraft will suffer minimal structural damage and will not be totally lost after this type of landing.

Figure 52:
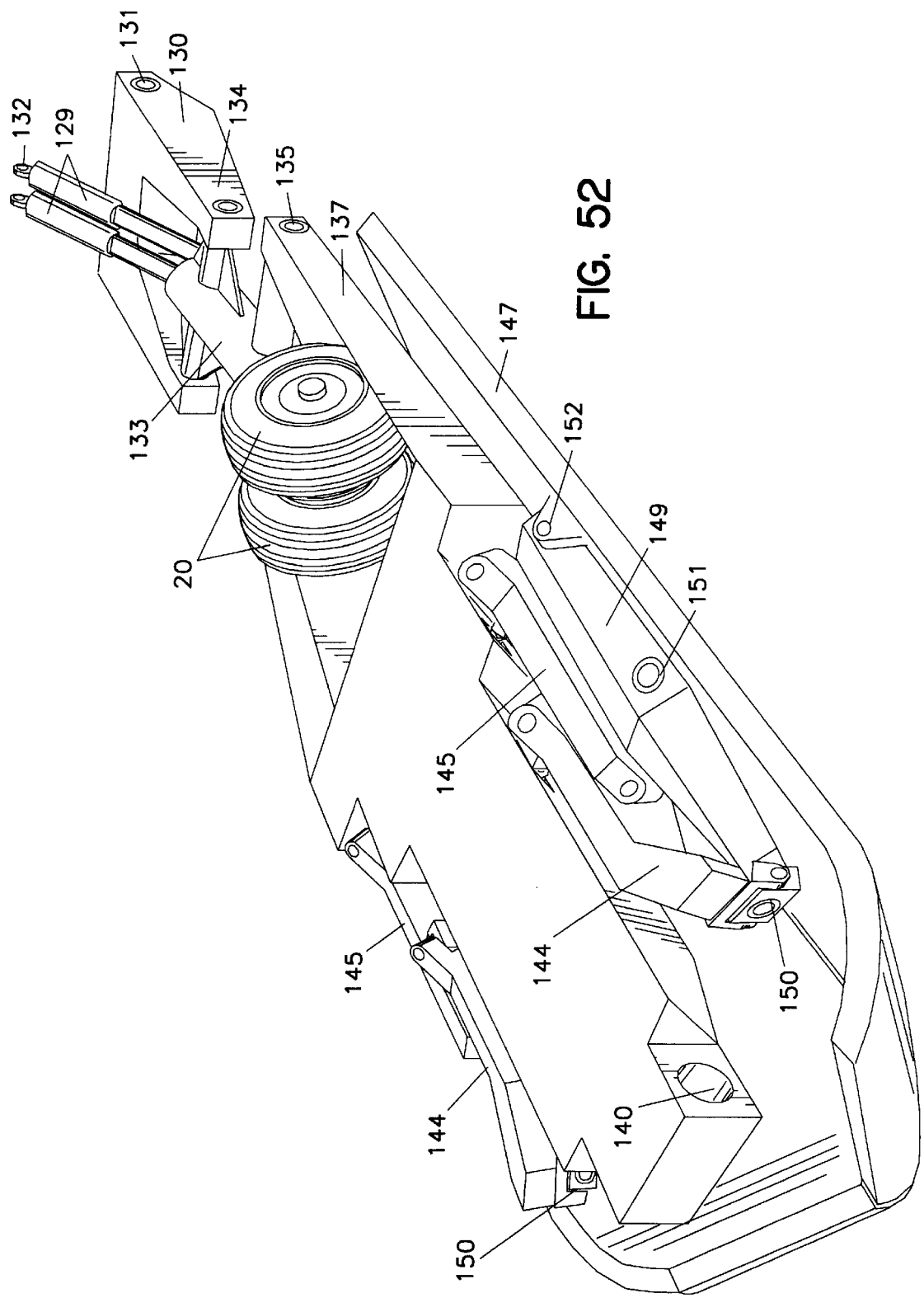
FIG. 52 is a perspective elevation of a preferred main central landing gear assembly, shown in a fully retracted configuration, as the assembly would be positioned in flight. In such configuration, the lower surface of the skis would form part of the outer surface of the aircraft's fuselage; the rest of the landing gear assembly would be inside the fuselage of the aircraft, out of the airstream.
Figure 53:
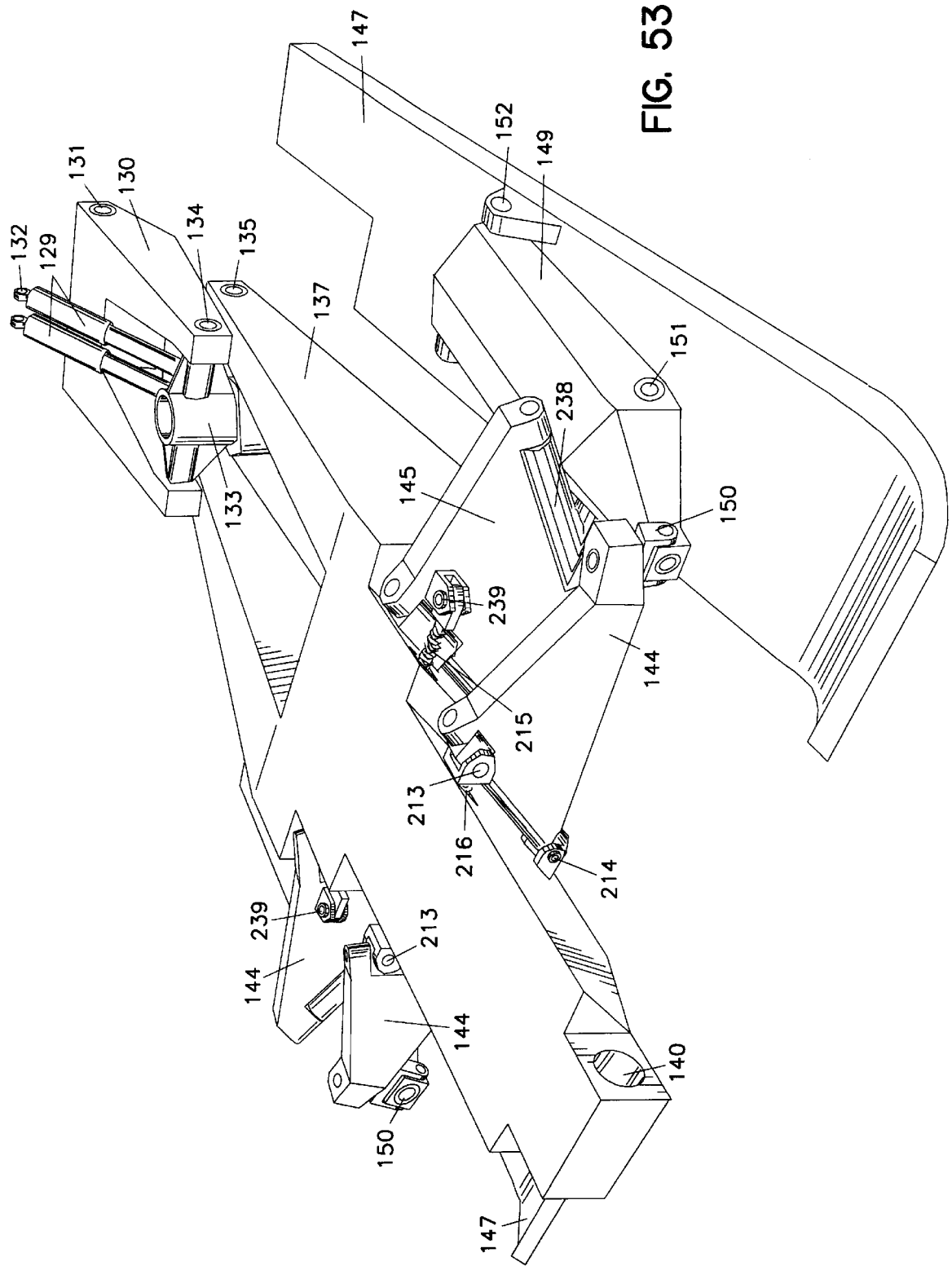
FIG. 53 is a perspective elevation of a preferred main central landing gear component of the compound landing gear of the invention. The assembly shown unifies central wheel-type landing gear (not visible in this view), ski-type landing gear and flotation-assisting hollow design ski struts. The assembly is shown in a deployed configuration that places the wheel-type landing gear in a vertical position suitable for use in landing on a hard surface or runway. (Cf.
Figure 57:
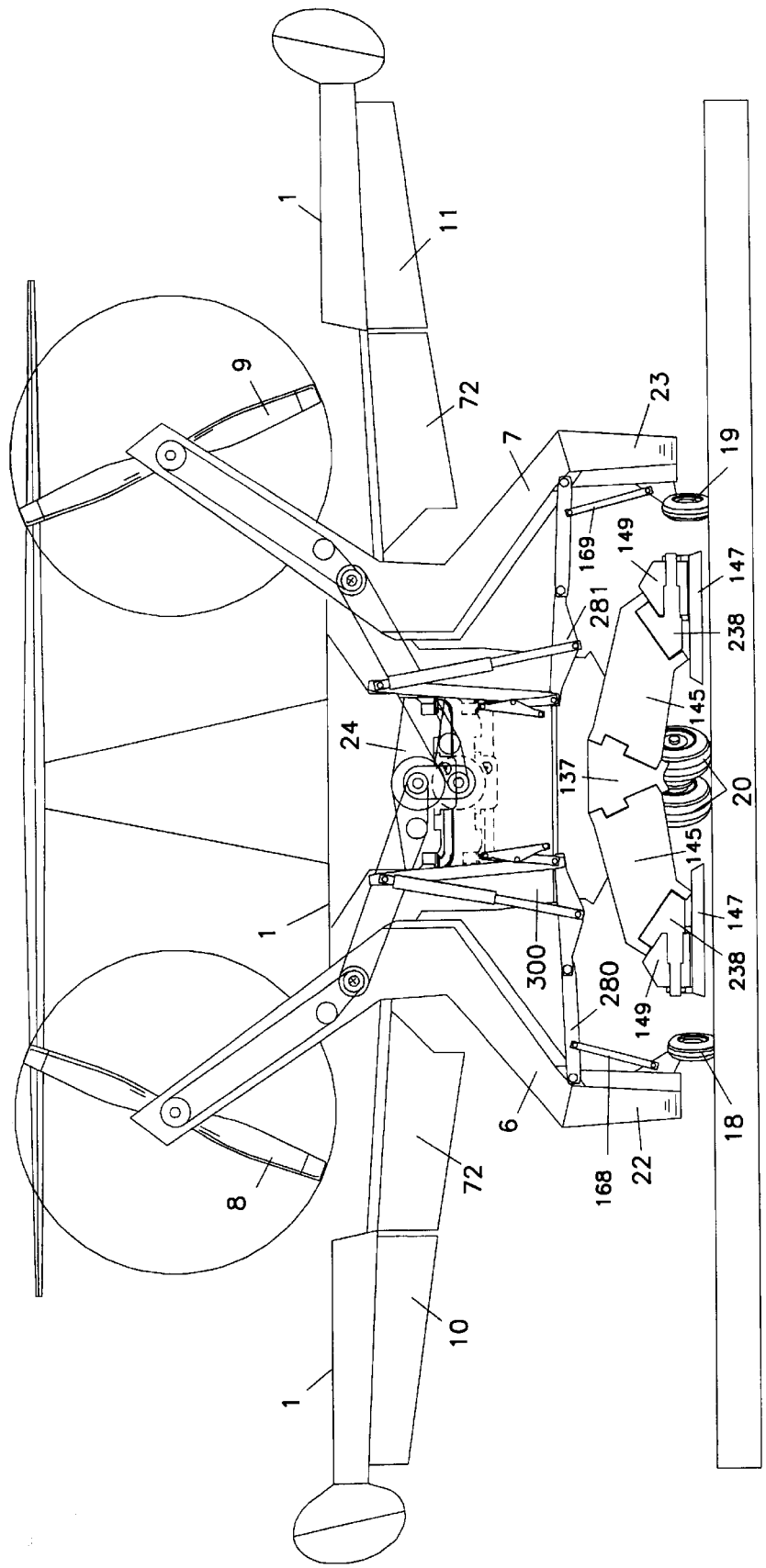

The skis (147) of the main central landing gear component are mounted on the main gear connecting link (137) via forward and rear ski support arms (144 and 145) and main ski connecting arms (149). Referring to FIGS. 52 and 53, where these elements are more clearly seen, the forward and rear ski support arms (144 and 145, respectively) are pivotally attached to the main gear connecting link (137) in stepped recesses of the forward end of the member. These stepped recesses permit the ski support arms (144 and 145) to fold flat against the base of the main gear connecting link (137), when the skis (147) are in a fully retracted position as shown in FIG. 52. The forward ski support arms (144) are generally triangular in shape, with two pivotal connections (213 and 214 in FIG. 53) along the base to the main gear connecting link (137), and a biaxial pivot connection (150) at the apex to the main ski connecting arms (149). As best illustrated in FIG. 53, each rear ski support arm (145) is generally rectangular in shape (ref. FIG. 57) and has pivot connections to the main gear connecting link (137) at one end and a pivotal connection at the opposite end to a V-shaped double axle member (238), through which each rear ski support arm (145) is connected to a main ski connecting arm (149). One arm of the V-shaped double axle member (238) is pivotally attached to the rear ski support arm (145); the other arm of the V-shaped double axle member (238) extends through the main ski connecting arm (149) and forms a pivot connection (150) about which the main ski connecting arm (149) pivots. The relative angle of the arms of the V-shaped double axle member (238) is such that the lower surface of the skis (147) are caused to be horizontal to the ground when the assembly is fully deployed and are caused to substantially match the angle of the fuselage when the assembly is fully retracted. The base of each main ski connecting arm (149) is pivotally attached to a ski (147) by pivot connections (152) to flanges on the upper surface of the ski (147), as shown in FIG. 53. Also shown in FIG. 53 are screw-driven ski positioning actuators (215 and 216) for extending the skis (147) from their fully retracted position (see, FIG. 52). The rear ski support arm actuator (215), which is pivotally attached to the support arm as shown (239), pushes the rear ski support arm (145) away from the main gear connecting link (137), which forces the skis (147) down and away from the fuselage. Extension of the forward ski support arm actuator (216), pushes the upper corner of the forward ski support arm (144) away from the main gear connecting link (137), thereby lowering the biaxial pivot connection (150) and causing the position of the main ski connecting arm (149), and thus the main skis (147), to change by rotation about the pivot connection (151) to the V-shaped double axle member (238). It will be appreciated by reference to the foregoing description and the drawings (esp. FIGS. 51, 52, 53, 55, 57 and 58) that by coordinated extension and retraction of the ski positioning actuators (215 and 216), the main skis (147) can be raised and lowered through a wide range of positions relative to the fuselage.

Although not critical to the invention, the various members comprising the main central landing gear component may be shaped and constructed to provide additional flotation elements, lending an additional feature to the multifunctional landing gear component. As pictured in FIG. 52, for instance, the main ski connecting arm (149); rather than being fabricated as a solid shaft or bar, has been shaped to fill the space between the fully retracted skis (147) and the flat-folded forward and rear ski support arms (144 and 145). Thus shaped, the main ski connecting arm (149) may be fabricated (without compromising its structural strength) to be hollow, with the hollow compartment being watertight or filled with a buoyant foam. The main ski connecting link (137) pictured in FIG. 52 may likewise be fabricated with hollow compartments for buoyancy. The bay in the fuselage which houses the main central landing gear component preferably will not be designed to be watertight, since this would significantly complicate the design and sharply raise construction costs. Accordingly, when the aircraft is on the water, the bay will be exposed to water, and any additional flotation elements such as the buoyant connecting arm (149) will improve the seaworthiness of the aircraft.

Figure 55:
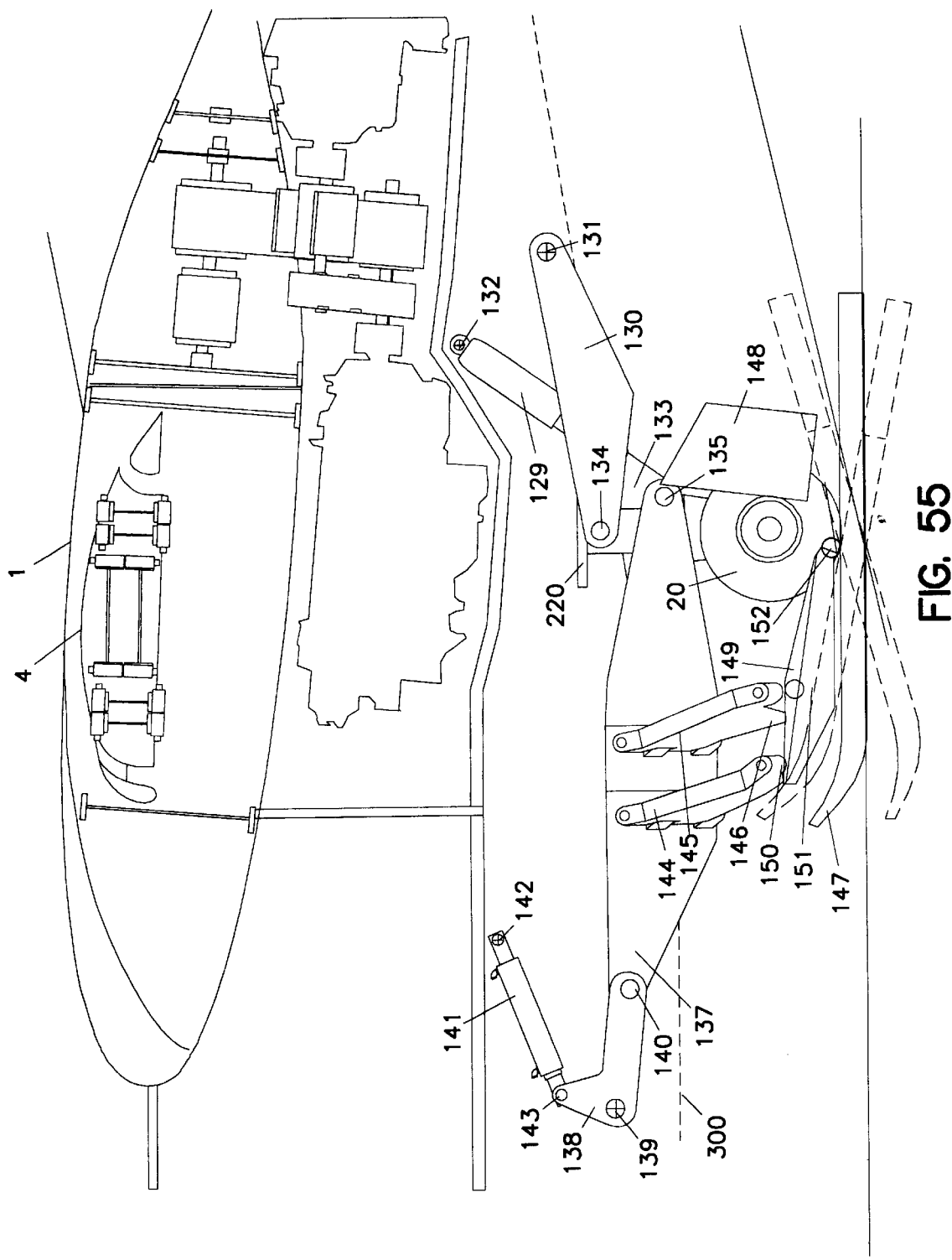
FIG. 55 is a cross-sectional view of the midsection of the fuselage of an aircraft according to the invention, illustrating compound landing gear deployed so as to make use of the main ski landing gear, i.e., in the configuration most suitable for landing on, taking off from, and taxiing on a snow-covered surface.

Referring briefly to FIG. 55, a cross-sectional side elevation of the midsection of an aircraft equipped with the preferred main central landing gear component of this invention is shown, and the landing gear are deployed for a snow landing.

To position the skis for operations on snow-covered surfaces, the rear ski support arm positioning actuator (215 in FIG. 53) is extended, which rotates the forward and rear ski support arms (144 and 145) out from the main gear connecting link (137). The ski support arms (144 and 145) position the main ski connecting arms (149) so that the pivot line (152) of the skis (147) is near that of the main wheels (20). Adjustment of the level of the skis using the forward ski support arm positioning actuator (216 in FIG. 53) permits configuration of the main central landing gear for proper balance of the aircraft on all types of snow-covered surfaces, in particular during lift-off and touch-down. On totally snow covered surfaces it is desirable to position the skis (147) below the wheels (20) to eliminate drag from snow accumulating in front of the wheels. (See, e.g., FIG. 58.) During operation on surfaces of intermittent snow and clear surface, the skis are advantageously positioned so that the bottoms of the wheels (20) extend slightly below the skis (147) and the aircraft consequently rides up on the tires where there is no snow but rides on the skis (with the wheels providing minimum drag) where the snow covers the ground. (See, e.g., FIG. 57.)

Figure 54:
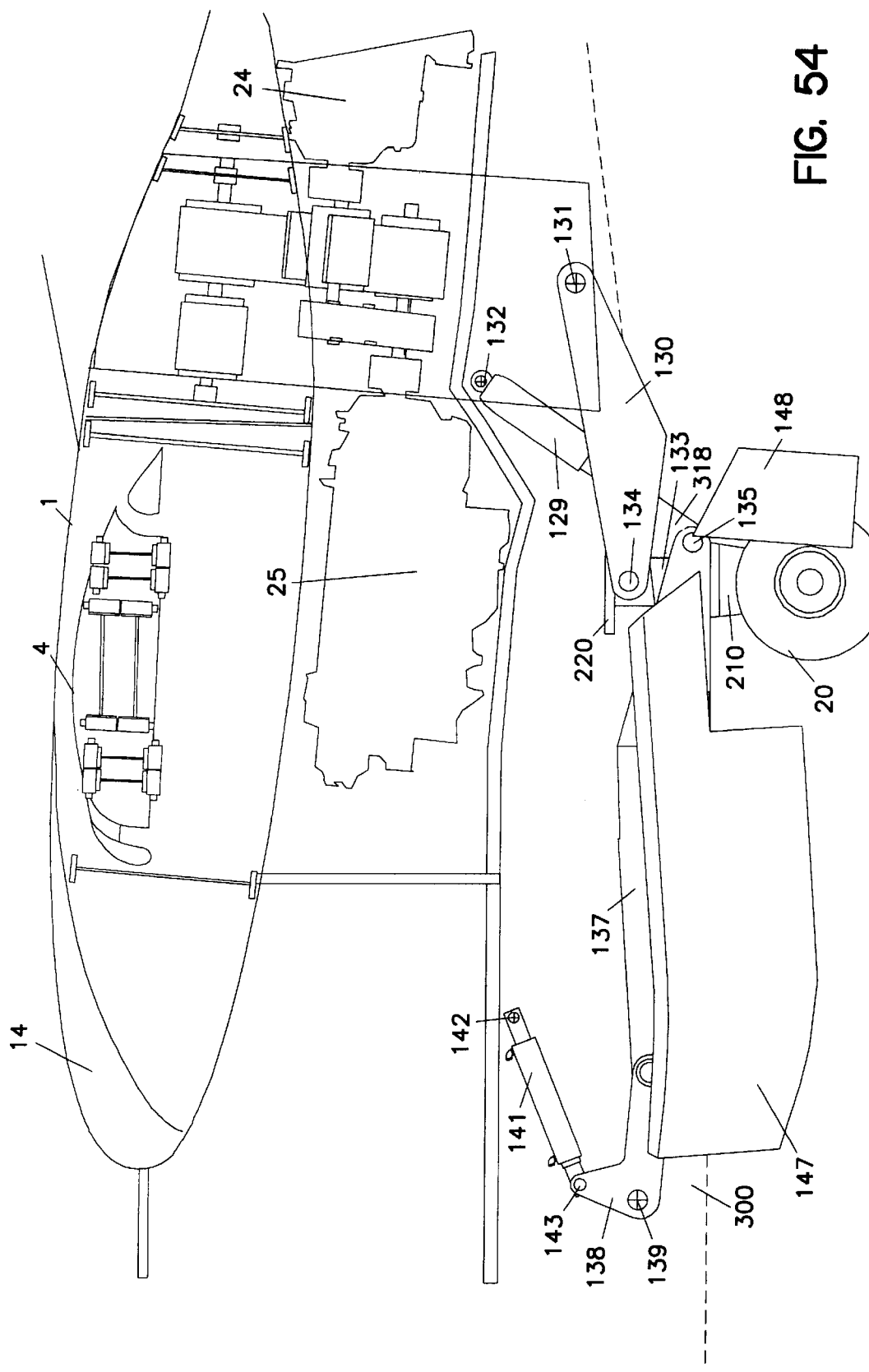
FIG. 54.) In this position the skis are semi-deployed and will not meet the surface during a normal landing.

Referring again to FIGS. 54 and 55, it is important to note that the main central landing gear component is positioned almost directly underneath the engines (24 and 25). In a twin-engine aircraft, about half of the total weight of the aircraft is accounted for by the engines. In conventional propeller aircraft, that load (i.e., the mass of the engines) is out on the wing structures; in aircraft as illustrated in FIGS. 54 and 55, the load is mounted inboard, directly over the landing gear. In a hard landing, the energy of the mass of the engines coming into contact with the ground is dissipated through the landing gear; and in conventional propeller aircraft that energy is translated through the wings to the fuselage and to the landing gear, putting a lot of stress on the wing structure. With an arrangement of engines and landing gear as illustrated in FIGS. 54 and 55, the energy of the mass of the engines at the velocity of a hard (as opposed to a soft) landing is dissipated directly to the main central landing gear component through the bottom of the fuselage, without putting those stresses on the wings or other structures of the fuselage. This is another feature which makes aircraft according to this invention more forgiving of common pilot errors.

FIGS. 56, 58, 57, and 59 further illustrate the deployment and operation of a lateral stabilizing gear component of compound landing gear according to the present invention, comprising bilaterally situated stabilizing members, including integrated wheel and pontoon subcomponents. The drawings show a particularly preferred embodiment, wherein the stabilizing gear are integrated in pivotal mounting armatures also according to the invention. It will be recognized that less preferred embodiments of the stabilizing gear component may alternatively be mounted under the wings or extended from the fuselage on separate supporting members. Employing the mounting armatures gives the stabilizing gear the added advantage of being fully retractable, as well as being coordinated with the position of the propellers.

FIGS. 56–59 present similar frontal elevations of an aircraft according to the invention, showing the relative orientation of the main central landing gear component and the lateral stabilizing gear component, in each of four landing configurations. Previously discussed elements such as the propellers (8, 9), engines (24), belts, flaps (72), ailerons (10, 11), main skis (147), main wheels (20), etc. are provided for reference, however many previously discussed structures have been omitted from these views for the sake of clarity.

Figure 56:
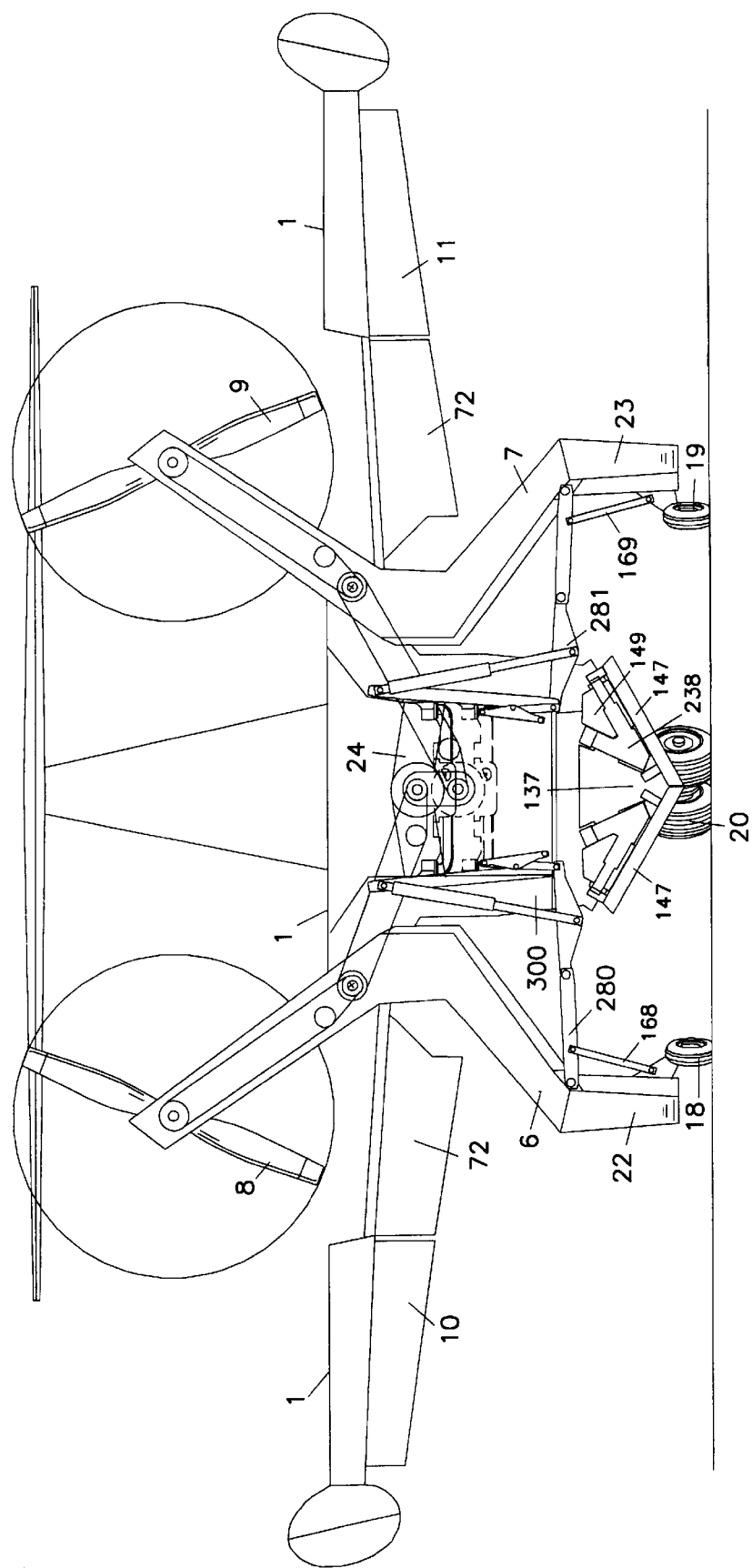
FIG. 56 is a cross-sectional front elevation of the midsection of the aircraft as illustrated in FIG. 54, showing structures of the main central and stabilizing landing gear components in the configuration appropriate to takeoff and landing or taxiing on hard surface runways. (Cf.

As illustrated in the embodiment of FIG. 56, the pontoons (22 and 23) are integrally mounted on, and form the lower segment of, the pivotal mounting armatures (6 and 7, respectively). Thus, rotation of the armatures away from or into the fuselage (300) by means of the multilink actuating struts (280 and 281) deploys or retracts the pontoons (22 and 23).

Stabilizing wheels (18 and 19) are attached to the pontoons (22 and 23) by wheel mounts of course permitting free rotation of the stabilizing wheels. The wheel mounts may be fixed or (preferably) retractable. In the embodiment illustrated, the pontoons are fabricated with recesses into which the stabilizing wheels (18 and 19) can be retracted. Extension or retraction of the stabilizing wheels (18 and 19) may be performed by any suitable means (e.g., separate powered actuators); however, preferably the stabilizing wheels (18 and 19) are mounted, as shown here, so as to automatically extend or retract according to the rotation of the pivoting mounting armatures (6 and 7), which is effected by means of starboard and port stabilizer actuating links (168 and 169, respectively) fixedly attached at one end to the respective starboard and port multilink actuating struts (280, 281), and pivotally attached at the other end to pivotal wheel mounts to which the stabilizing wheels (18 and 19) are rotatably mounted. The stabilizer actuating links (168 and 169) are fixedly attached to the final (outboard-most) link of the 4-link series of each multilink actuating strut (280 and 281; ref. description, supra), so that at intermediate extension of the multilink actuating struts (280 and 281), retractable wheel mounts are forced down, swinging the stabilizer wheels (18 and 19) into a deployed position. (See, FIGS. 56, 58, 57.) When the 4-link series of the multilink actuating struts are at full extension (FIG. 59) or when the outboard 4-bar linkage is collapsed (i.e., when the mounting armatures are retracted to the fuselage), the angle of the final link of the multilink actuating struts (280 and 281) changes, and the stabilizer actuating links (168 and 169) are pulled upwards, causing the stabilizing wheels (18 and 19) to swing back into their respective recesses in the pontoons (22 and 23).

The stabilizer wheels are preferably non-steerable and are on caster mounts, so that they swivel to roll in any direction that the aircraft takes, as soon as they are in contact with the ground.

Each of the subcomponents of the main central landing gear and the lateral stabilizing gear (i.e., main wheels, stabilizer wheel, main skis, pontoons) must be mounted in the aircraft so that when fully deployed, the center or pivot axis of the subcomponent (e.g., hub of the wheel or pivot mount of the ski) is positioned at a point 8–13°, preferably 10–11°, aft of the center of gravity of the level aircraft. Furthermore, when the lateral pontoon members are deployed (22 and 23 in FIG. 59), the exposed underside of the fuselage (see, dotted line in FIG. 51) must form a step 8–13°, preferably 10–11°, aft of the center of gravity of the level aircraft. By "level aircraft" is meant an aircraft where the fuselage is level fore-and-aft with respect to level ground, i.e., the longitudinal axis of the aircraft is parallel to the ground. A plumb line from the center of gravity of a level aircraft will be perpendicular to the centerline; and the center of each aft landing gear subcomponent, when fully deployed, must be far enough aft of the center of gravity so that a first line, extending from the center of the deployed landing gear subcomponent (e.g., the hub of the main or stabilizing wheel), parallel to the longitudinal axis of the aircraft that includes the center of gravity, to intersect the transverse axis of the aircraft that includes the center of gravity, and a second line that is a plumb line from that point of intersection of the first line and the transverse axis will form an angle of 8–13° and preferably 10–11°. If the landing gear design caused the landing gear to be deployed forward of the first line, the aircraft would be prone to rotating back on its tail and never allowing the nose gear to touch down. If the landing gear design caused the landing gear to be deployed too far aft of the first line, the rotational force coming down on the nose gear during landing would be too great for the forward landing gear (and possibly the nose section of the fuselage) to handle without damage. If a step in the fuselage is placed too far back, the drag of the water on the fuselage will be too great to overcome, and the aircraft will not be able to take off from water.

Figure 61:
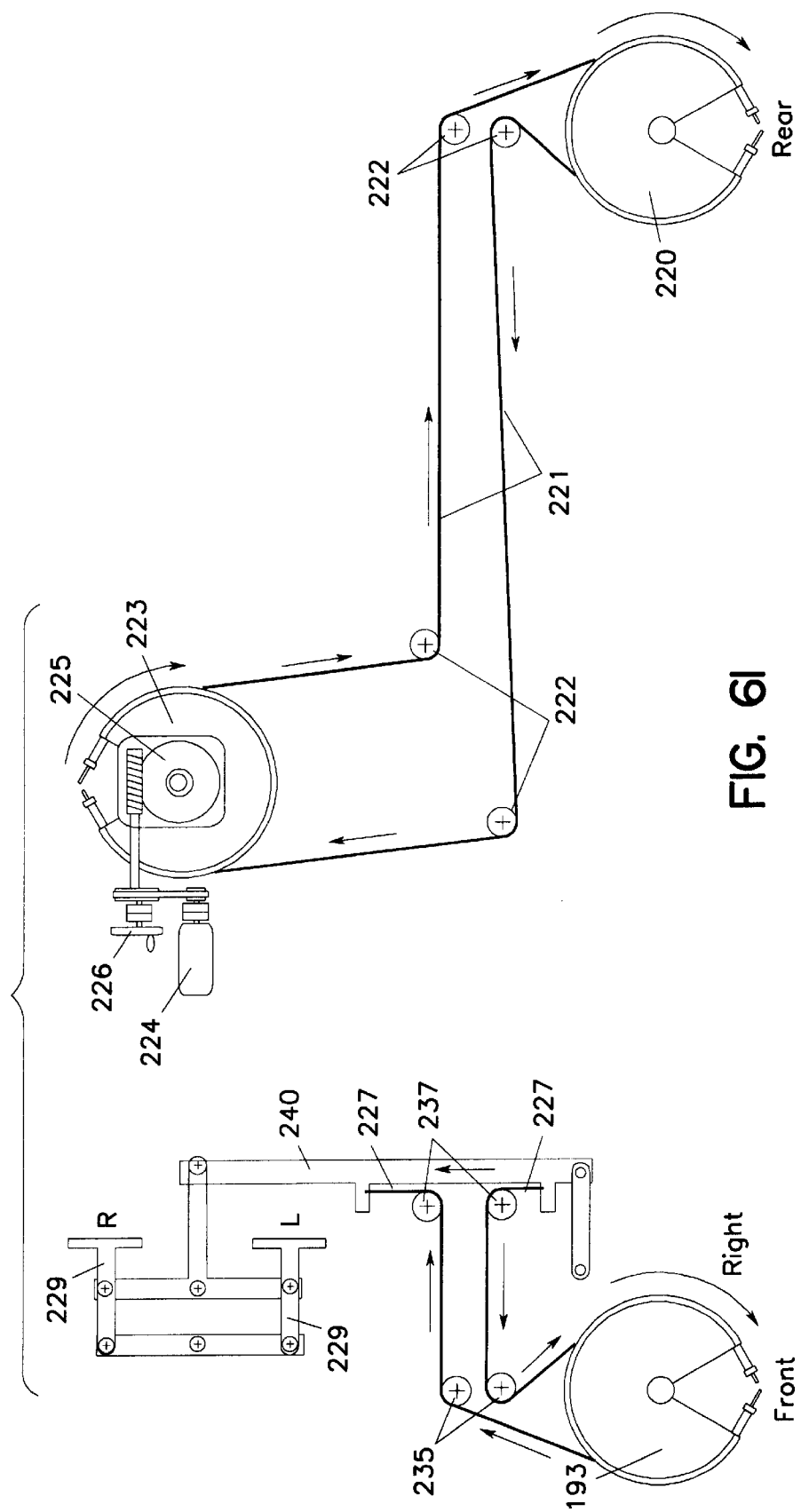

FIGS. 60 and 61 diagram two possible steering mechanisms for the steerable forward landing gear and the steerable main central landing gear. In the mechanism of FIG. 60, the main central landing gear and the forward (nose) landing gear are steered by the same mechanism, with the nose gear additionally independently steerable by the rudder pedals (229; R—right, L—left). In FIG. 61, the steering mechanisms for the nose gear and the main central gear are independent. The coordinated mechanism of FIG. 60 is preferred.

Referring to FIG. 60, cable-and-pulley connections are made between a steering actuator plate (223) and the forward gear steering control plate (193; see, also, 193 in FIG. 49) and the main central gear steering control plate (220; see, also, 220 in FIG. 54). The steering actuator plate (223) is driven by the steering control motor (224), which is connected to the actuator plate (223) through a gear box (225). An override hand crank steering control (226) is preferably provided in the event that the steering control motor (224) becomes inoperative. The positioning of the steering actuator plate (223) is translated to the main central landing gear via cables (221) connecting to the main gear steering control plate (223). Pulleys (222) are provided to guide these cables (221). The positioning of the steering actuator plate (223) is translated to the forward landing gear via cables (227) connecting to the forward gear steering control plate (193). Pulleys (222 and 235) are provided to guide the cables (227) appropriately. The forward gear steering cables (227) also loop around pulleys (237) rotatably fixed to the rudder pedal connecting bar (240) in a slack-giving/slack-taking arrangement, so that movements of the rudder pedal connecting bar (240) are also translated to the forward gear steering control plate (193).

Referring to FIG. 61, a similar arrangement of cables and pulleys to the scheme of FIG. 60 is shown, except the forward gear steering cables (227) do not connect with the steering actuator plate (223), and therefore the forward (nose) landing gear and main central landing gear steering controls are independent.

With the steering mechanism design shown in FIG. 61, the pilot adjusts the main central landing gear steering angle by operating the steering control motor (224) (or the override handwheel (226)) to compensate for or cancel the "crab" angle to which the aircraft is turned at takeoff or landing to compensate for cross-wind conditions, thus matching the angle of the landing gear to the direction of the runway. The pilot also sets the same angle into the nose gear using the rudder pedals (229). With the steering mechanism design shown in FIG. 60, however, the pilot sets both the main central landing gear and nose gear angle with the steering control motor (224) (or handwheel (226)). The rudder pedals (229) are used only to make fine adjustments to the nose wheel with respect to the angle already set by positioning of the main central landing gear. Pilots will recognize that the incorporation of steerable forward and main central landing gear virtually eliminates the cross-wind limitation inherent in aircraft with conventional landing gear designs, especially where this fore and aft steerable landing gear feature is combined in an aircraft having the compound wing structure, described previously, which can be activated to dramatically lower the stall speed of the aircraft.

Modeling Examples

A ⅕ scale model of an aircraft according to the invention was constructed out of balsa wood with a styrofoam-filled core and a fiberglass shell. The model had the fuselage and wing configuration of an aircraft as illustrated in FIG. 1, and it was powered by two 2.2-horsepower, single cylinder model airplane engines and props, mounted on the ends of armatures (see, e.g., items 6 and 7 of FIG. 1) raised above the wings. The model was suitable for studying general flight characteristics on takeoff,. landing and low speed cruising flight. Remote-controlled flight of the model indicated acceptable flight performance (including rudder effectiveness at low speed) and good correlation to predicted performance.

Two computer modeling programs were written, one to predict performance and one to predict stability of an aircraft based on input of data describing the size, weight, power and configuration of components. The programs were tested and verified using published data from extensive wind tunnel studies conducted by the U.S. Air Force. A computer model of an aircraft according to the invention was then compared against a computer model of a "conventional" aircraft patterned after several known production twin-engine or amphibious aircraft. The computer comparisons predicted that the configuration of aircraft according to the invention having inboard-mounted engines reduced the power requirements by as much as 20% over those of a conventional twin-engine aircraft. Additionally, aircraft according to the invention having the engine and drive system and the extendable wing system described herein had a single engine climb rate 120% higher than that of a conventional twin-engine aircraft model. In comparison to a conventional amphibious aircraft, presuming a single engine mounted on a pylon above the fuselage, the computer model aircraft according to this invention had a maximum level cruise speed of 160% that of the conventional model.

Wind tunnel tests of small models of aircraft as described herein in various configurations (e.g., wings retracted, wings extended, central landing gear deployed) were conducted and showed favorable aerodynamic characteristics in all configurations. In particular, desirable non-turbulent airflow was observed across the vertical and horizontal control surfaces of the tail section when the main wing section was placed in and near the stalled attitude.

Figure 62:
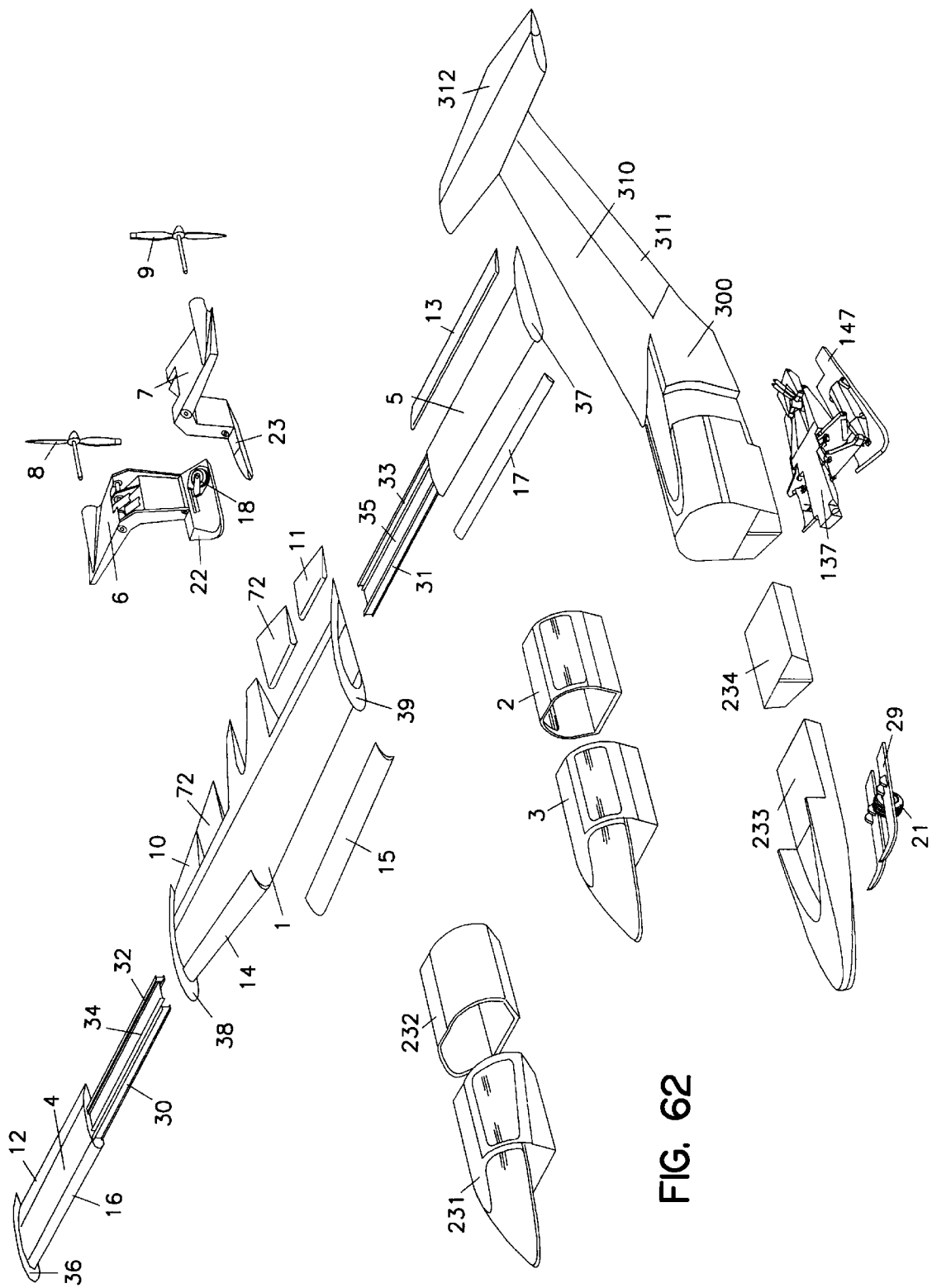
FIG. 62 is an exploded perspective view of an aircraft according to the invention showing the modular components of the fuselage and major components of the aircraft. Alternative wide-fuselage cargo-type components (231 and 232) to the standard passenger-type upper fuselage components (3 and 2) are also shown.
Figure 63:
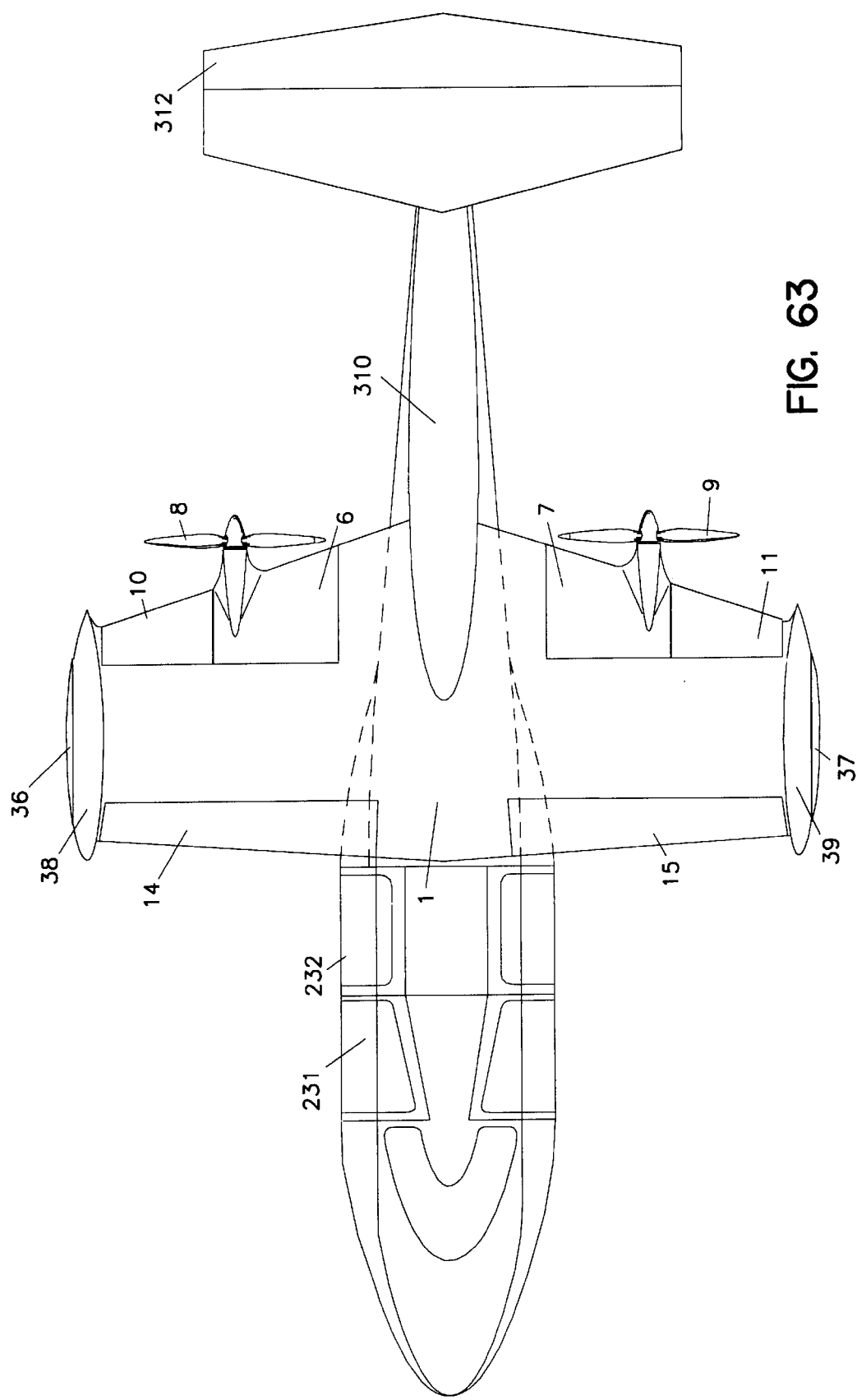
FIG. 63 shows a plan view of a wide-fuselage embodiment of the invention. This fuselage option can be compared to the standard fuselage configuration shown in FIG. 15.

Multi-purpose aircraft having a range of performance capabilities may be produced according to the foregoing description using conventional materials and well known aircraft construction techniques. The major structural components of an aircraft according to this invention are shown in FIG. 62, which is an exploded perspective view of an aircraft similar to the embodiment illustrated in FIG. 1. Most of the structural members pictured in FIG. 62 may be readily and preferably fabricated out of aluminum stock, e.g., by high-pressure water jet cutting. Most of the structures illustrated in FIG. 62 have already been described and will not be further described here. The reference numerals employed here correspond to the descriptions supra. With respect to the primary structure of the fuselage, FIG. 62 illustrates the modular design of the aircraft: The primary fuselage structure is formed by bolting a main fuselage section (300) including a tail section (310) end-to-end with a forward cabin module (233) and, optionally, with an intermediate cabin extension module (234). An upper cockpit assembly (3) and an upper cabin extension assembly (2) are attached to the forward sections of the fuselage primary structure to provide a continuous cabin enclosure. As illustrated in FIG. 4, the intermediate cabin extension module (234) and associated upper cabin assembly (2) may be omitted during construction of the aircraft to produce a shorter, lighter aircraft. Alternatively, for a larger enclosed cabin space, wide-body upper cockpit and upper cabin extension assemblies (231 and 232, respectively) may be substituted during construction for the standard upper cockpit and cabin extension assemblies (3 and 2, respectively). A wide-body version of the aircraft, illustrated in plan in FIG. 63, results. Thus, several different types of aircraft may be assembled in the same plant, without redesign of the primary structural components.

From the foregoing description, many different embodiments of aircraft incorporating innovative features according to this invention will be possible. All such embodiments, including obvious variations of the particularly preferred designs disclosed herein, are intended to be within the scope of this invention, as defined by the claims that follow.

I claim:

1. A compound aircraft wing comprising:
   (a) a fixed wing section comprising a bilaterally symmetrical aircraft wing defining leading and trailing edges and defining port and starboard halves, said fixed wing section being at least partially hollow and being open at the port and starboard ends, said fixed wing section being equipped with port and starboard ailerons pivotally attached in relation to the respective trailing edges of the port and starboard halves,
   (b) a port wing extension panel comprising a forward port lift spar, a center port drag spar, and an aft port lift spar, which port spars are disposed in parallel relation and each spar being substantially the same length as said fixed wing section, substantially one-half the length of said spars being enclosed by and giving structural support to an outer skin so as to form a port aircraft wing extension section ending in a wing tip, said port wing extension panel being extendably mounted inside said fixed wing section such that said port wing extension panel is extendable from the port opening of the fixed wing section such that substantially all of the port aircraft wing extension section protrudes from the port end of the fixed wing section and the portion of the port spars not enclosed by an outer skin being still inside said fixed wing section, said port aircraft wing extension panel being further equipped with a trailing edge port wing extension panel aileron pivotally attached in relation to the trailing edge of said port wing extension panel so as to be extendable with said port wing extension panel, said port wing extension panel and aileron further being mounted inside said fixed wing section such that said port wing extension panel and aileron are retractable within said fixed wing section such that substantially all of the port wing extension panel and aileron are enclosed by said fixed wing section, and
   (c) a starboard wing extension panel comprising a forward starboard lift spar, a center starboard drag spar, and an aft starboard lift spar, which starboard spars are disposed in parallel relation and each spar being substantially the same length as said fixed wing section, substantially one-half the length of said spars being enclosed by and giving structural support to an outer skin so as to form a starboard aircraft wing extension section ending in a wing tip, said starboard wing extension panel being extendably mounted inside said fixed wing section such that said starboard wing extension panel is extendable from the starboard opening of the fixed wing section such that substantially all of the starboard aircraft wing extension section protrudes from the starboard end of the fixed wing section and the portion of the starboard spars not enclosed by an outer skin being still inside said fixed wing section, said starboard aircraft wing extension panel being further equipped with a trailing edge starboard wing extension panel aileron pivotally attached in relation to the trailing edge of said starboard wing extension panel so as to be extendable with said starboard wing extension panel, said starboard wing extension panel and aileron further being mounted inside said fixed wing section such that said starboard wing extension panel and aileron are retractable within said fixed wing section such that substantially all of the starboard wing extension panel and aileron are enclosed by said fixed wing section, said port wing extension panel and said starboard wing extension panel being mounted in such relation that said forward port lift spar and said forward starboard lift spar are in interlocking juxtaposition inside the fixed wing section, said center port drag spar and said center starboard drag spar are in interlocking juxtaposition inside said fixed wing section, and said aft port lift spar and said aft starboard lift spar are in interlocking juxtaposition inside said fixed wing section.

2. A compound wing according to claim 1, further comprising means for coordinated actuation of the fixed wing ailerons and the extension panel ailerons.

3. A compound wing according to claim 1, further comprising means for coordinated extension and retraction of the port and starboard wing extension panels.

4. A compound wing according to claim 1, wherein said port and starboard wing extension panels are mounted in said fixed wing section by means of rollers fastened to the inner surface of the fixed wing section.

5. A compound wing according to claim 1, wherein said port wing extension panel is further equipped with a leading edge slat pivotally attached in relation to the leading edge of said port wing extension panel so as to be extendable and retractable with said port wing extension panel and wherein said starboard wing extension panel is further equipped with a leading edge slat pivotally attached in relation to the leading edge of said starboard wing extension panel so as to be extendable and retractable with said starboard wing extension panel.

6. A compound wing according to claim 1, wherein the wing span of the compound wing is increased by up to 90–95%, compared to the span of the fixed wing section, when the port and starboard wing extension panels are fully extended from said fixed wing section.

7. A compound wing according to claim 1, wherein the fixed wing section is NACA $66_3$-018 at root and tip, has a wing chord of 10 feet, 8 inches at the root and 6 feet, 8 inches at the tip, dihedral of 3 degrees, sweep of −3.28 degrees at the ¼ chord, and a span of 26 feet; said port and starboard wing extension panels have no sweep; the wing span of the compound wing with port and starboard wing extension panels fully extended is 50 feet; and the chord of said port and starboard wing extension sections is 3 feet, 8 inches as extension root and tip.

* * * * *